United States Patent
Wan et al.

(10) Patent No.: US 12,147,446 B2
(45) Date of Patent: Nov. 19, 2024

(54) SYSTEMS AND METHODS FOR DATA STORAGE AND PROCESSING

(71) Applicant: BANK OF MONTREAL, Toronto (CA)

(72) Inventors: Ching Leong Wan, Toronto (CA); Jun Wang, Richmond Hill (CA)

(73) Assignee: BANK OF MONTREAL, Toronto (CA)

(*) Notice: Subject to any disclaimer, the term of this patent is extended or adjusted under 35 U.S.C. 154(b) by 0 days.

(21) Appl. No.: 17/850,758

(22) Filed: Jun. 27, 2022

(65) Prior Publication Data
US 2023/0062655 A1    Mar. 2, 2023

Related U.S. Application Data

(63) Continuation of application No. 16/517,253, filed on Jul. 19, 2019, now Pat. No. 11,397,744.

(60) Provisional application No. 62/700,373, filed on Jul. 19, 2018.

(51) Int. Cl.
G06F 17/00 (2019.01)
G06F 16/25 (2019.01)
G06N 20/00 (2019.01)

(52) U.S. Cl.
CPC .......... *G06F 16/254* (2019.01); *G06N 20/00* (2019.01)

(58) Field of Classification Search
CPC ....... G06F 16/254; G06N 20/00; G06N 5/022
See application file for complete search history.

(56) References Cited

U.S. PATENT DOCUMENTS

| | | | |
|---|---|---|---|
| 9,542,412 B2* | 1/2017 | Bates-Haus | G06F 16/215 |
| 10,089,383 B1* | 10/2018 | Mackay | G06N 7/00 |
| 10,956,132 B1* | 3/2021 | Schneider | G06F 8/40 |
| 11,977,654 B2* | 5/2024 | Mikhailov | G06F 21/629 |
| 2008/0040310 A1* | 2/2008 | Ramsey | G06F 16/283 |
| 2013/0191418 A1* | 7/2013 | Martin, Jr. | G06Q 30/0201 |
| | | | 707/802 |

(Continued)

OTHER PUBLICATIONS

Songting Chen. 2010. Cheetah: a high performance, custom data warehouse on top of MapReduce. Proc. VLDB Endow. 3, 1-2, 1459-1468. <https://doi.org/10.14778/1920841.1921020>, Sep. 2010.*

(Continued)

*Primary Examiner* — Greta L Robinson
(74) *Attorney, Agent, or Firm* — FOLEY & LARDNER LLP

(57) ABSTRACT

Systems and methods for processing data are provided. The system may include at least a processor and a non-transient data memory storage, the data memory storage containing machine-readable instructions for execution by the processor, the machine-readable instructions configured to, when executed by the processor, provide an information delivery platform configured to: extract raw data from a plurality of source systems; load and store the raw data at a non-transient data store; receive a request to generate data for consumption for a specific purpose; In response to the request, select a set of data from the raw data based on a data map; transform the selected set of data into a curated set of data based on the data map; and transmit the curated set of data to a channel for consumption.

20 Claims, 80 Drawing Sheets

(56) References Cited

U.S. PATENT DOCUMENTS

| | | | |
|---|---|---|---|
| 2013/0226860 A1* | 8/2013 | Eshleman | G06F 16/254 707/602 |
| 2013/0290234 A1* | 10/2013 | Harris | G06Q 30/00 901/50 |
| 2014/0358845 A1 | 12/2014 | Mundlapudi et al. | |
| 2014/0372171 A1* | 12/2014 | Martin, Jr. | G06Q 30/0201 705/7.29 |
| 2016/0019272 A1 | 1/2016 | Liu et al. | |
| 2017/0061500 A1 | 3/2017 | Borodin | |
| 2017/0132300 A1* | 5/2017 | Sekar | G06F 16/254 |
| 2017/0322987 A1* | 11/2017 | Cui | G16H 40/63 |

OTHER PUBLICATIONS

Robert Baumgartner, Georg Gottlob, and Marcus Herzog. 2009. Scalable web data extraction for online market intelligence. Proc. VLDB Endow. 2, 2, 1512-1523. <https://doi.org/10.14778/1687553.1687580>, Aug. 2009.*

Tian et al., "DiNoDB: Efficient Large-Scale Raw Data Analytics", Proceedings of the First International Workshop on Bringing the Value of "Big Data" to Users, Association for Computing Machinery, New York, New York, Sep. 2014,, pp. 1-6, DOI: 10.1145/2658840.2658841 (6 pages).

First Examiner's Requisition for CA App. 3,050,220 dated Dec. 6, 2023 (7 pages).

* cited by examiner

| | Replication | Erasure Coding |
|---|---|---|
| Target | HOT | COLD |
| Storage overhead | 200% | 50% |
| Data durability | ✔ | ✔ |
| Data Locality | ✔ | ✖ |
| Write performance | ✔ | ✖ |
| Read performance | ✔ | △ |
| Recovery cost | Low | High |

| Capture | Consolidate | Manage/Cleanse | Sync |
|---|---|---|---|
| Customer data capture is consistent and aligned to Enterprise standards and rules – data captured at the customer level, with the appropriate context to be leveraged across LOBs | Customer data is consolidated into a single Book of Record repository (ECIF) and linked to participating applications, reducing update conflicts and replication / latency issues | Customer data standards are enforced across the Enterprise, new programs / projects are aligned with data standards, and remediation process is defined and implemented | Operational (sales, service) and analytical (IDP) processes across LOBs will leverage ECIF for customer data and the monetization of sales & service opportunities |
| Capture customer data in a consistent fashion, aligned to enterprise standards and rules | Consolidate customer data into a single Book of Record repository and link to participating applications | Clean and de-duplicate customer data, and manage it according to defined business rules | Synchronize central master data with enterprise business processes and applications |
| • Customer data (including preferences) capture is consistent and aligned to Enterprise standards and rules | • Customer data is consolidated in ECIF, providing a single view of the customer as well as a single customer reference ID | • Customer data is de-duplicated through enterprise standard set rules for matching / survivorship | • Enterprise standards for how customer data is accessed and shared |
| • We ask customers for information once, with profile changes replicated across channels and LOBs | • ECIF as the Book of Record reducing update conflicts and replication / latency issues | • Removed need for backend transformation of customer data based on standards applied at the point of entry | • ECIF is the Book of Record for customer data, synchronized with existing LOB systems and supporting downstream product / service processes |
| • Customer information (e.g., address, phone number, etc.) is captured at the customer level, with the appropriate context to leverage across LOBs | • Standard definitions in place for relationships between individual and entity customer types, leveraged across LOBs | • On a continual basis, customer data is profiled, with data quality issues identified and remediation plans in place where appropriate | • Account / holding details are shared for targeted products / services in the channels to provide an integrated view of the customer relationship |

FIG. 64A

Enhanced ability to meet regulatory requirements

- Ability to rapidly add or update customer data attributes captured at the front-lines to address new regulatory requirements (e.g., KYC, FATCA, Dodd Frank, etc.)
- Aggregate view of customer activity to support downstream regulatory processes, transitioning from account-level to customer-level monitoring and risk management

Improved customer experience

- Ability to proactively identify if prospect is already an existing customer for another LOB, eliminating duplicative requests for information
- Accelerated Customer On-Boarding by pre-filling customer information from existing LOB relationship
- Updates to customer information made once and propagated across their accounts, as appropriate

Enhanced sales capabilities of our business

- Aggregated view of customer holdings at the front-lines to enrich the dialogue with our customers, and identify cross-sell / up-sell opportunities
- Identification of relationships the customer may have either accounts, other parties, and other entities (e.g., individuals that are members of the same household, entity customers with parent / subsidiary relationships, power of attorney for an account, etc.)
- Availability of customer data for previously de-marketed customers returning to the Bank to enrich the dialogue and accelerate their return On-Boarding process to BMO
- Consistent capture of customer preferences at the front-lines to tailor downstream service, support, and marketing communications

FIG. 64B

SYSTEMS AND METHODS FOR DATA STORAGE AND PROCESSING

CROSS REFERENCE TO RELATED APPLICATIONS

This application is a continuation application of U.S. application Ser. No. 16/517,253, filed Jul. 19, 2019, which claims priority to U.S. Provisional Patent Application No. 62/700,373, filed Jul. 19, 2018, entitled SYSTEMS AND METHODS FOR DATA STORAGE AND PROCESSING, each of which is hereby incorporated by reference in its entirety for all purposes.

FIELD

The present disclosure generally relates to the field of data storage systems and processing.

INTRODUCTION

Traditional data warehousing techniques, such as Extract, Transform and Load (ETL), can move data from source systems to a target storage system. ETL involves extracting or reading data from source systems, transforming the data into a format for storage (e.g. convert data to a format for target storage system) and then loading or writing the extracted data to the target storage system. However, ETL methods can have technical limitations. For example, if a data set is needed for different end appliances or channels, the data set may need to be transformed or converted multiple times.

A full-service financial service institution depends heavily on the use of technology to serve customers with a wide range of products and services. In addition, technology is used to meet stringent risk management and regulatory compliance.

An organization with a long history typically has adopted a myriad range of technologies from legacy platforms like mainframe to modern capabilities like mobile and analytic applications. An organization might have a large set of applications (many hundreds) through acquisition and integration.

To continue to deliver differentiating customer experience and transformation to keep pace with or leap-frog competitors, both traditional and disruptive ones, an institution needs to be able to effectively and efficiently integrate its complex and diverse set of applications. An integrated enterprise forms the foundational capability to deliver any product and service across different channels, and it also enables the ability to identify events and generates actionable insights to become an intelligent institution.

SUMMARY

In accordance with an aspect of embodiments described herein, there is provided an information delivery platform (IDP) to provide processing tools for an enterprise data fabric with a central data and a consolidated book of record data and advanced analytics including machine learning. Large and complex organizations rely heavily on the use of large volume and varieties of data for business operation and insights. To manage and transform the ecosystem for an organization, the IDP provides a platform to collect and aggregate critical data from the large amount of business applications to serve as a single efficient repository for various consumers (e.g., human or system). IDP has been built with a standard efficient mechanism to ingest data. Data is then stored and transformed based on consumption patterns to facilitate usage. As part of the IDP platform, a set of analytic tools are carefully integrated to generate insights and analytical models. Trained models can then be integrated to the real-time transaction flow as part of the overall integration capability. In addition to housing the data, IDP also provides the computing power to support the processing of data within IDP. This Bring-Processing-to-Data instead of moving data to where processing is required has significant performance and efficiency advantages, especially when a large volume of data is involved. Finally, IDP can also provide a robust data governance function, such as metadata catalog and data lineage, to ensure effective control and management all in one place. In contrast to "extract, transform, load" or ETL, IDP can use an "extract, load, transform" or ELT process where the conversion of data for different targets can occur after it is loaded or written to the target storage system from different sources.

In accordance with an aspect of embodiments described herein, there is provided a system for processing data, the system may include at least a processor and a non-transient data memory storage, the data memory storage containing machine-readable instructions for execution by the processor, the machine-readable instructions configured to, when executed by the processor, provide an information delivery platform configured to: extract raw data from a plurality of source systems; load and store the raw data at a non-transient data store; receive a request to generate data for consumption, the request indicating a specific purpose for the consumption; in response to the request, select a set of data from the raw data based on a data map; transform the selected set of data into a curated set of data based on the data map; and transmit the curated set of data to a channel for the consumption.

In accordance with some aspect of embodiments described herein, the specific purpose may be related to generating visual elements for an interface to display information to a specific group of users of the information delivery platform.

In accordance with another aspect of embodiments described herein, the raw data may be stored at the non-transient data store in a data format that is identical to a source data format of the raw data in the plurality of source systems.

In accordance with yet another aspect of embodiments described herein, the data map may be a visual graph linking one or more data columns of the raw data to one or more data fields of the curated set of data.

In accordance with one aspect of embodiments described herein, the data map may be generated based on data attributes stored in a metadata database.

In accordance with another aspect of embodiments described herein, the data map is generated through machine learning techniques.

In accordance with another aspect of embodiments described herein, there is provided a computer-implemented method for executing by a processor. The method may include the steps of: extracting, by the processor, raw data from a plurality of source systems; loading and storing the raw data at a non-transient data store; receiving a request to generate data for consumption for a specific purpose; in response to the request, selecting a set of data from the raw data based on a data map; transforming the selected set of data into a curated set of data based on the data map; and transmitting the curated set of data to a channel for consumption.

In accordance with some aspect of embodiments described herein, the specific purpose may include displaying information to a specific group of users of the information delivery platform.

In accordance with another aspect of embodiments described herein, the raw data may be stored at the non-transient data store in a data format that is identical to a source data format of the raw data in the plurality of source systems.

In accordance with yet another aspect of embodiments described herein, the data map is a visual graph linking one or more data columns of the raw data to one or more data fields of the curated set of data.

In accordance with still another aspect of embodiments described herein, the data map may be generated based on data attributes stored in a metadata database.

In accordance with some aspects of embodiments described herein, the method may include generating the data map through machine learning techniques.

In accordance with an aspect of embodiments described herein, there is provided a system for processing data, comprising at least a processor and a non-transient data memory storage, the data memory storage containing machine-readable instructions for execution by the processor, the machine-readable instructions configured to, when executed by the processor, provide an information delivery platform configured to: receive raw data from a plurality of source systems; load and store the raw data at a non-transient data store; select a set of data from the raw data based on a data map; transform the set of data into a transformed dataset; and store the transformed dataset at the non-transient data store.

In accordance with an aspect of embodiments described herein, the raw data is received sequentially from the plurality of source systems.

In accordance with an aspect of embodiments described herein, the raw data is loaded and stored sequentially according to the one or more plurality of source systems the raw data was received from.

In accordance with an aspect of embodiments described herein, the information delivery platform is further configured to generate one or more data models of the raw data, selected set of data, or transformed dataset.

In accordance with an aspect of embodiments described herein, the one or more data models encodes data for using the raw data, selected set of data, or transformed dataset.

In accordance with an aspect of embodiments described herein, the one or more data models is generated based on machine learning.

In accordance with an aspect of embodiments described herein, the data map is populated based on one or more data models.

In accordance with an aspect of embodiments described herein, one or more applications are included in the information delivery platform and configured to access data in the non-transient data store.

In various further aspects of embodiments described herein, the disclosure provides corresponding systems and devices, and logic structures such as machine-executable coded instruction sets for implementing such systems, devices, and methods.

In this respect, before explaining at least one embodiment in detail, it is to be understood that the embodiments are not limited in application to the details of construction and to the arrangements of the components set forth in the following description or illustrated in the drawings. Also, it is to be understood that the phraseology and terminology employed herein are for the purpose of description and should not be regarded as limiting.

Many further features and combinations thereof concerning embodiments described herein will appear to those skilled in the art following a reading of the instant disclosure.

DETAILED DESCRIPTION

In the figures, embodiments are illustrated by way of example. It is to be expressly understood that the description and figures are only for the purpose of illustration and as an aid to understanding.

Embodiments will now be described, by way of example only, with reference to the attached figures, wherein in the figures:

FIG. 16 shows data replication and erasure coding.

Figure 17:
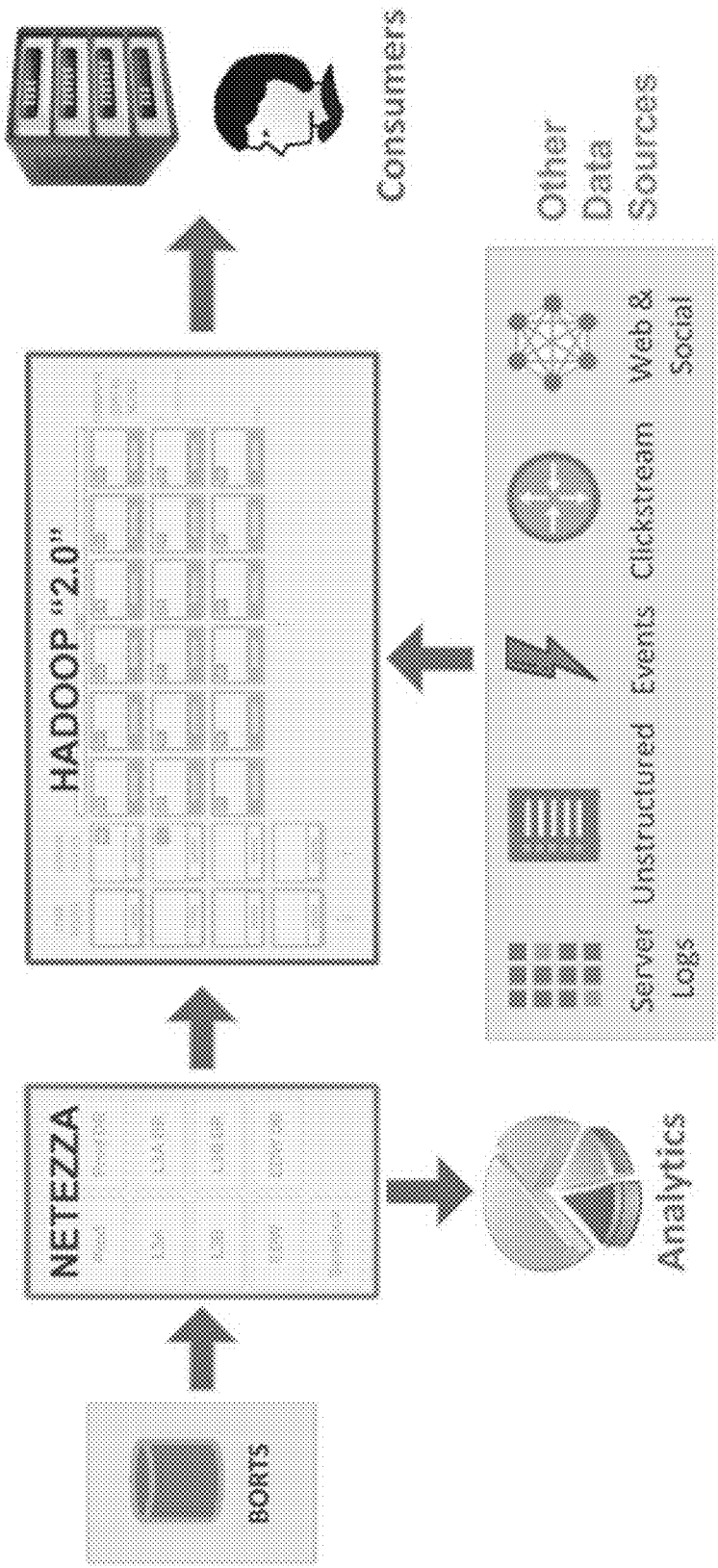
Figure 18:
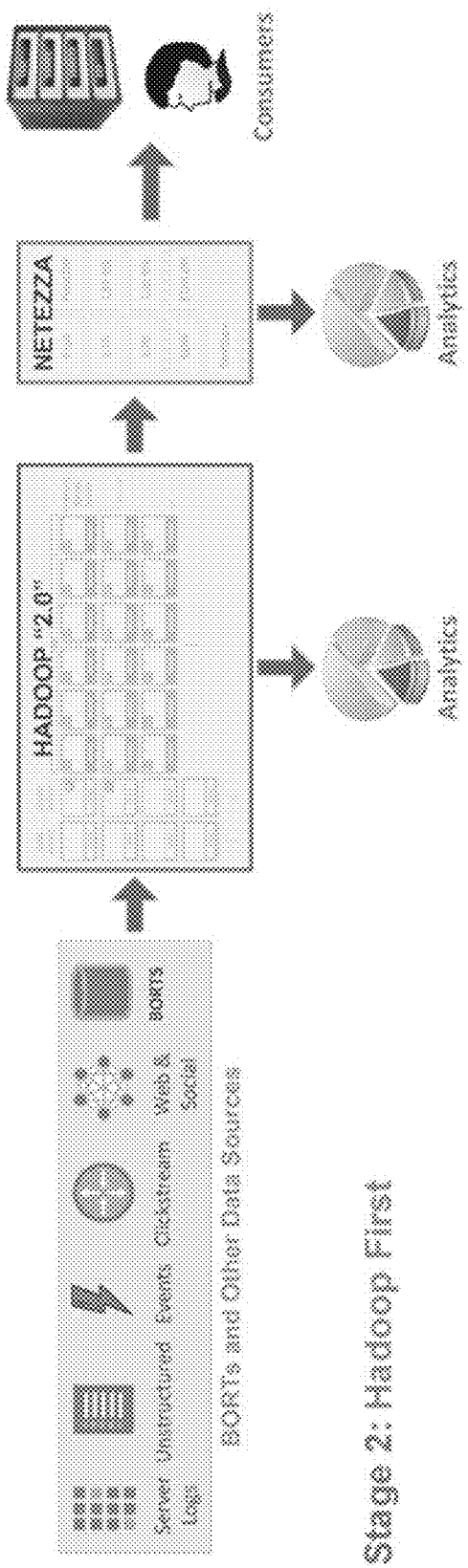
Figure 19:
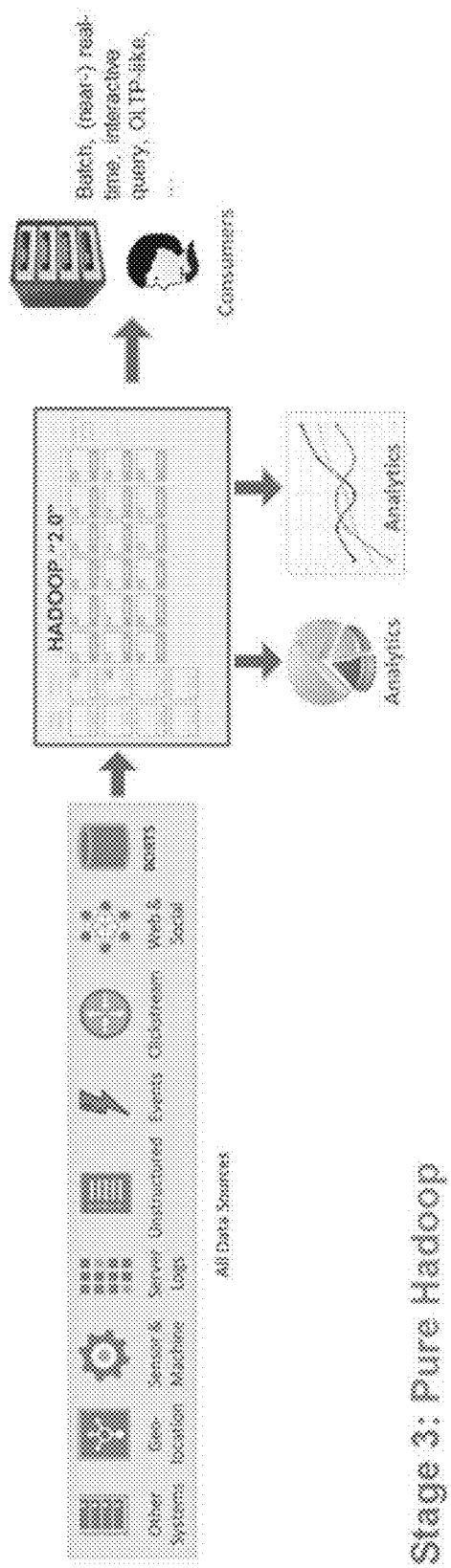

FIGS. 17, 18 and 19 demonstrate example migration process from Netezza to Hadoop.

Figure 20:
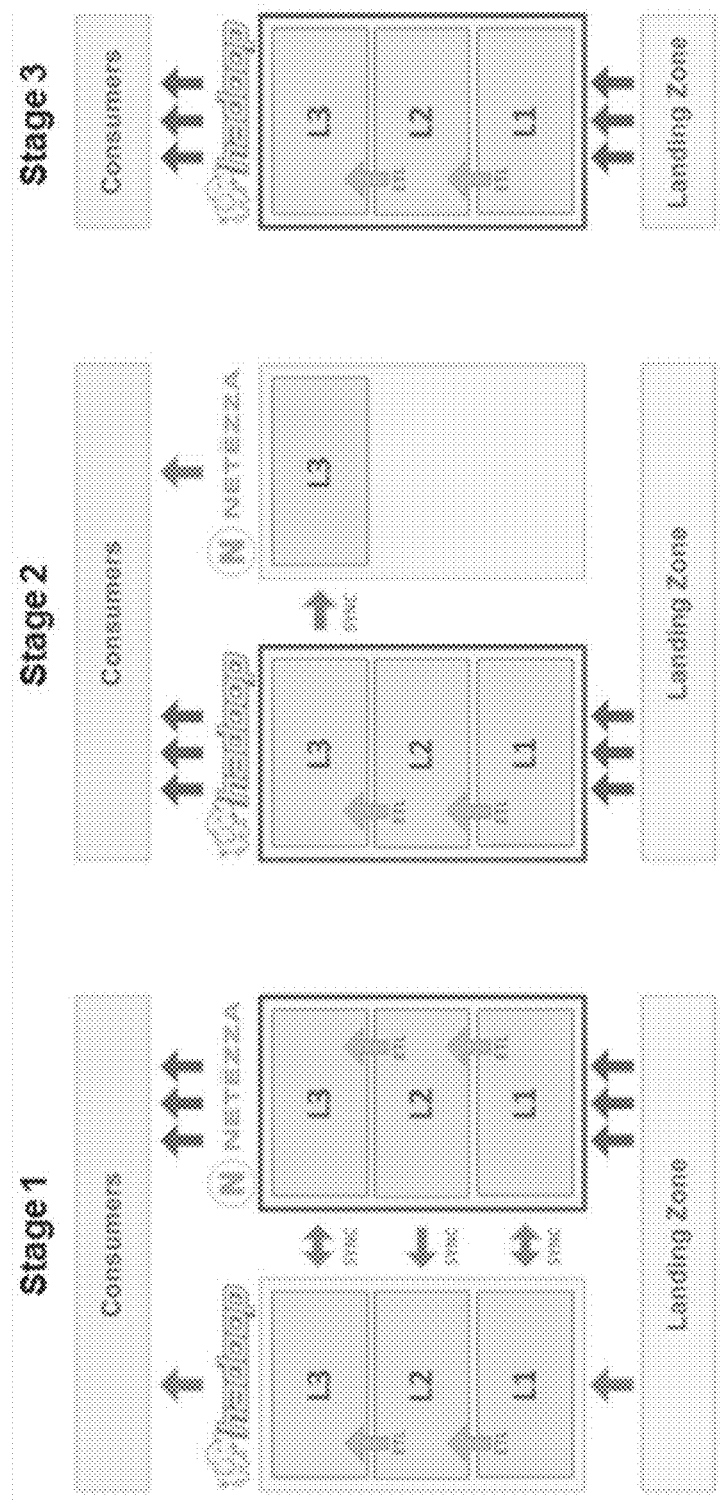

FIG. 20 shows migration process for data landing zone.

Figure 21:
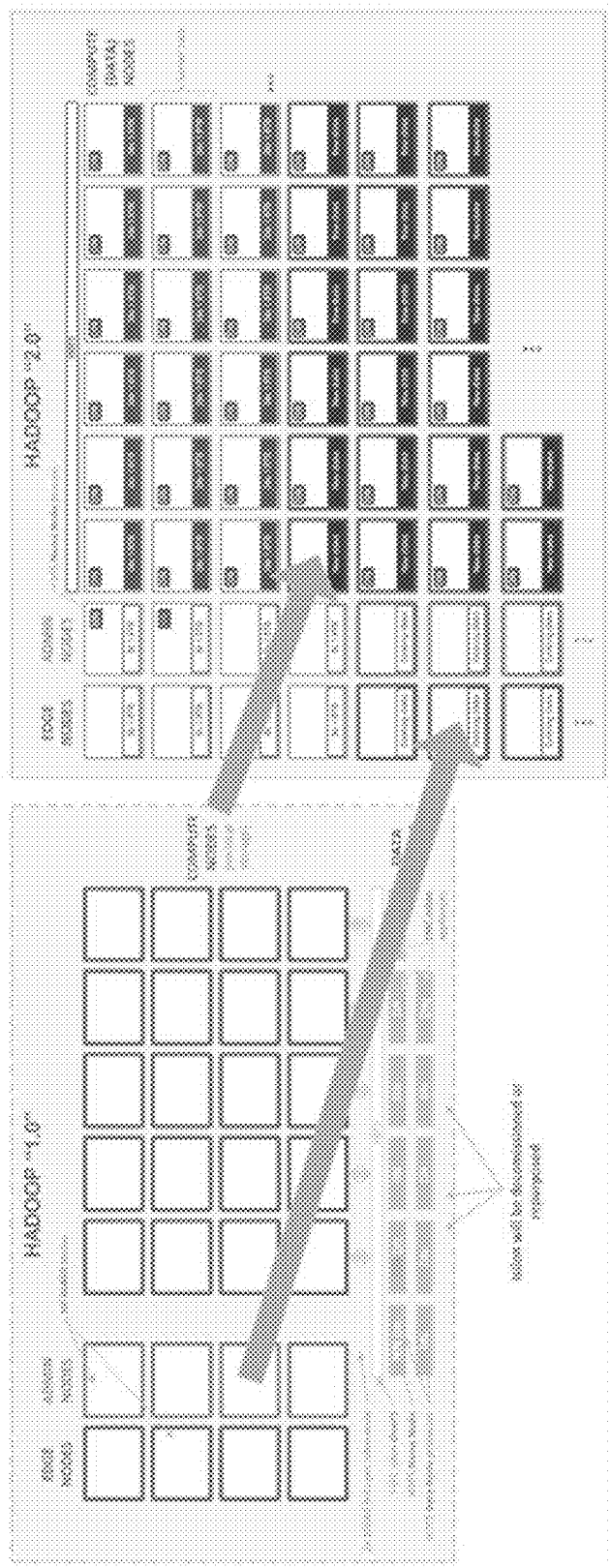

FIG. 21 shows example conversion.

Figure 22:
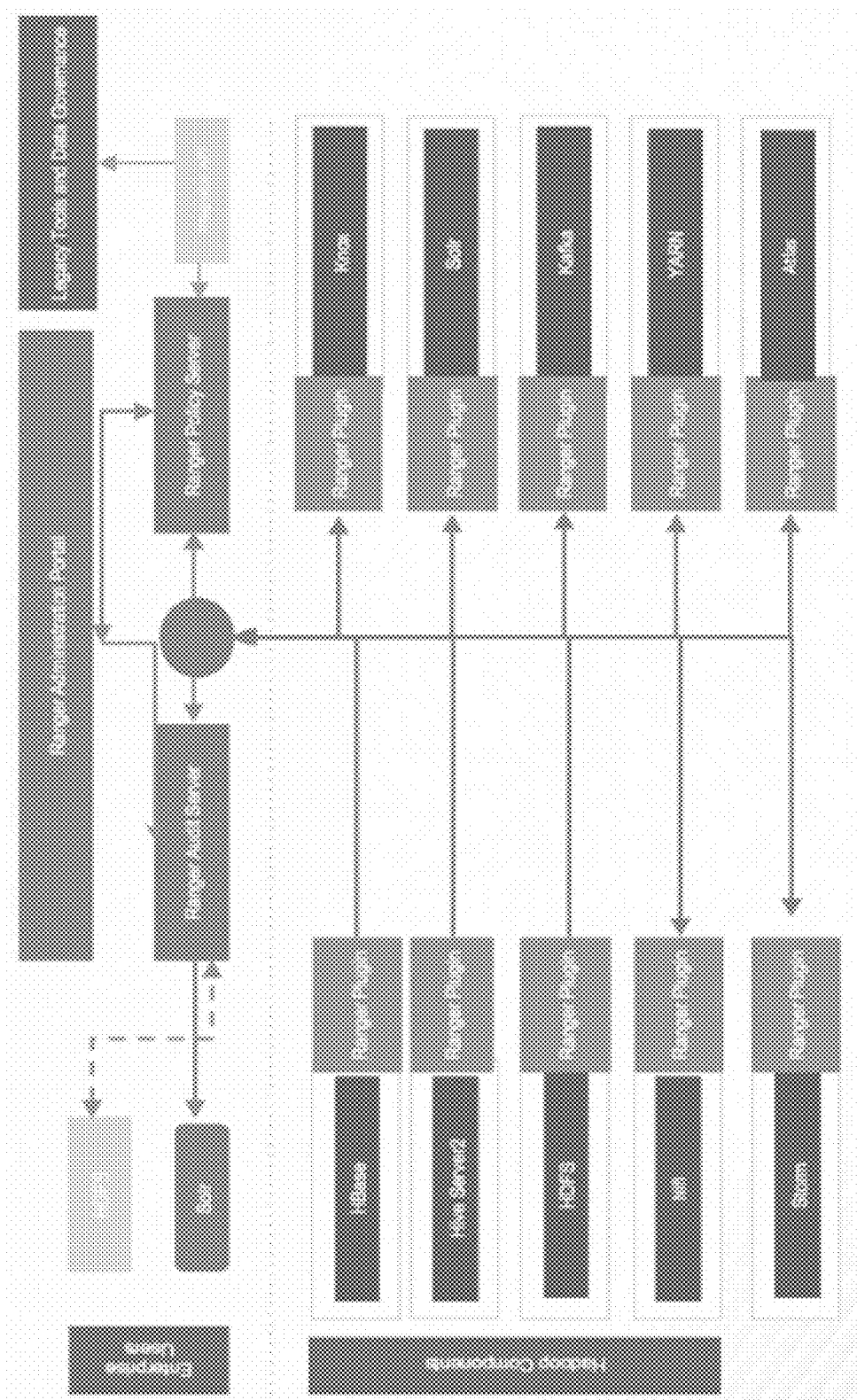

FIG. 22 shows an administration portal.

Figure 23:
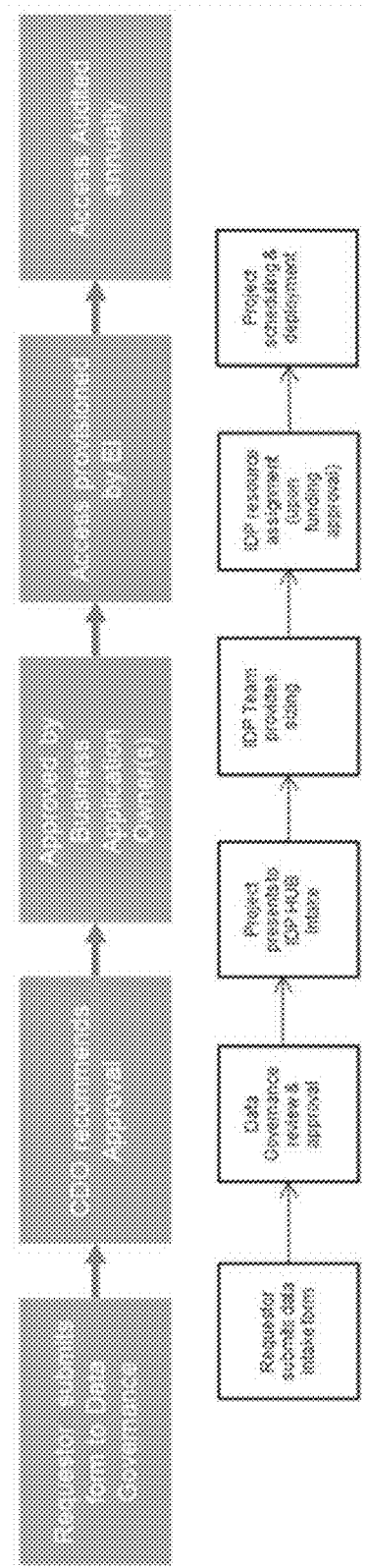

FIG. 23 shows automated workflow process for IDP data access request.

Figure 24:
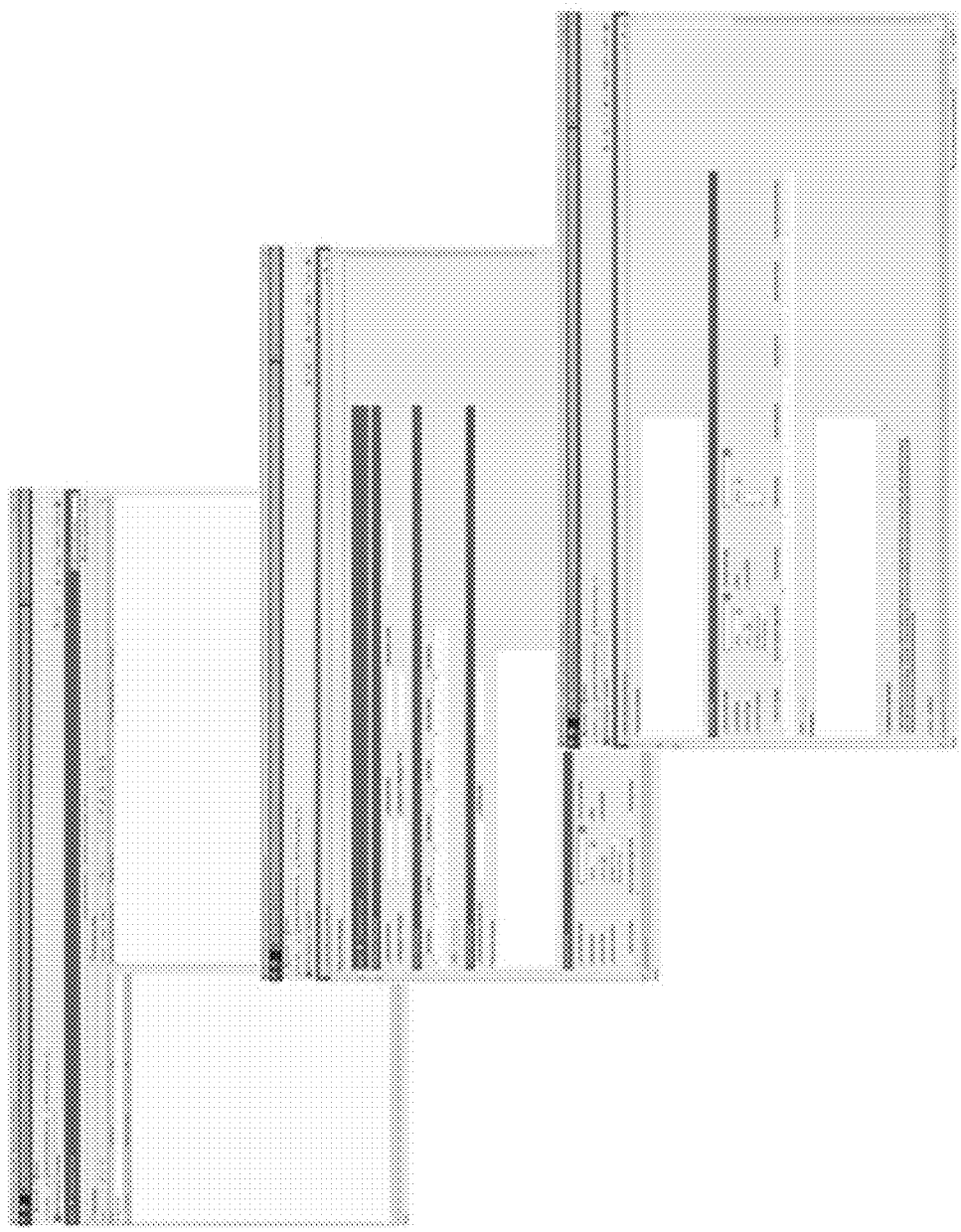

FIG. 24 shows key Information collected for IDP access request.

Figure 25:
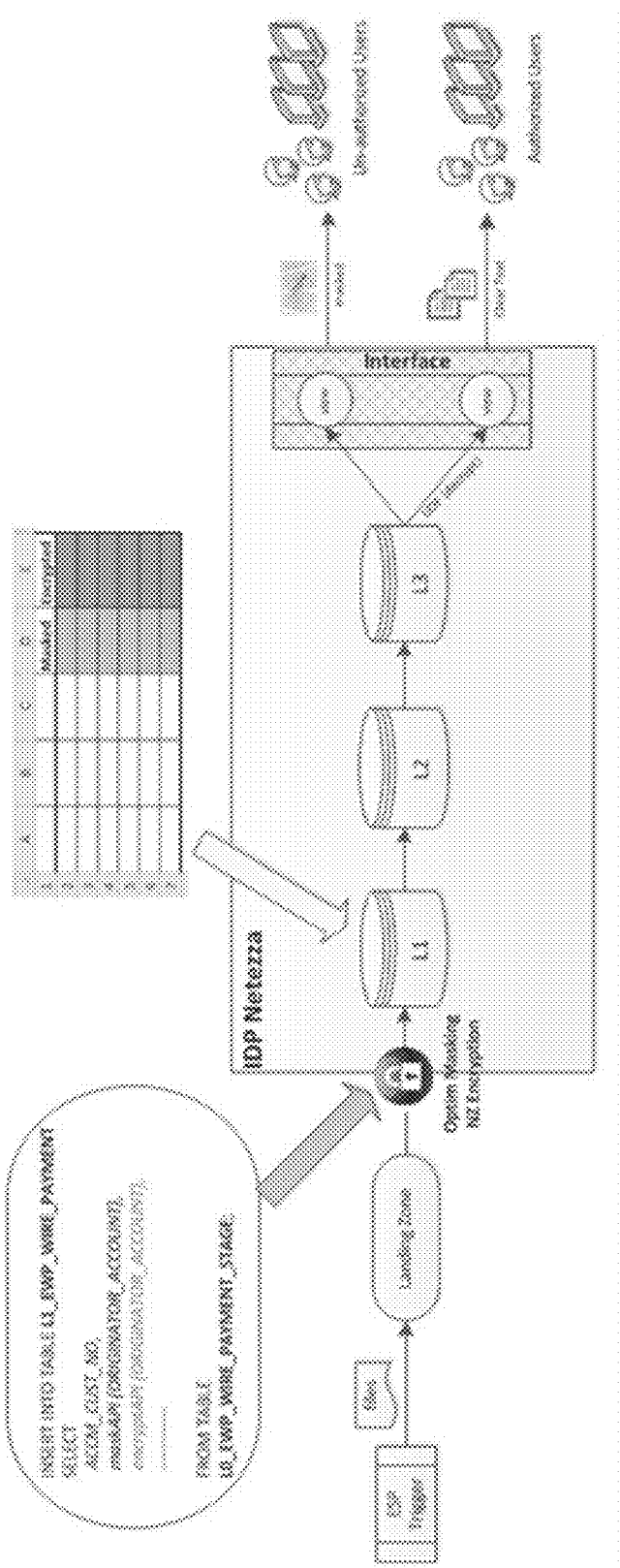

FIG. 25 shows an example process of data masking and encryption by an example data repository system (e.g. Netezza) for IDP.

Figure 26:
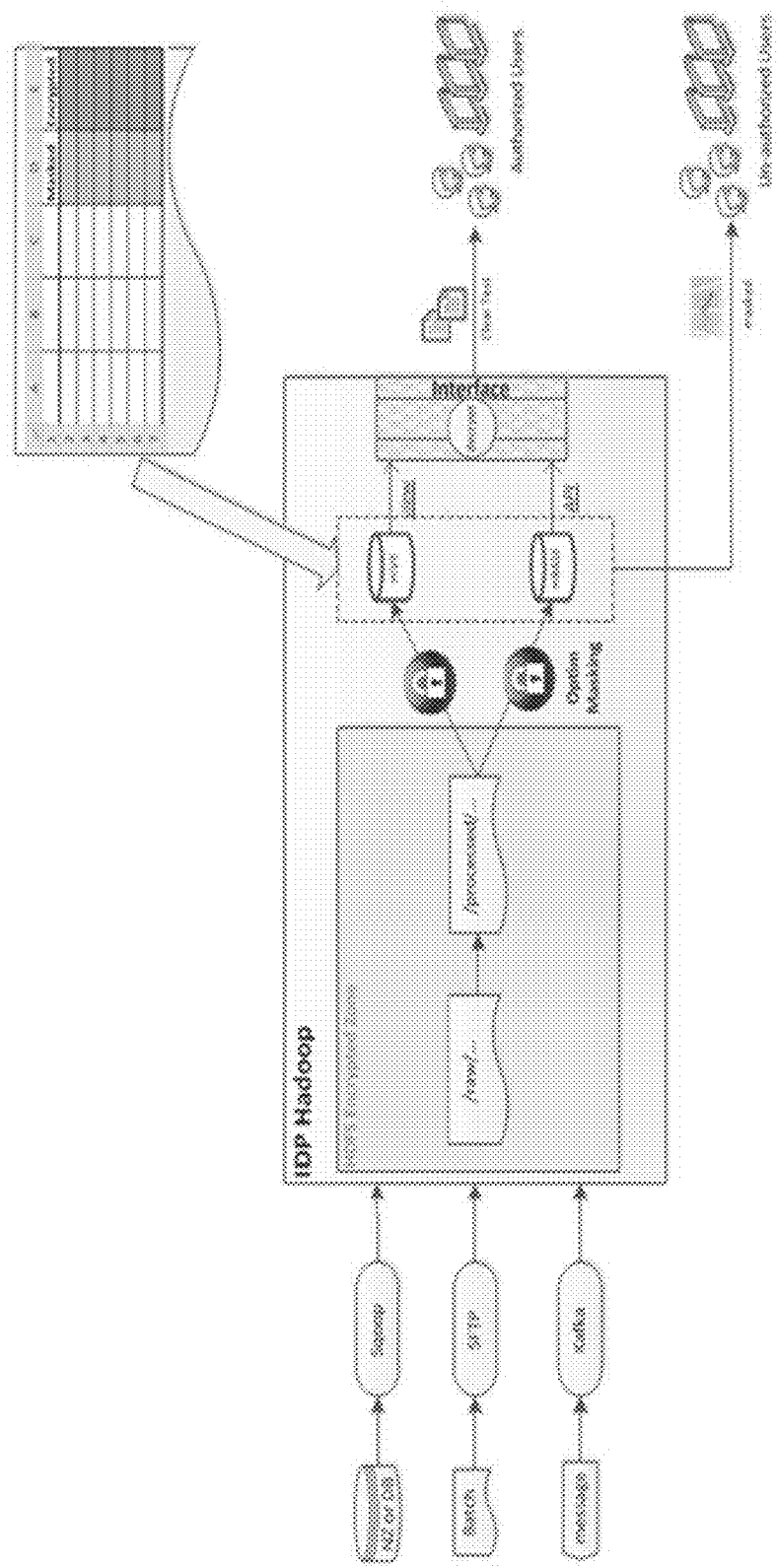

FIG. 26 shows another example process of data masking and encryption by an example data repository system (e.g. Hadoop) for IDP.

Figure 27:
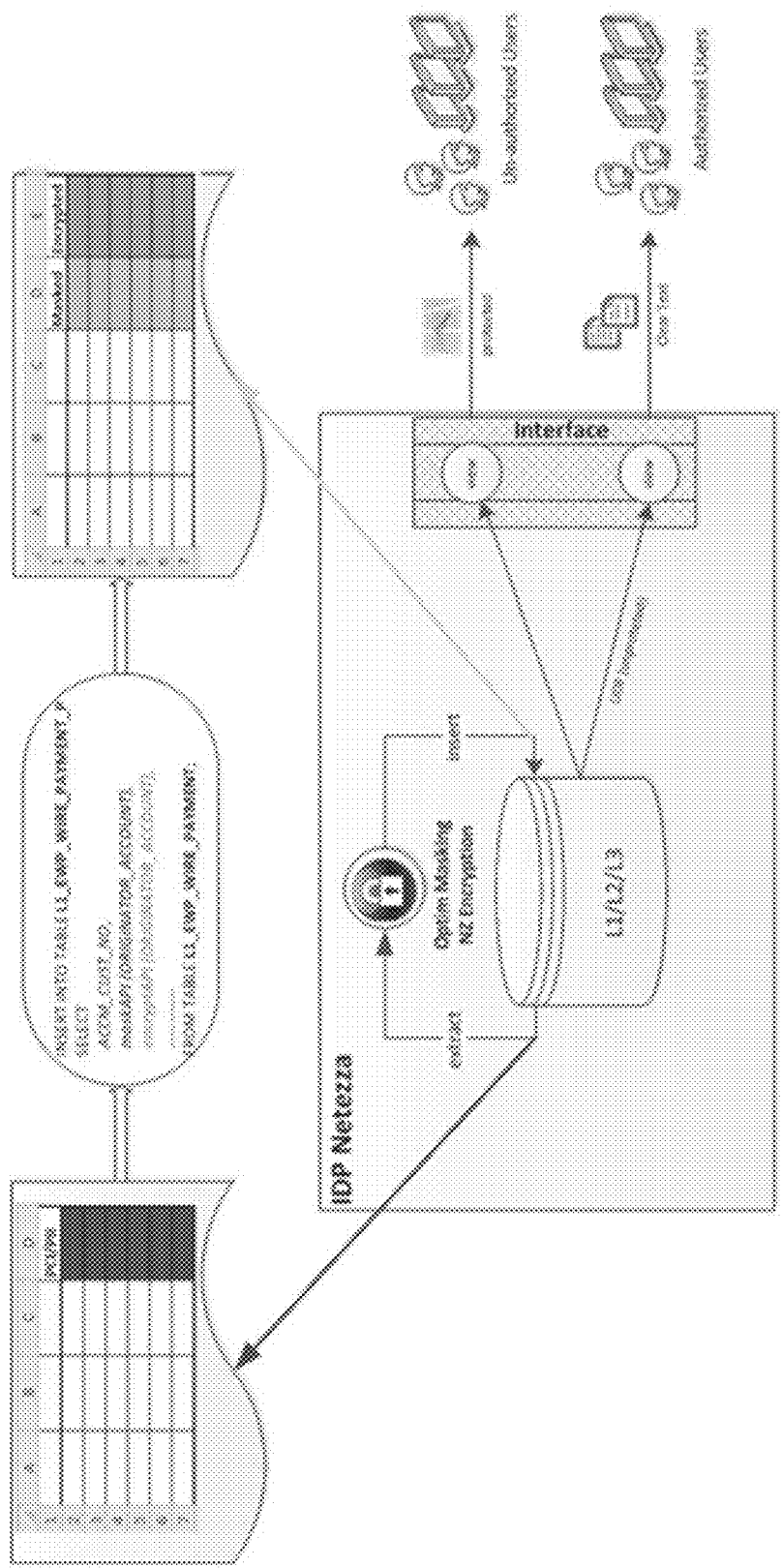

FIG. 27 shows another example data protection of IDP.

Figure 28:
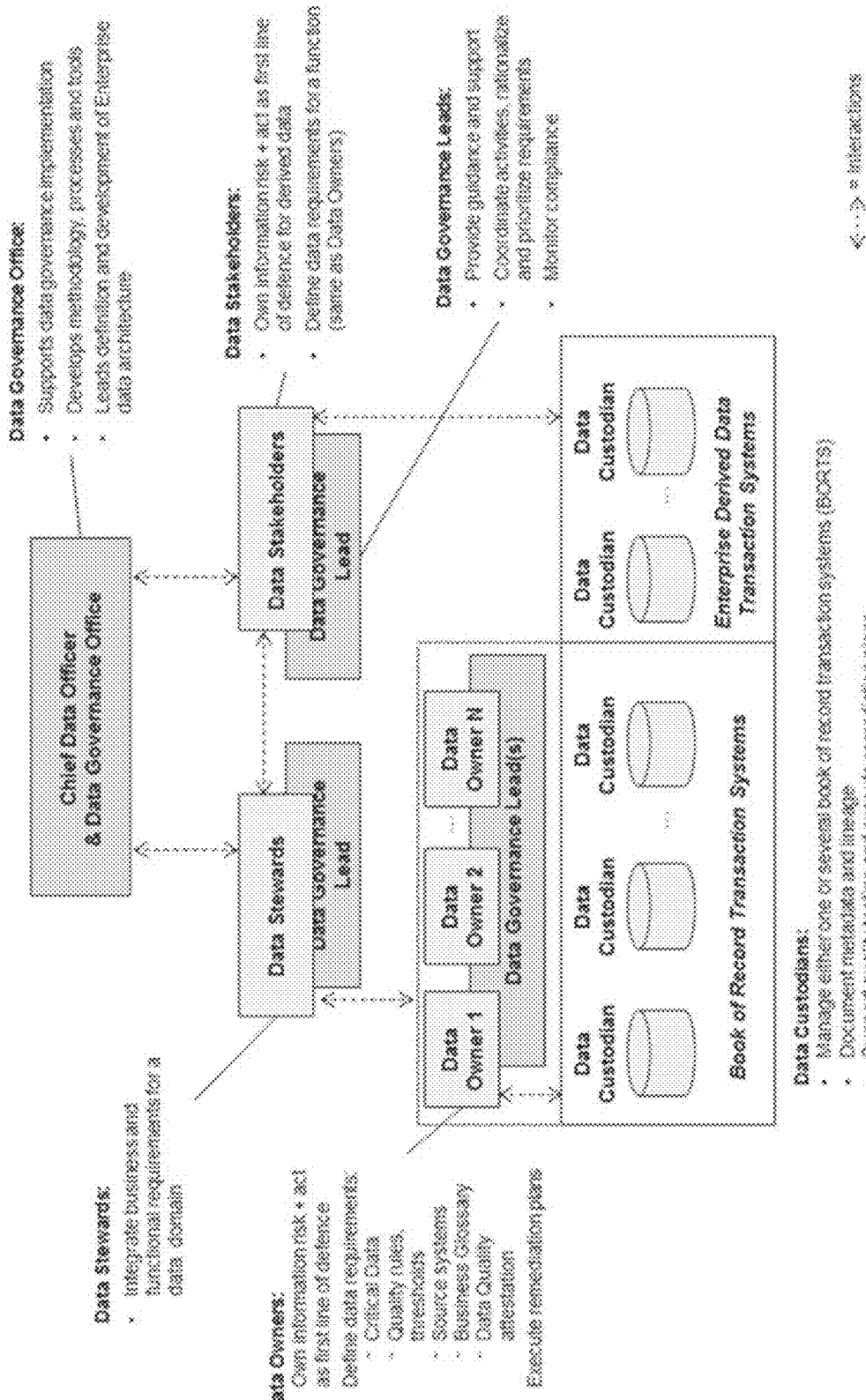

FIG. 28 shows an example Data Governance Operating Model of IDP.

Figure 29:
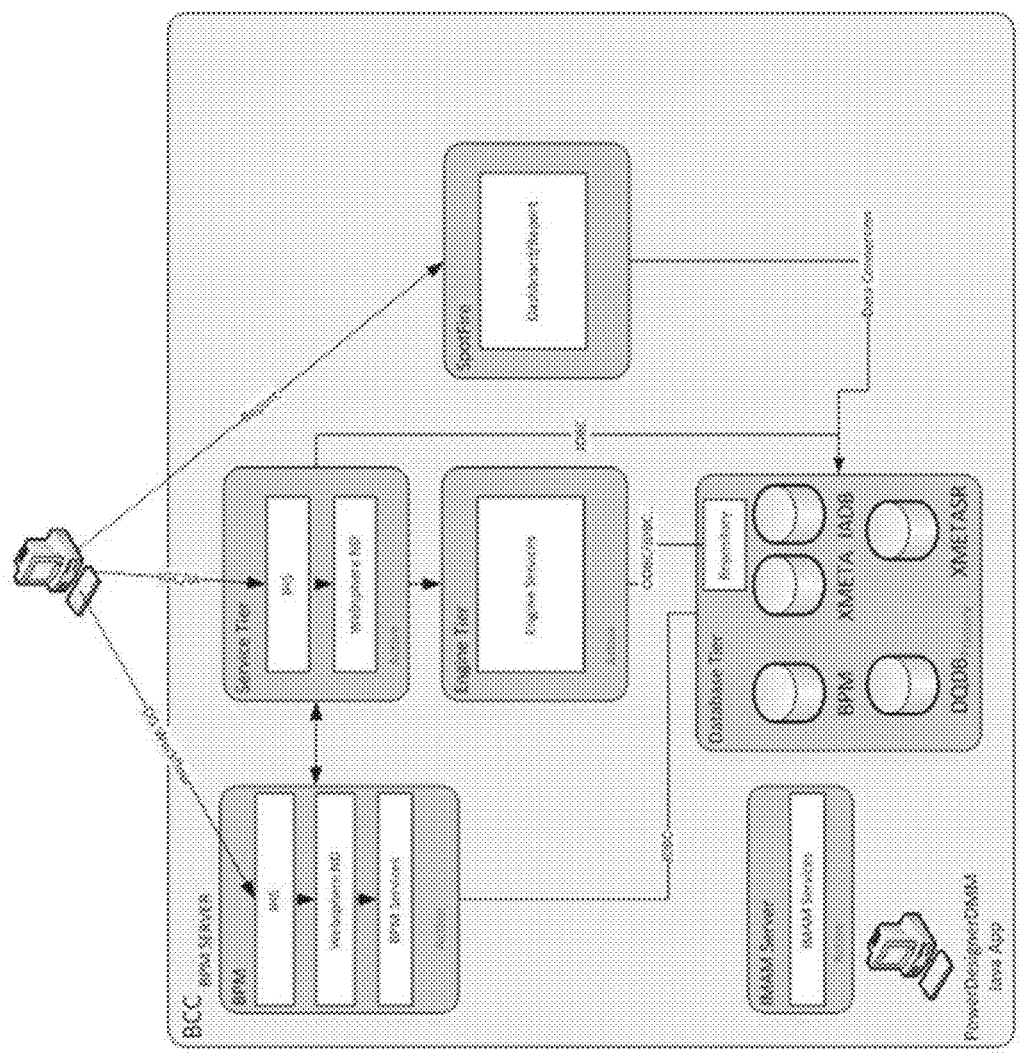

FIG. 29 shows IDP Information Governance Catalog (IGC).

Figure 30:
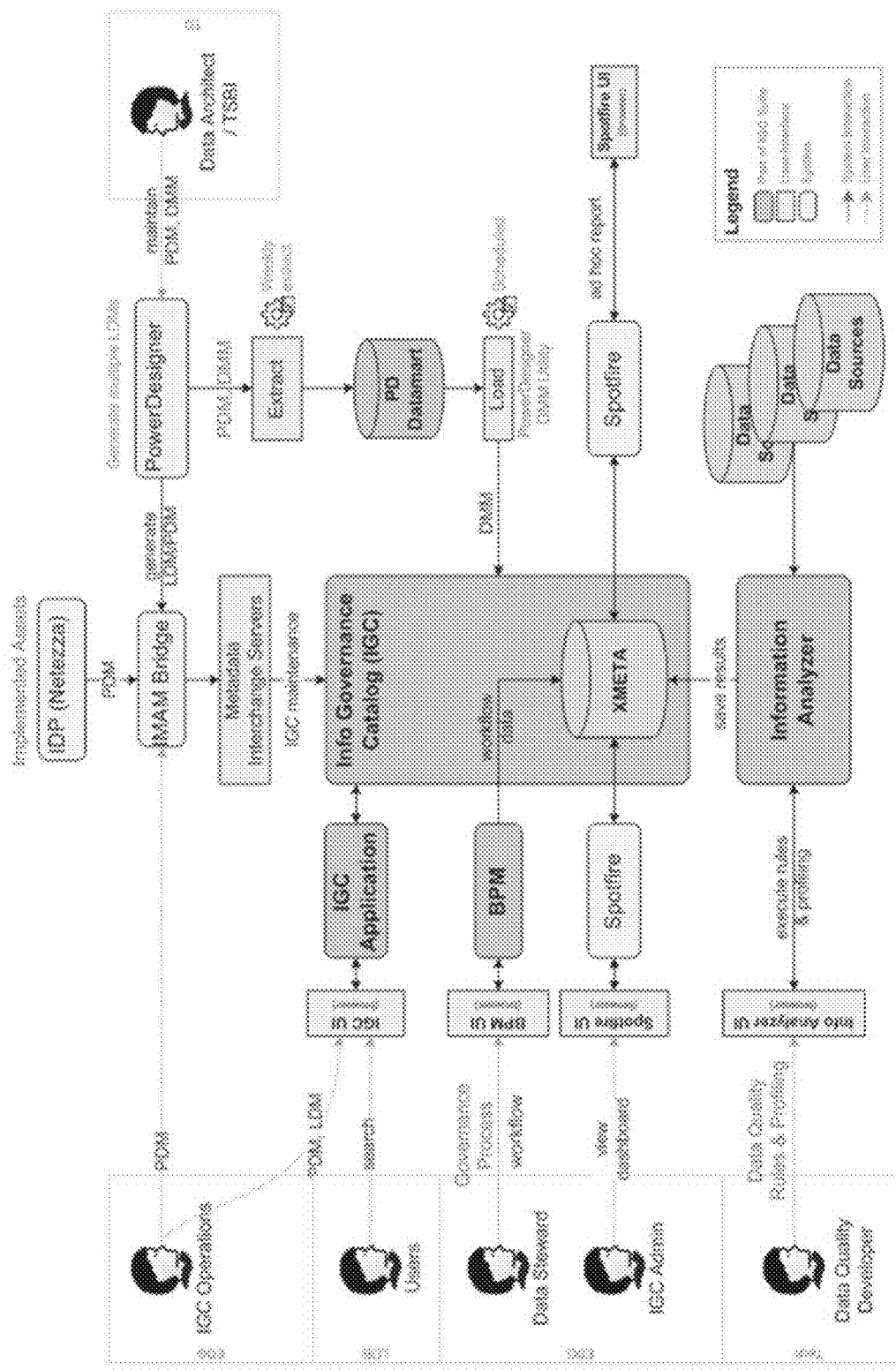

FIG. 30 shows IDP IGC Logical Architecture.

Figure 31:
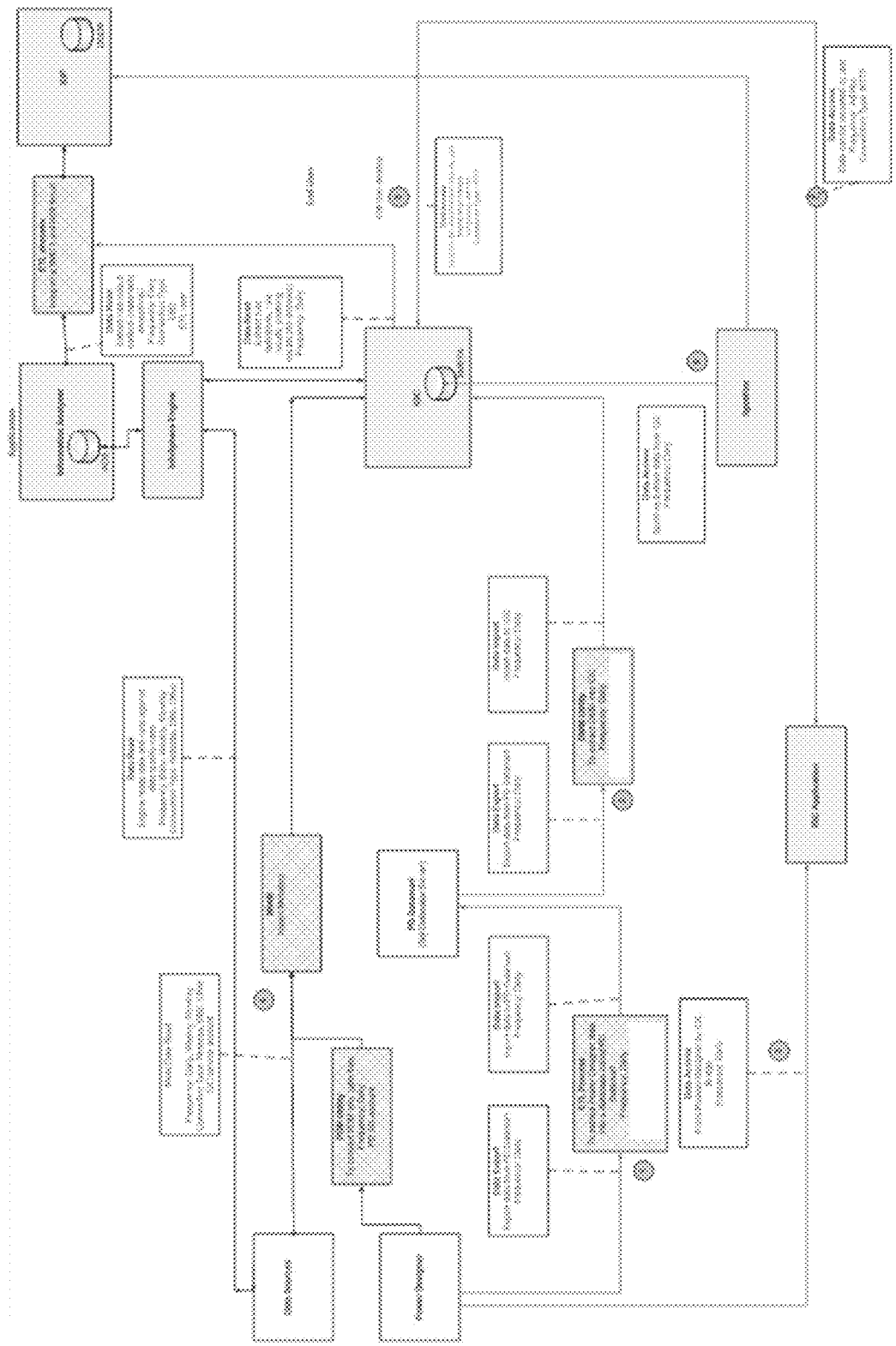

FIG. 31 shows IDP IGC Data Flow Architecture.

Figure 32:
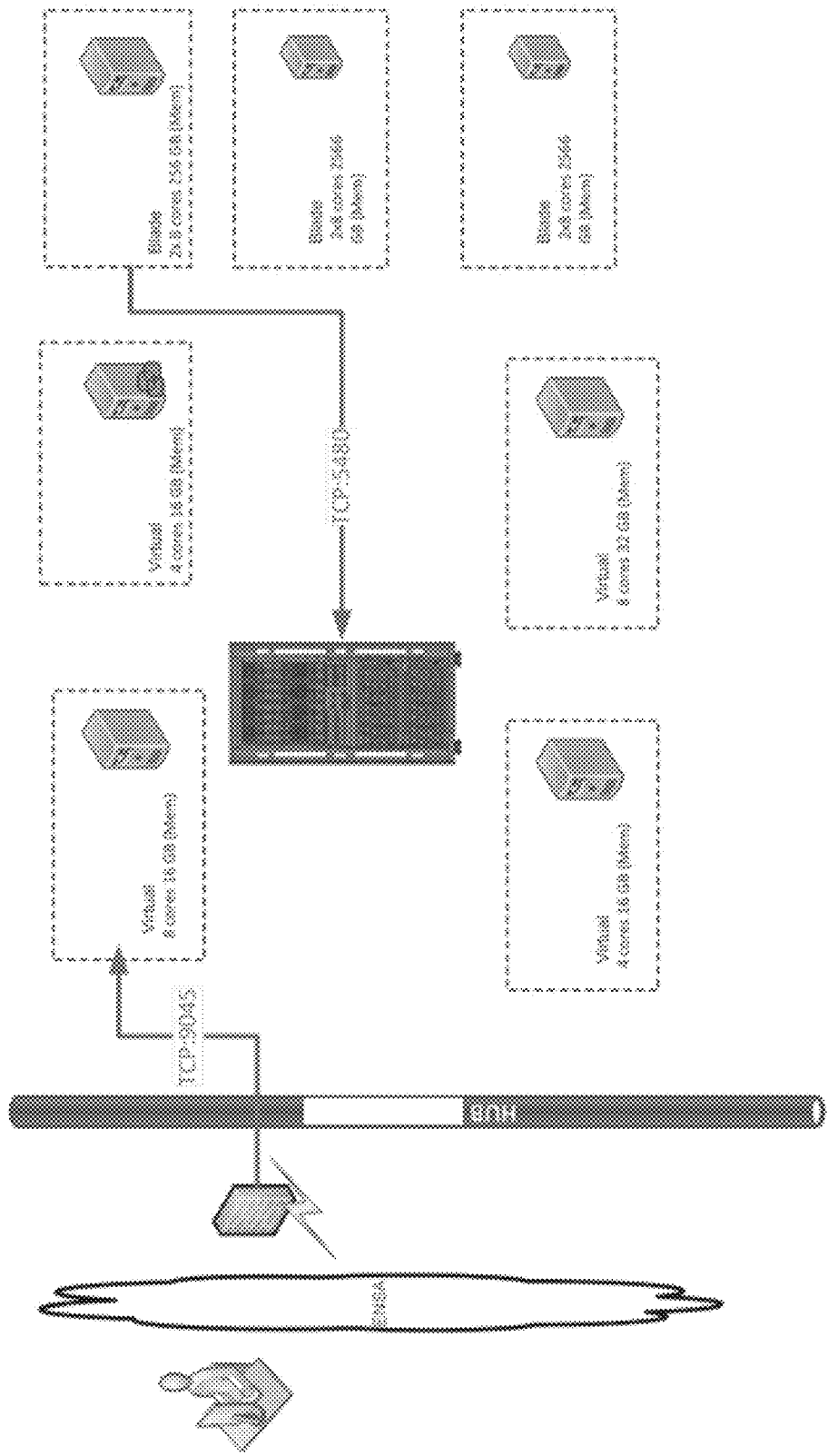

FIG. 32 shows IDP IGC Production Physical Architecture.

Figure 33:
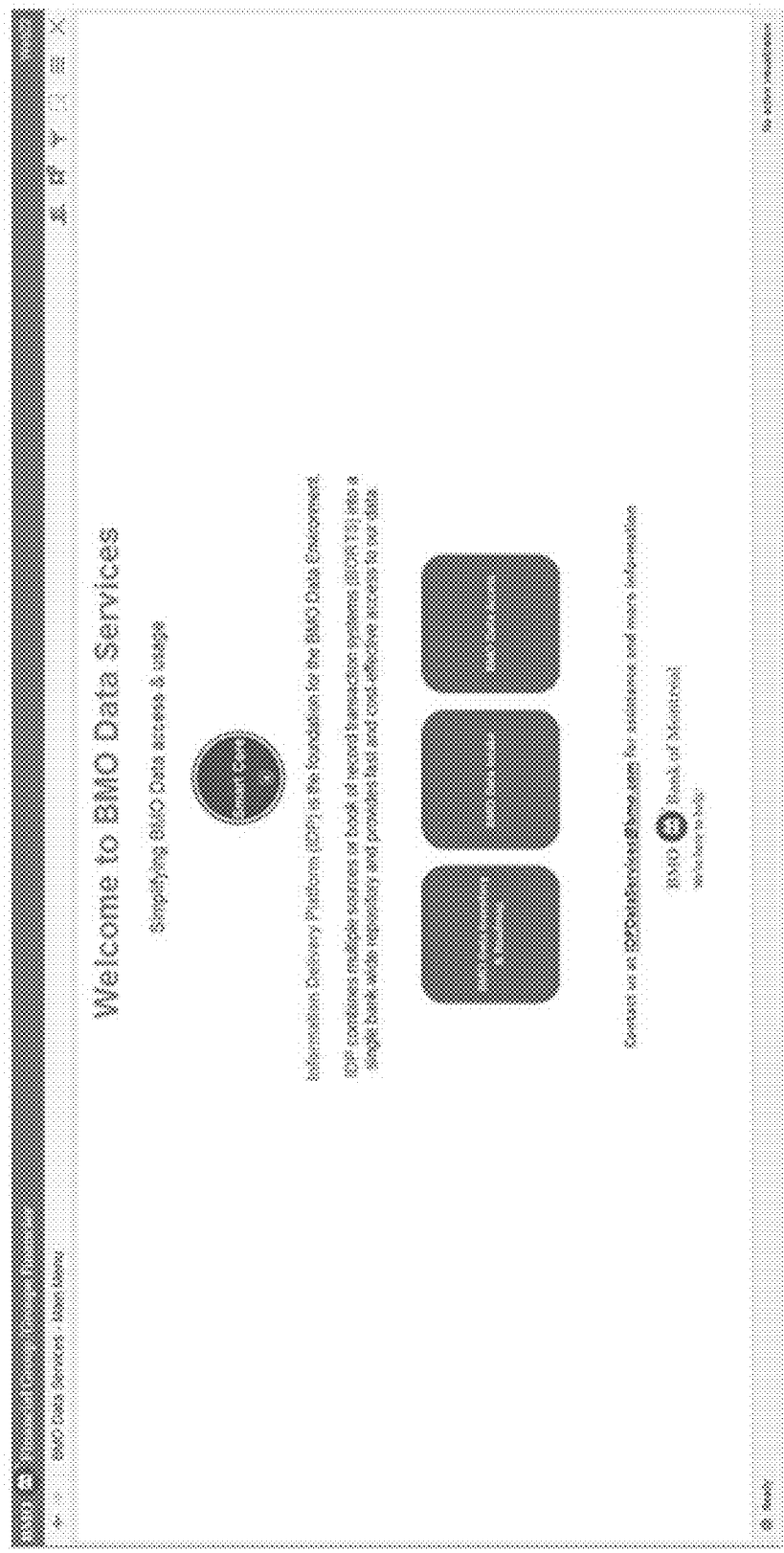

FIG. 33 shows an example webpage for an example Financial Group.

Figure 34:
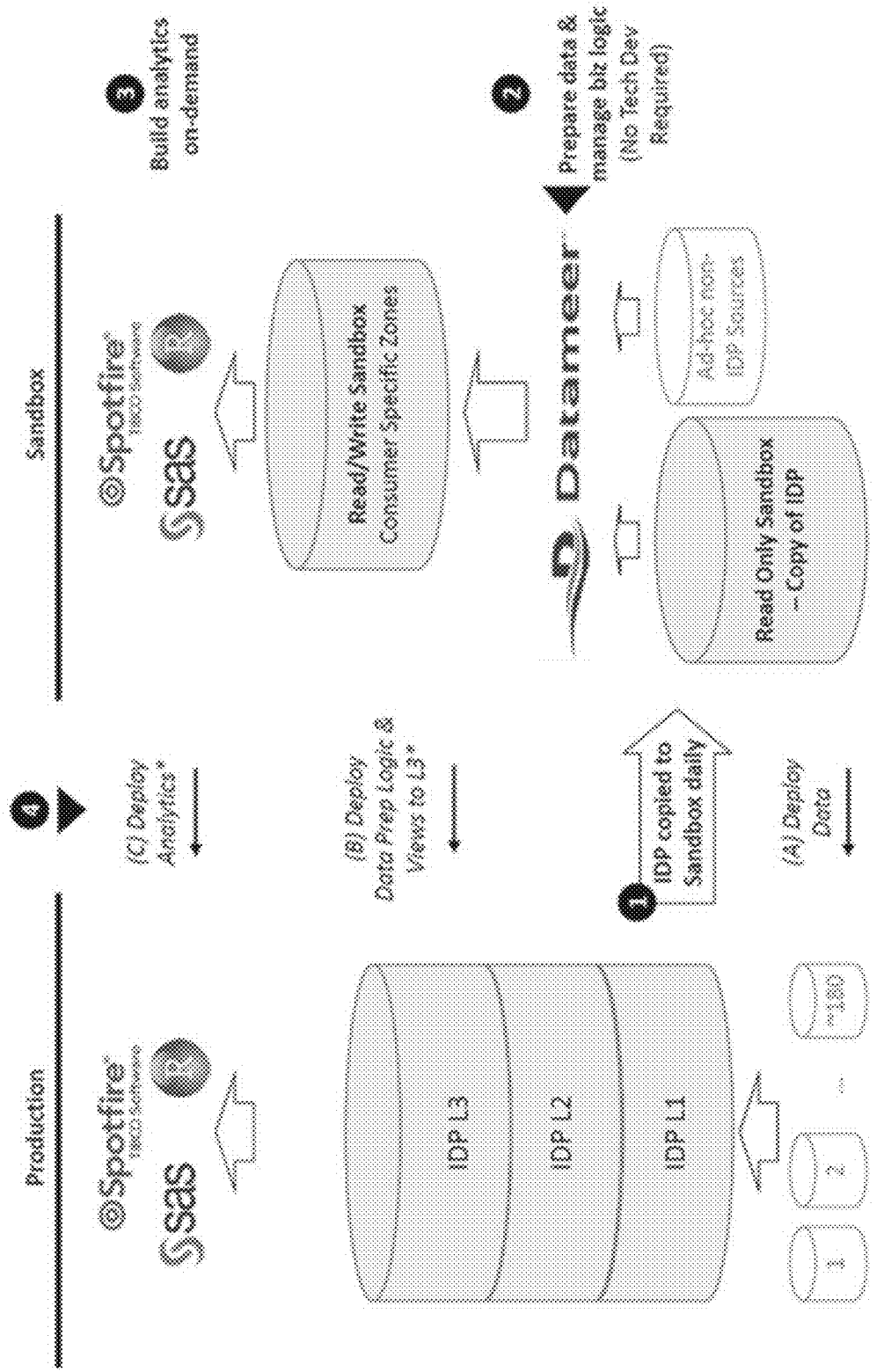

FIG. 34 shows the standard process for self-service data access, preparation, reporting/analytics, and promotion to production.

Figure 35:
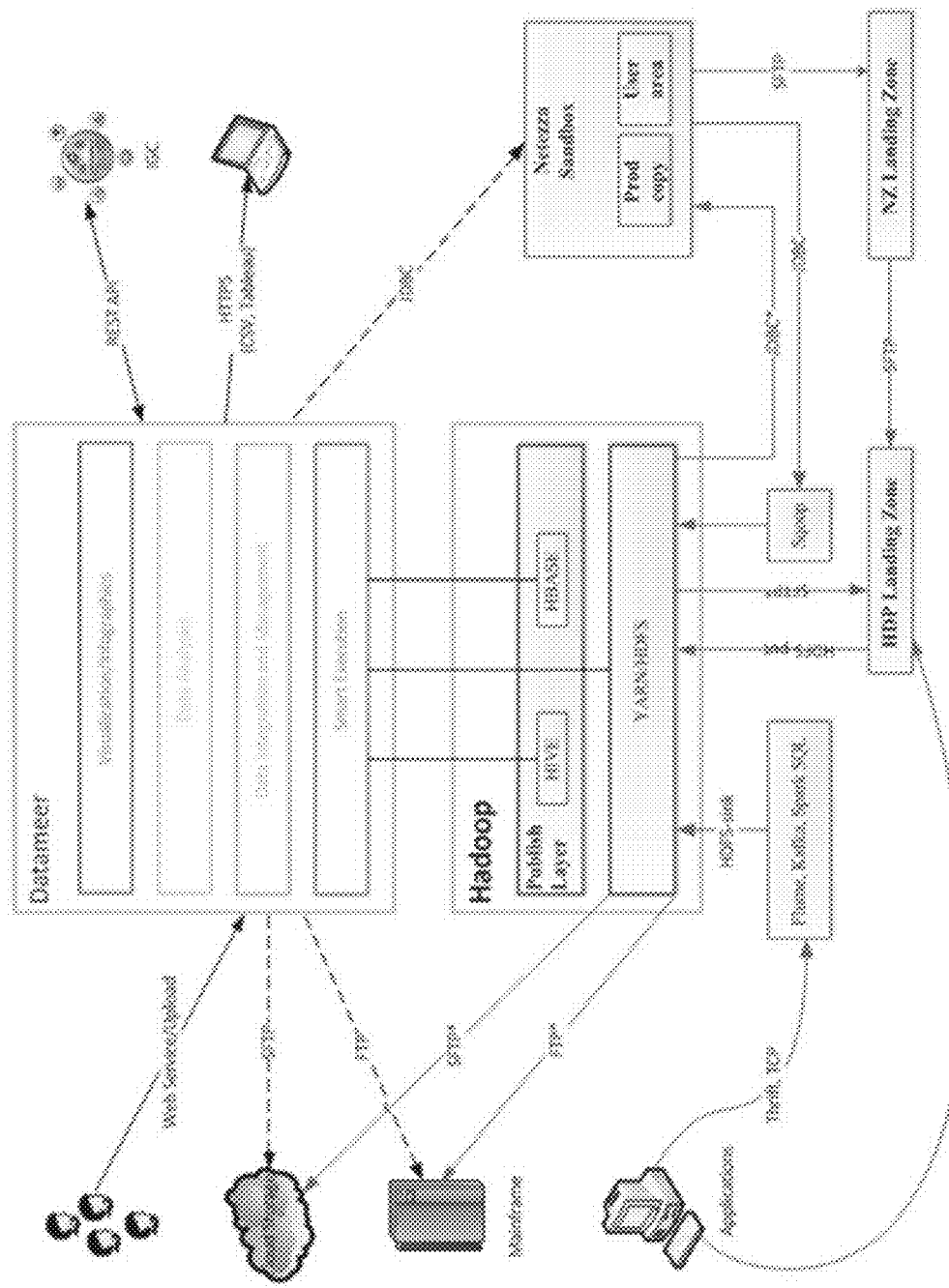

FIG. 35 shows an example IDP Integration-Logical Architecture.

Figure 36:
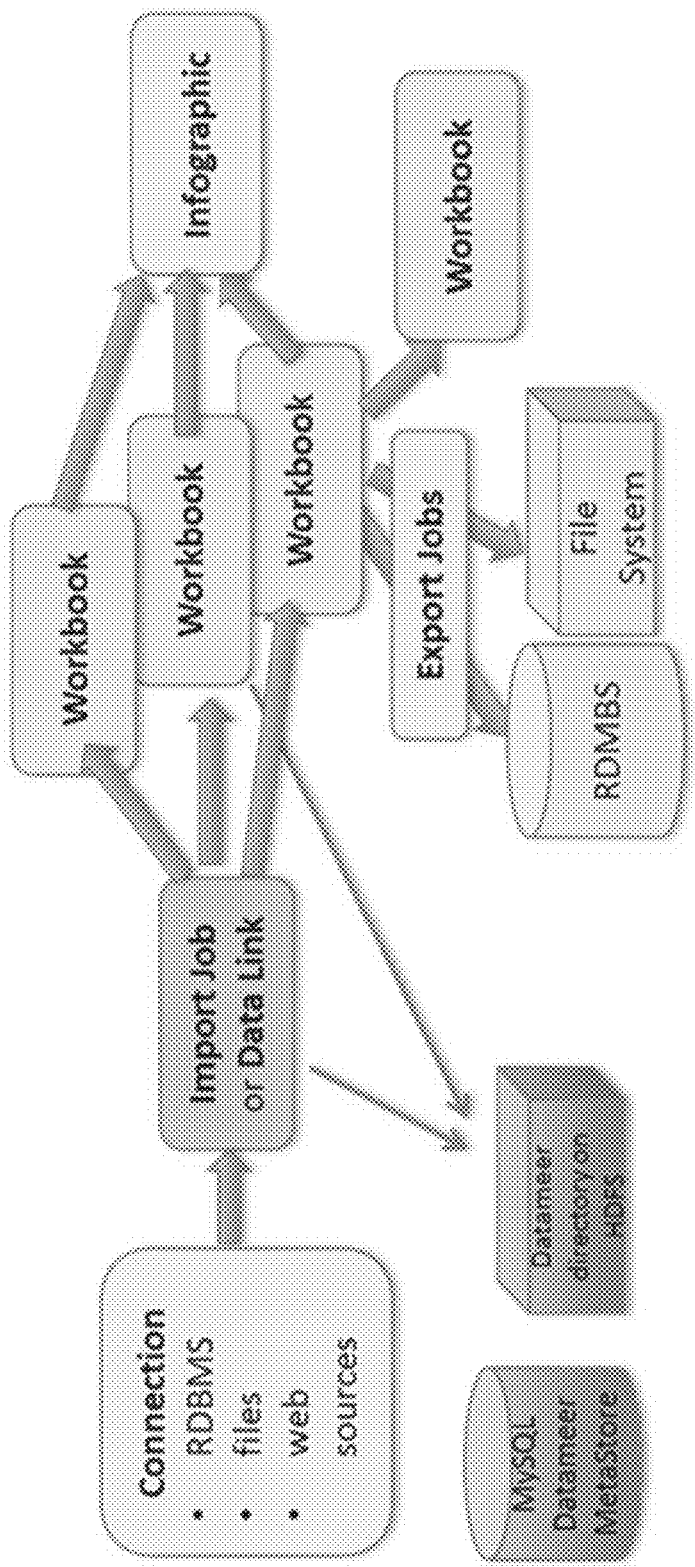

FIG. 36 shows am example IDP Logical Architecture-Objects Workflow.

Figure 37:
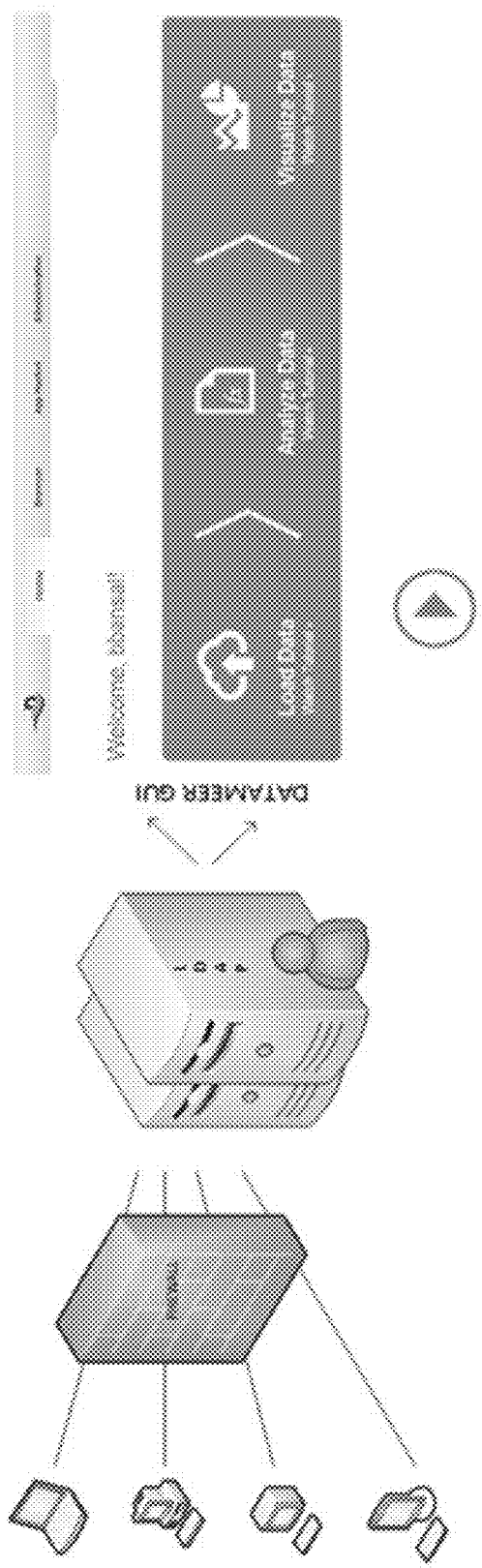

FIG. 37 shows example Authentication and Authorization.

Figure 38:
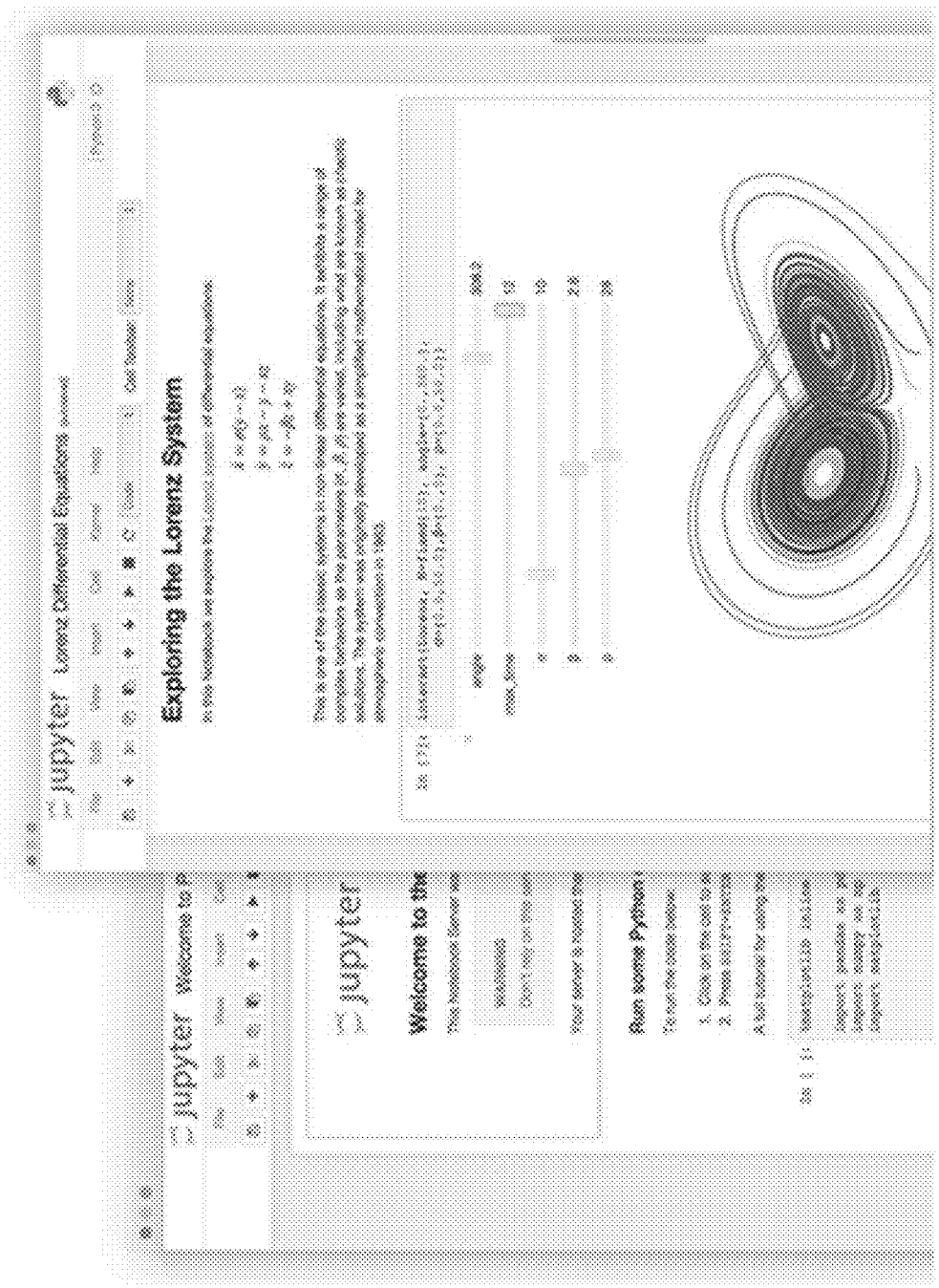

FIG. 38 shows Collaborative Data Exploration.

Figure 39:
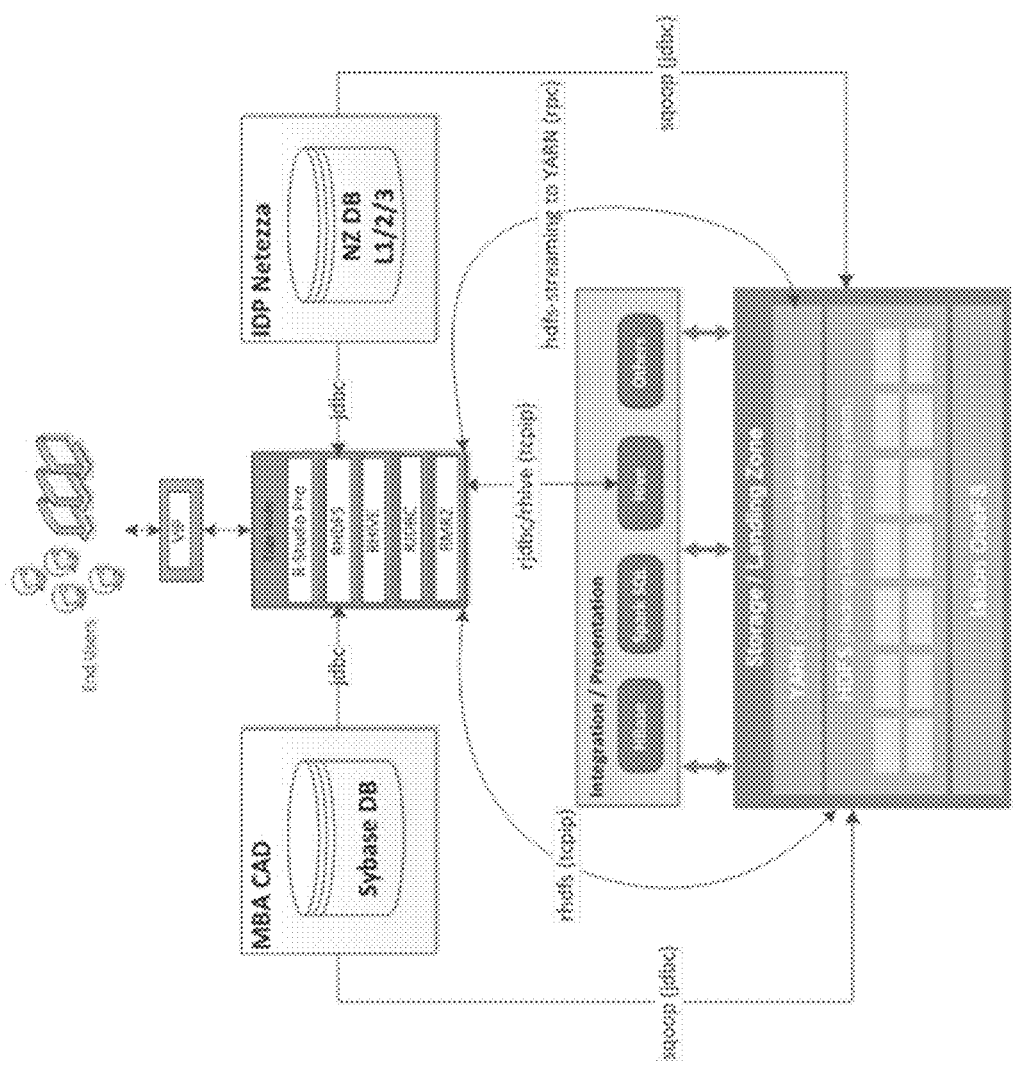

FIG. 39 shows an example logical architecture of IDP.

Figure 40:
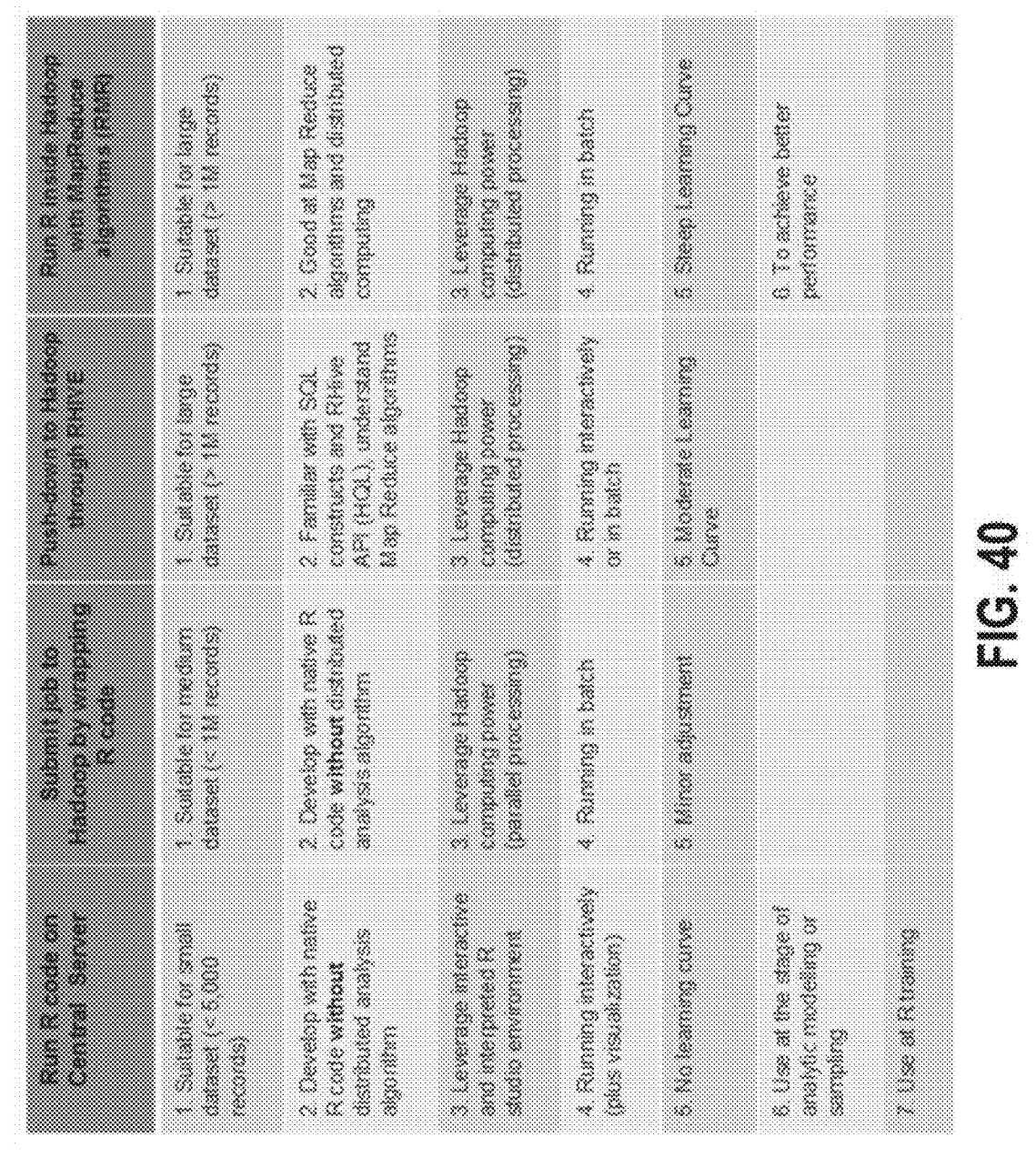

FIG. 40 shows example advantages of IDP.

Figure 41:
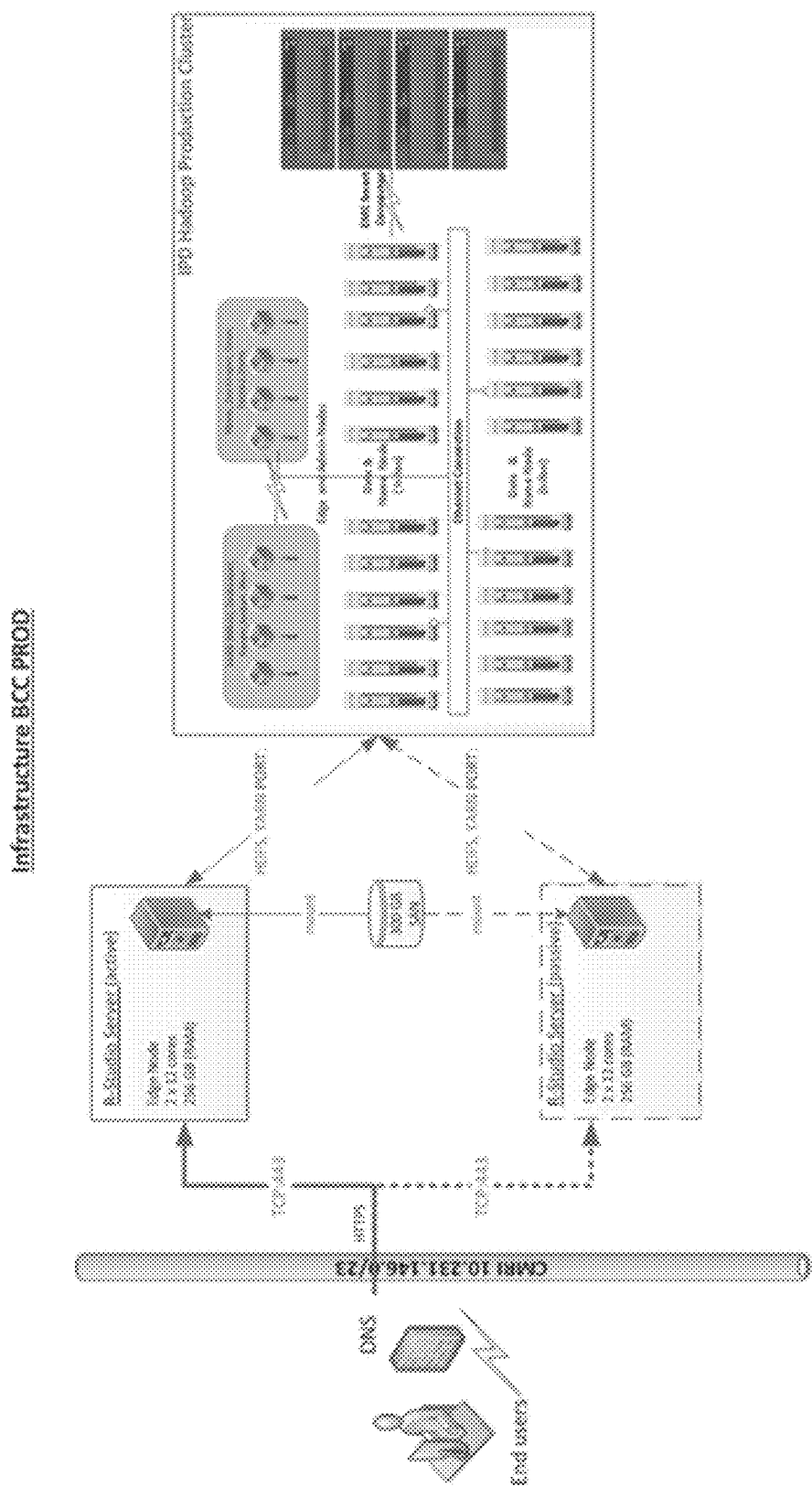

FIG. 41 shows example IDP-Production Physical Architecture.

Figure 42:
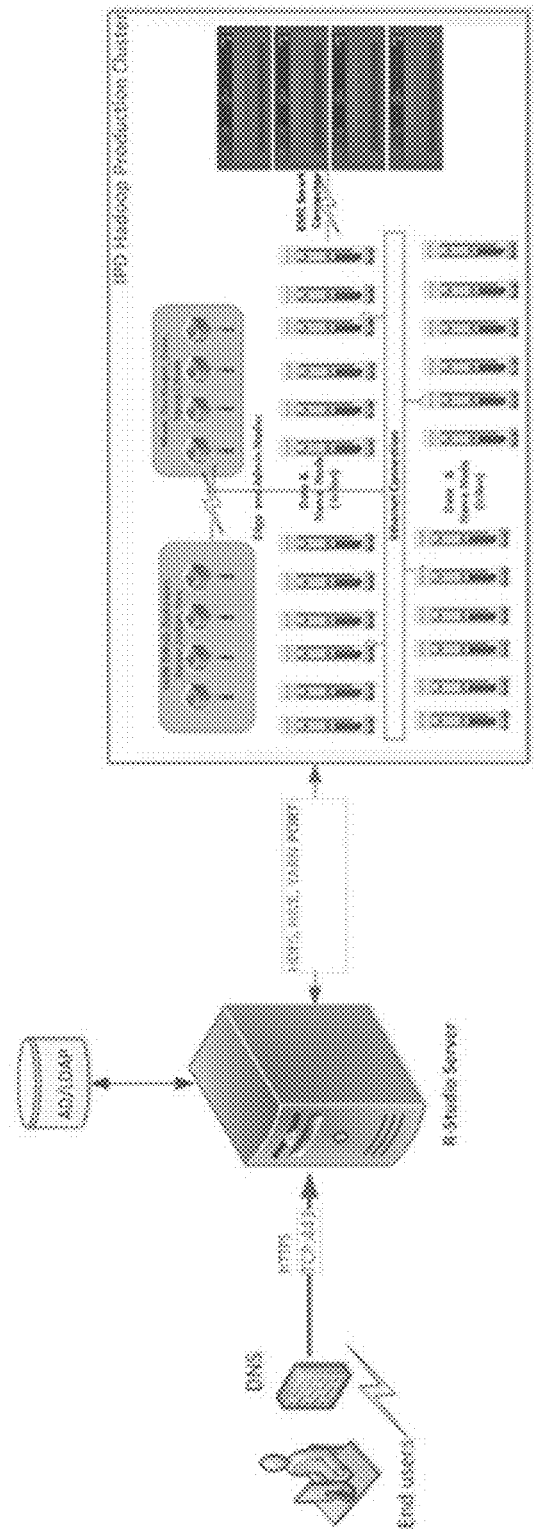

FIG. 42 shows example authentication and authorization scheme.

Figure 43:
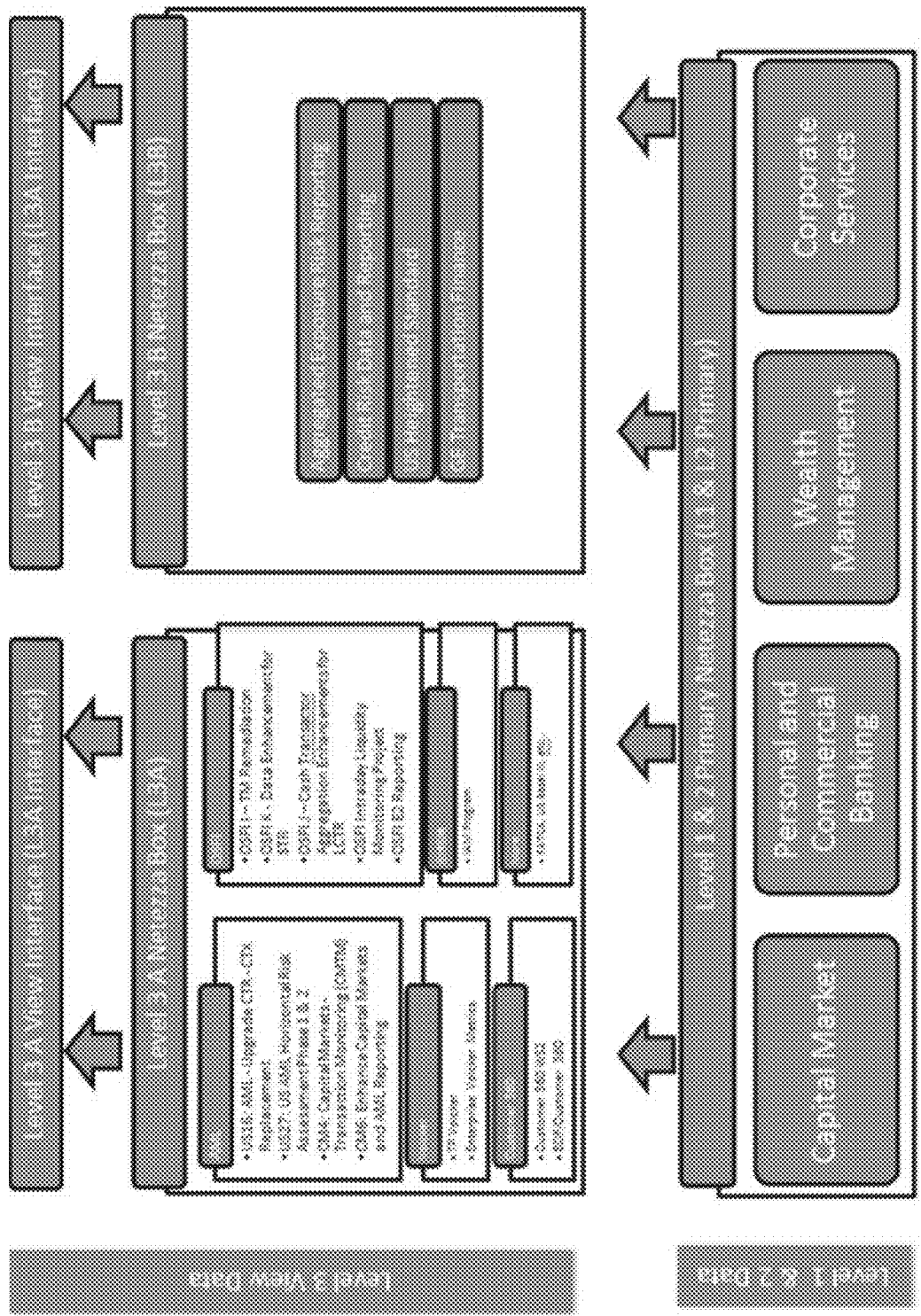

FIG. 43 shows example production data flows of IDP.

Figure 44:
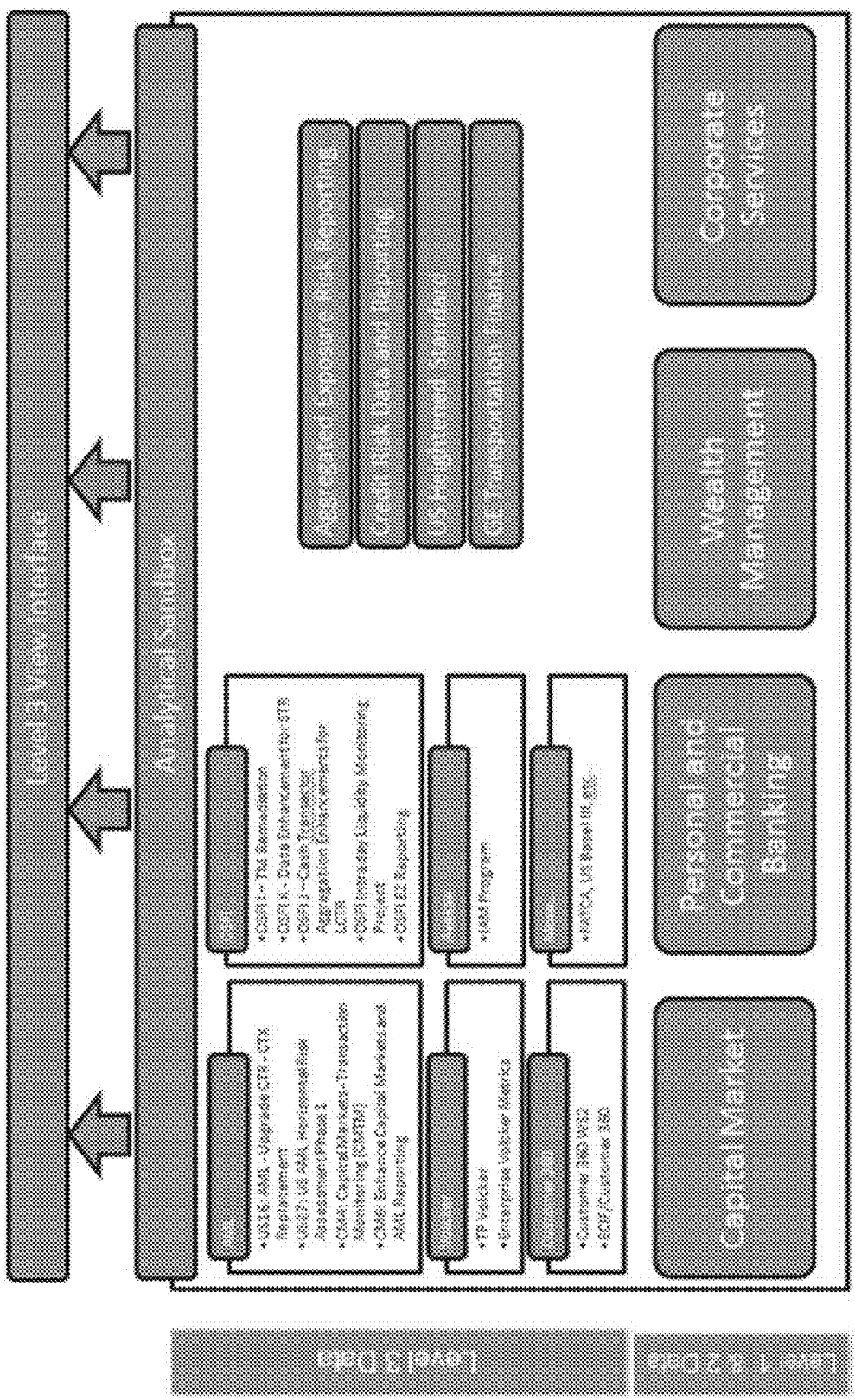

FIG. 44 shows example sandbox data flows of IDP.

Figure 45:
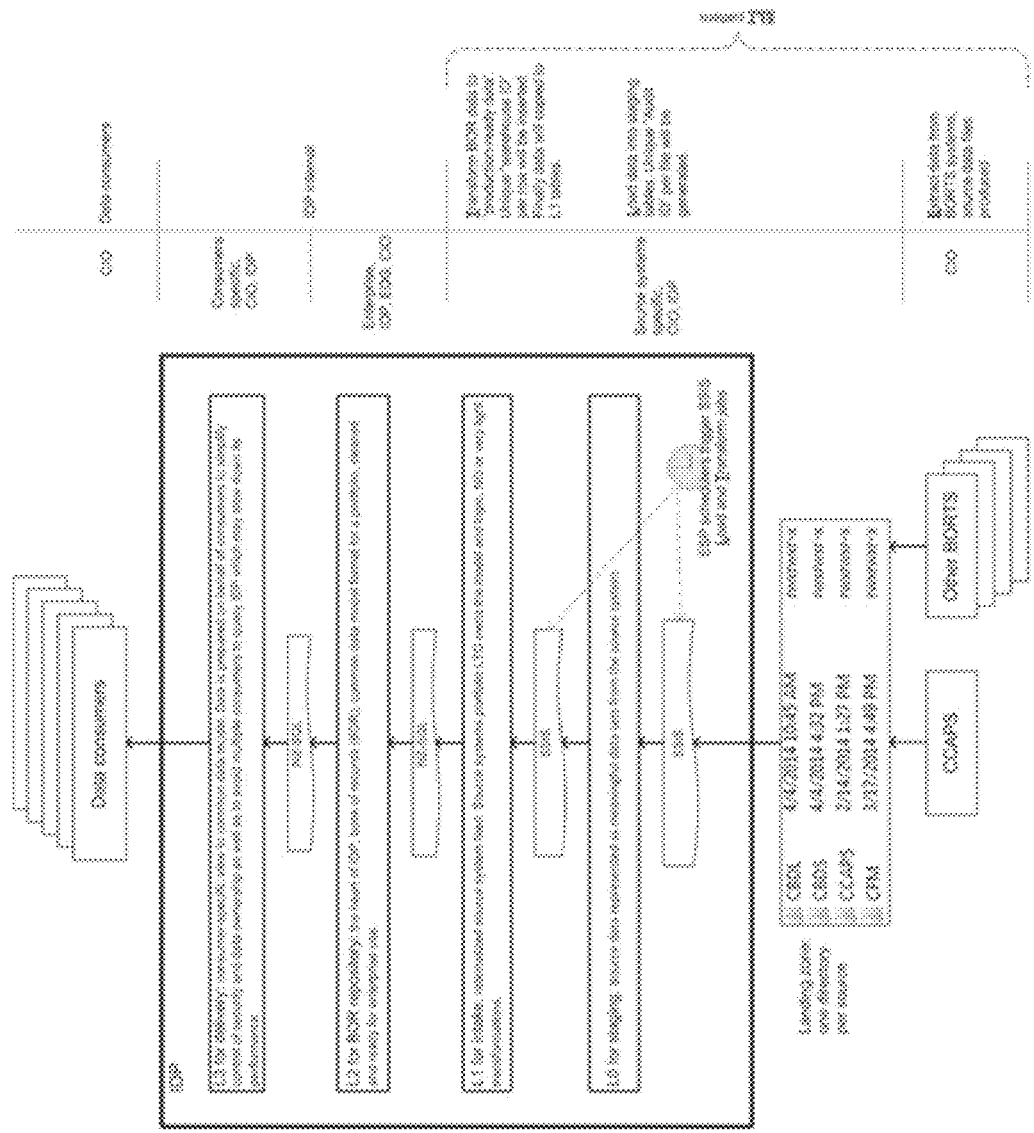

FIG. 45 shows example IDP Physical Architecture, illustrating L0 to L3 data flow.

Figure 46:
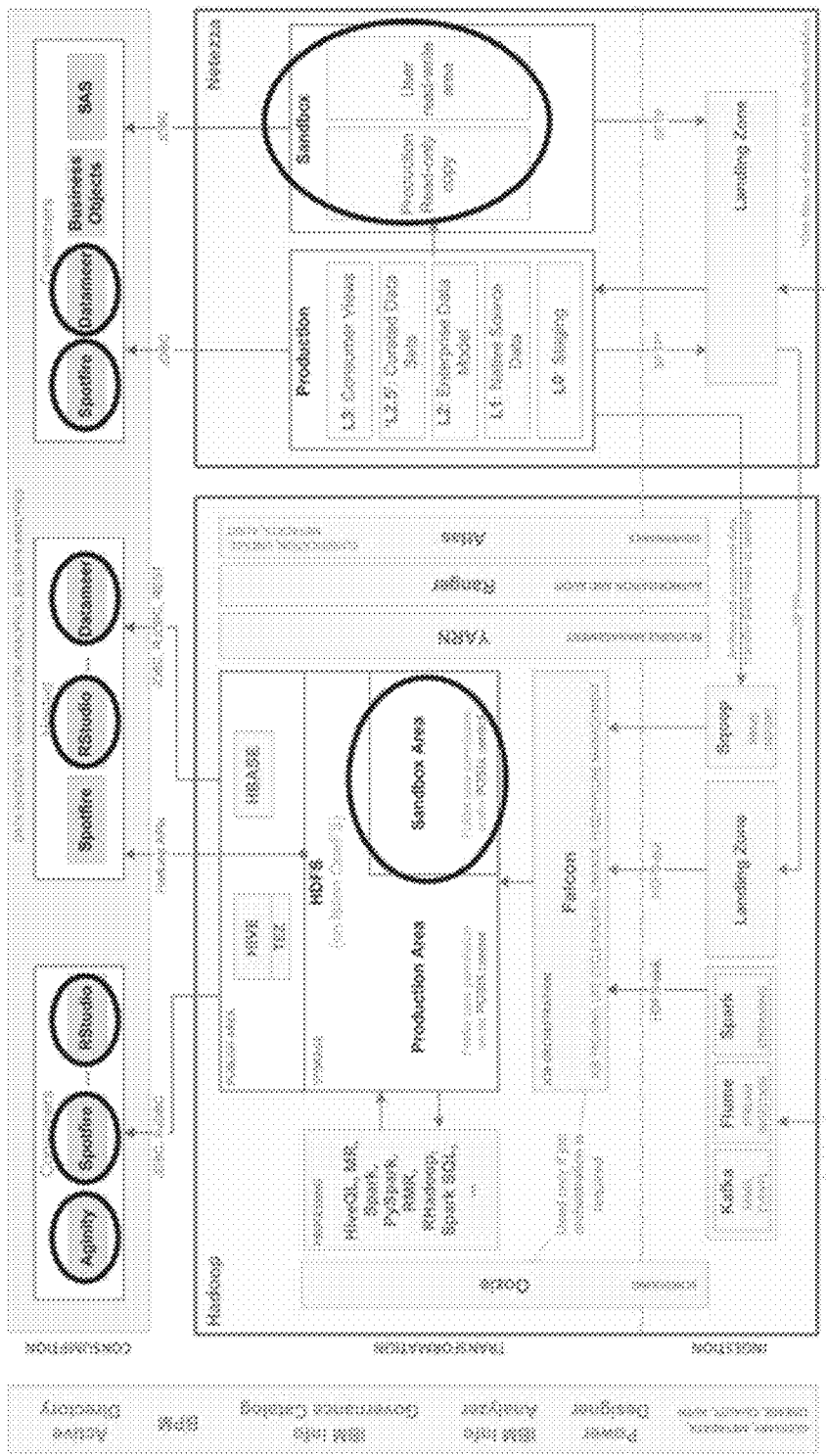

FIG. 46 shows IDP sandbox environments for self-serve computational analysis.

Figure 47:
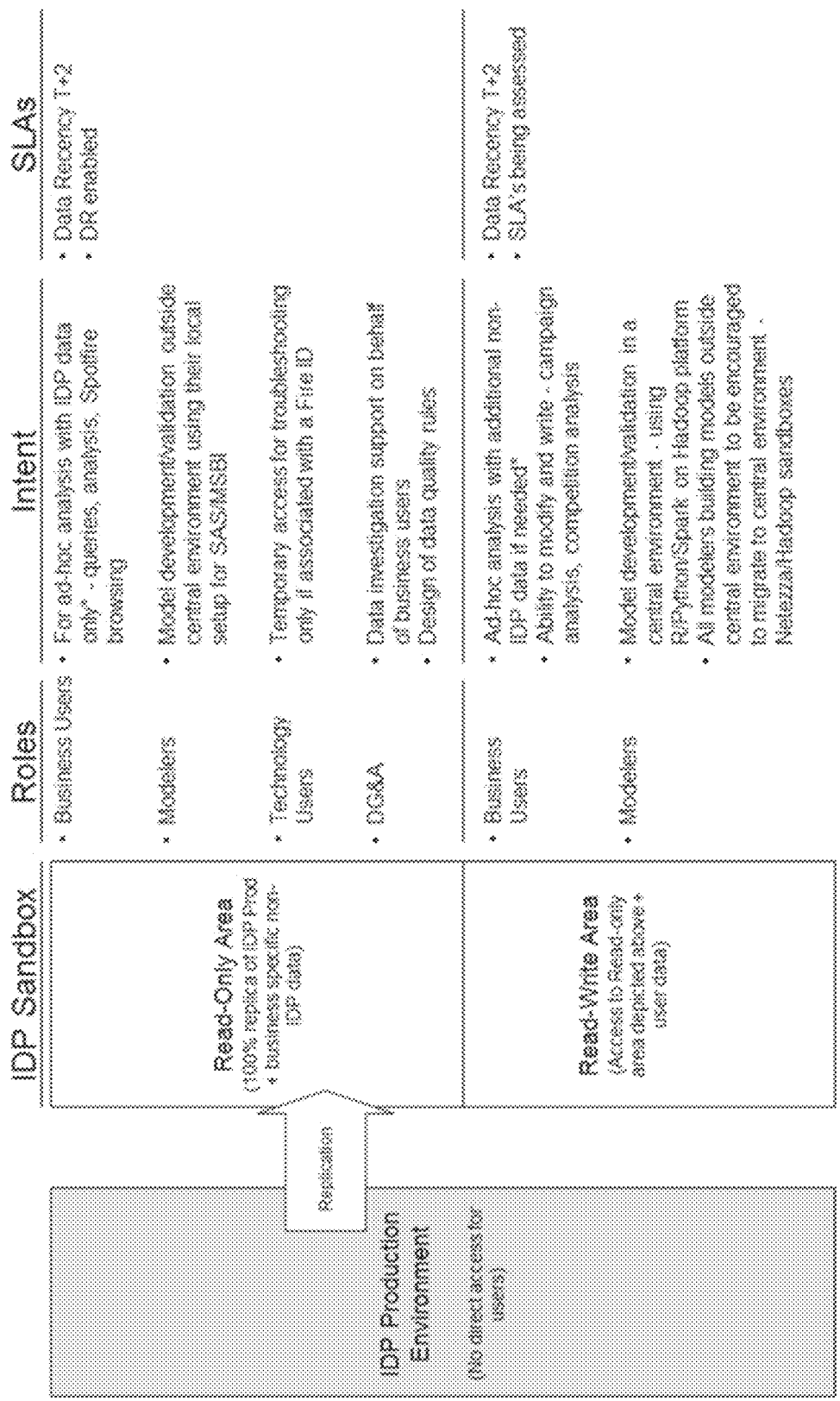

FIG. 47 shows IDP Sandbox Environment: R&R and SLA.

Figure 48:
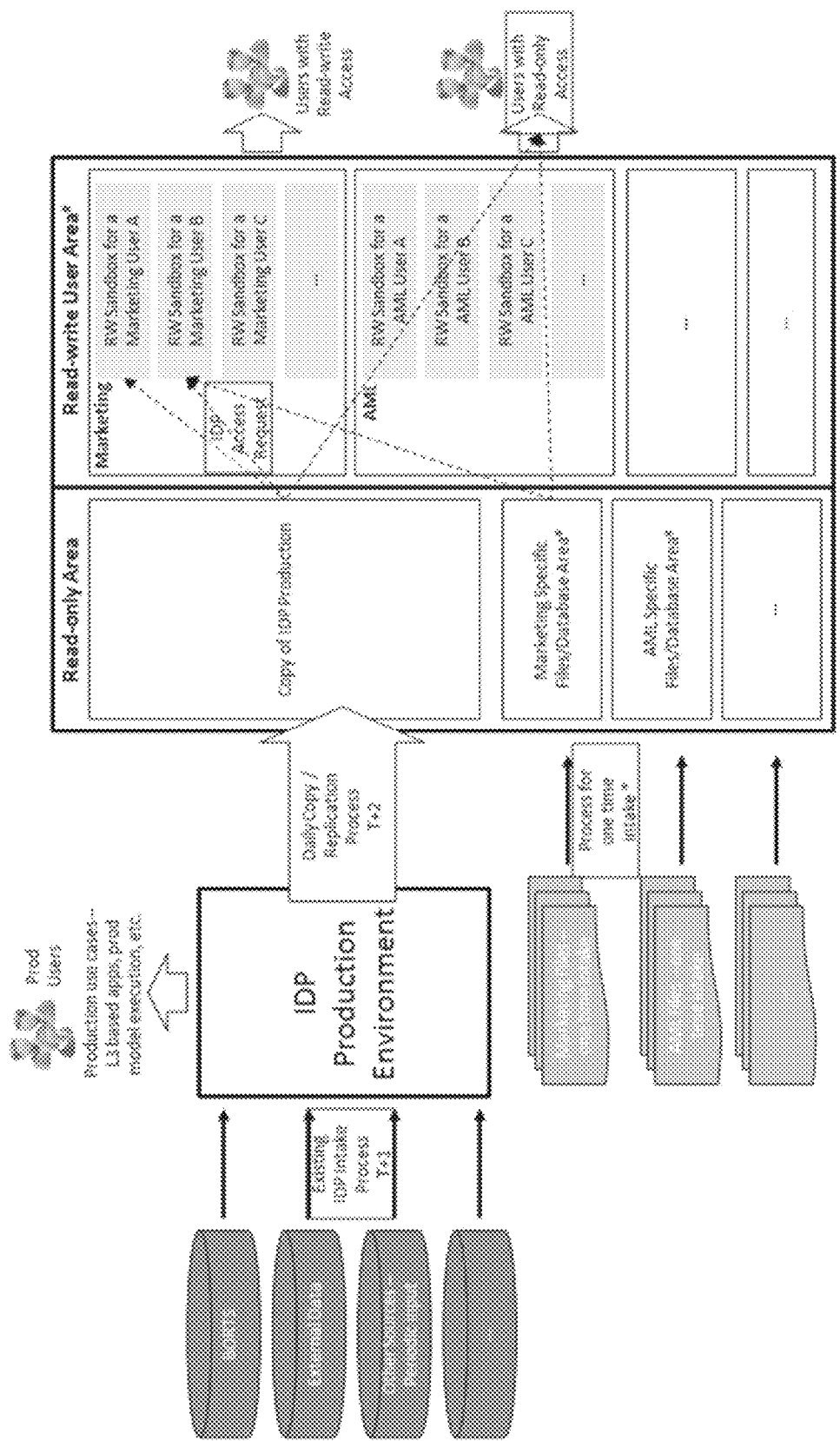

FIG. 48 shows Logical Architecture—IDP Sandbox Environment.

Figure 49:
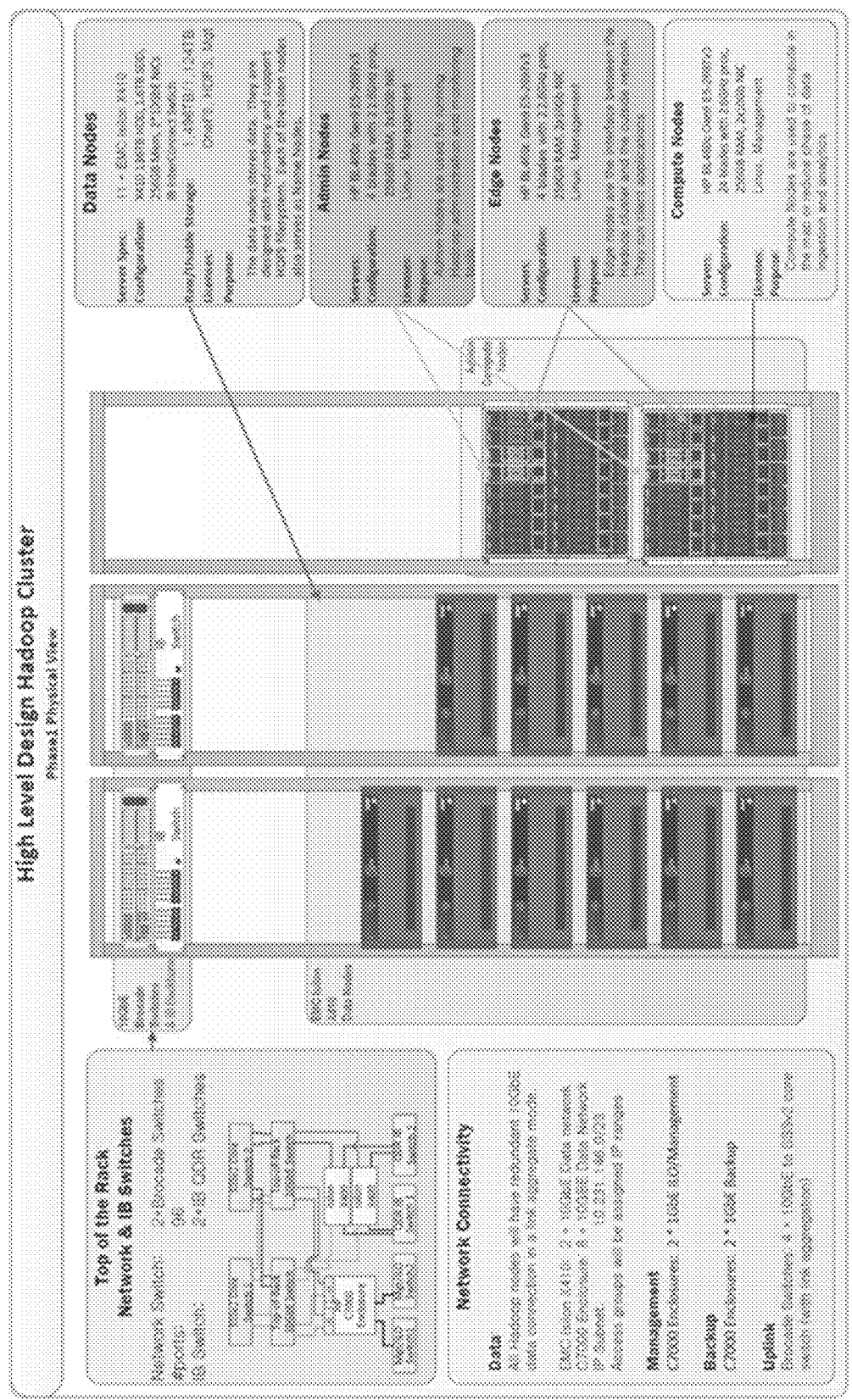

FIG. 49 shows an example physical architecture in production.

Figure 50:
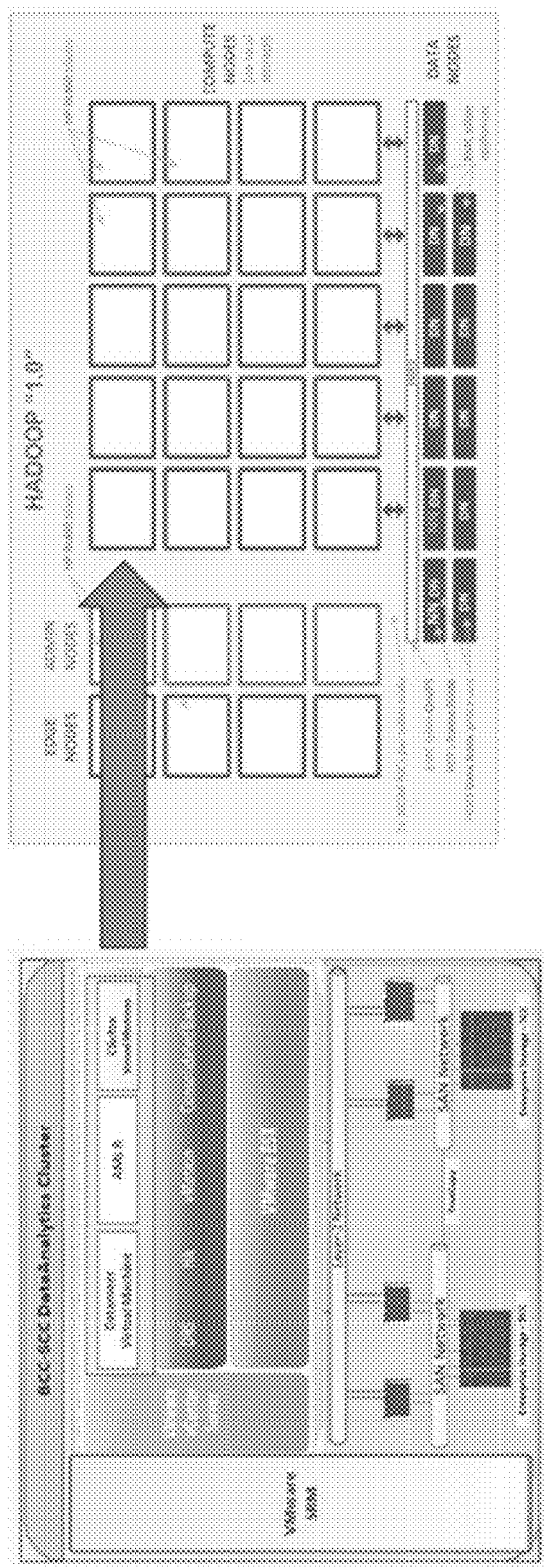

FIG. 50 shows example physical architecture with a focus on Consumer Apps.

FIG. 50 shows example edge nodes run on virtual machines.

Figure 51:
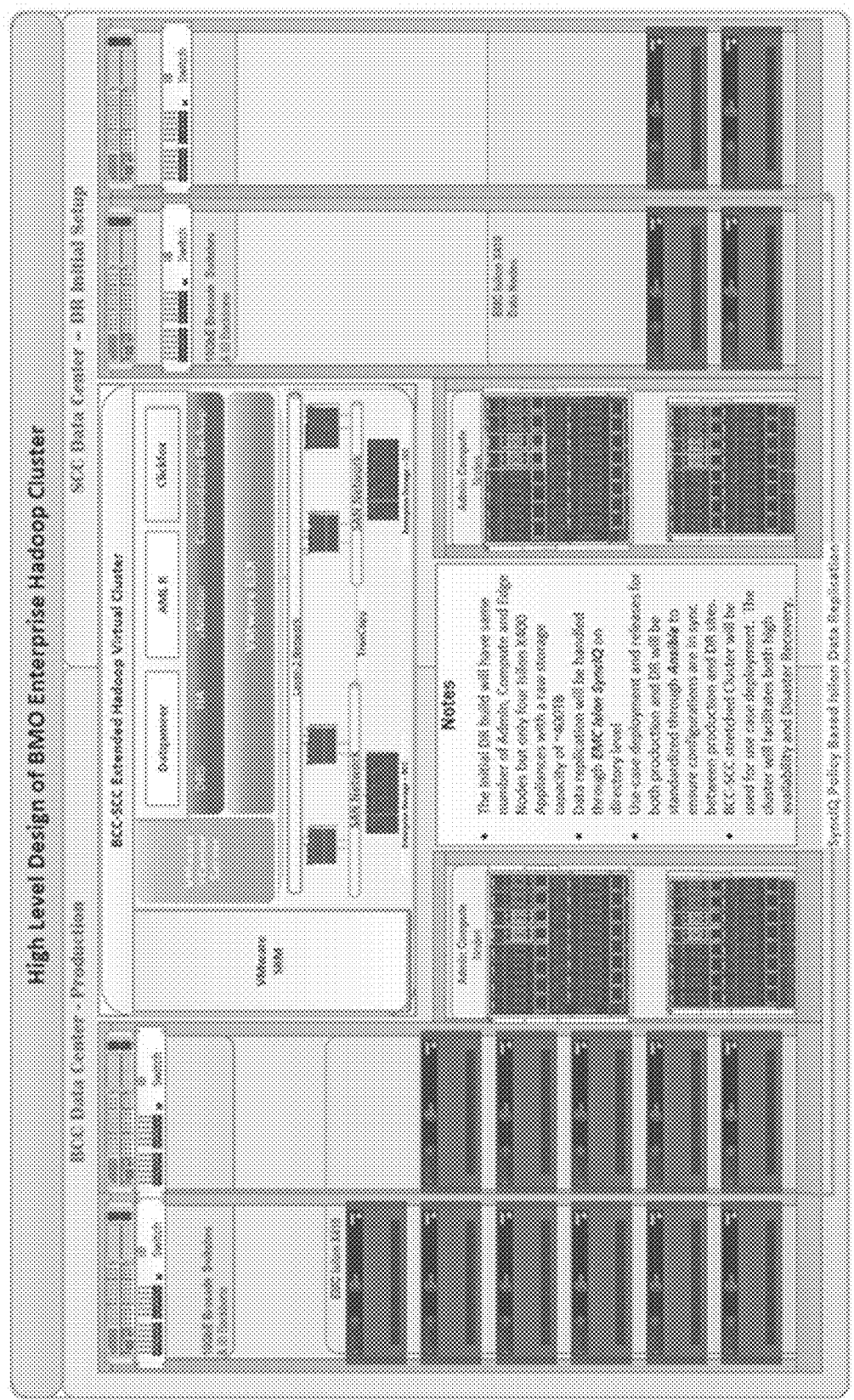

FIG. 51 shows example physical architecture with a focus on Disaster Recovery (DR).

Figure 52:
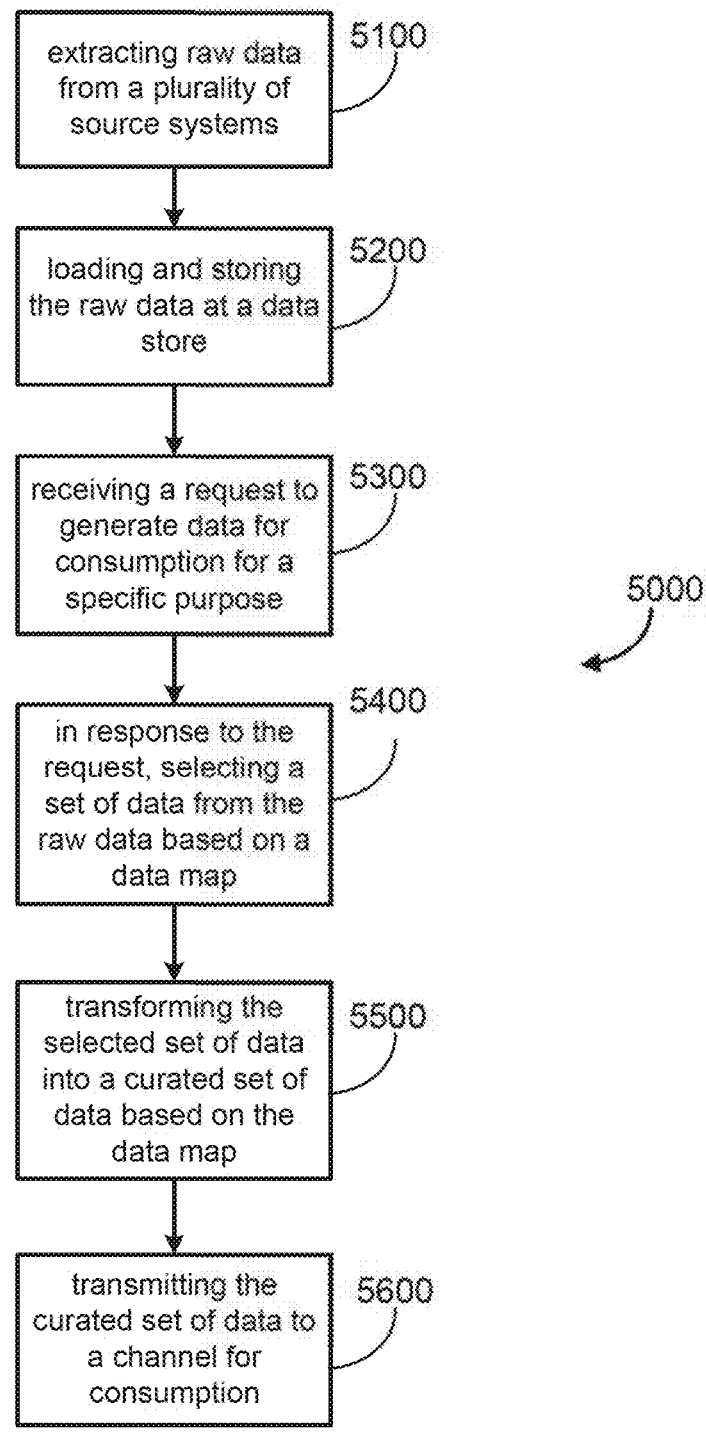

FIG. 52 illustrates an example method of data extraction, loading and transformation in accordance with one embodiment.

Figure 53:
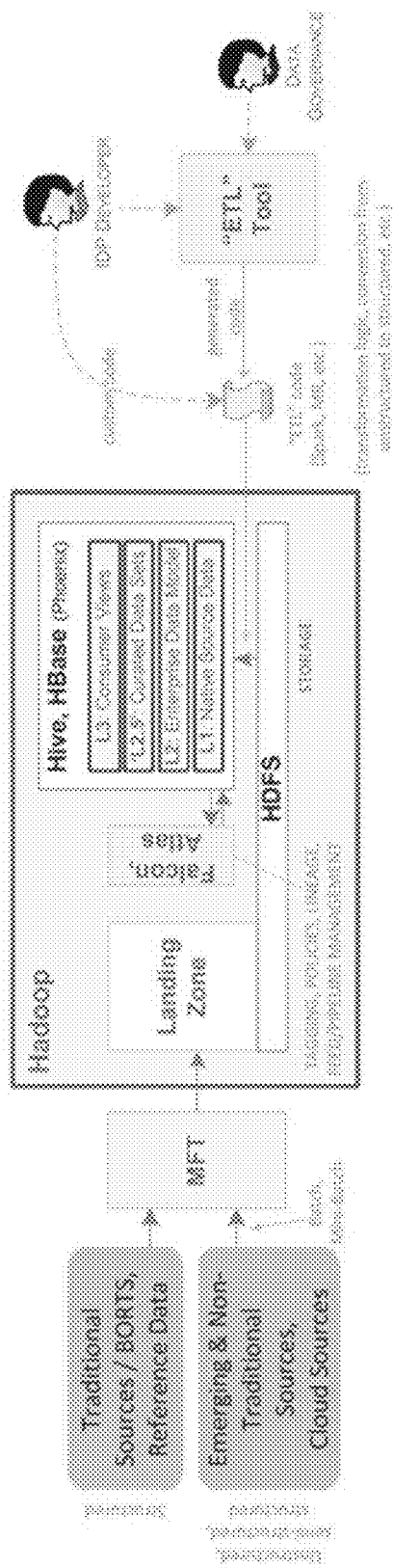

FIG. 53 shows both traditional sources and non-traditional sources of data transferring to a landing zone within the IDP through MFT (or SFTP).

Figure 54:
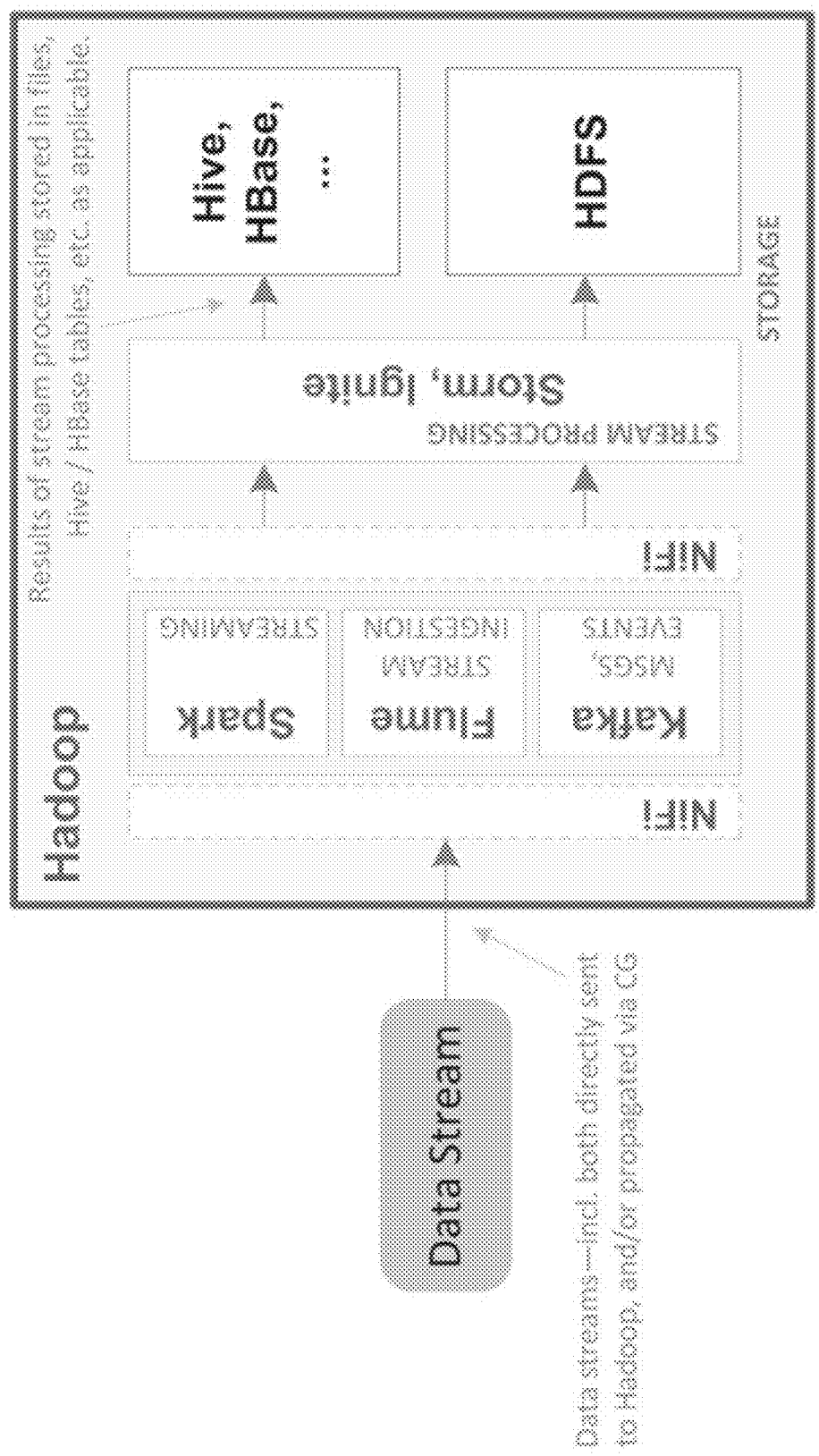

FIG. 54 shows IDP processing complex events ("stream processing").

Figure 55:
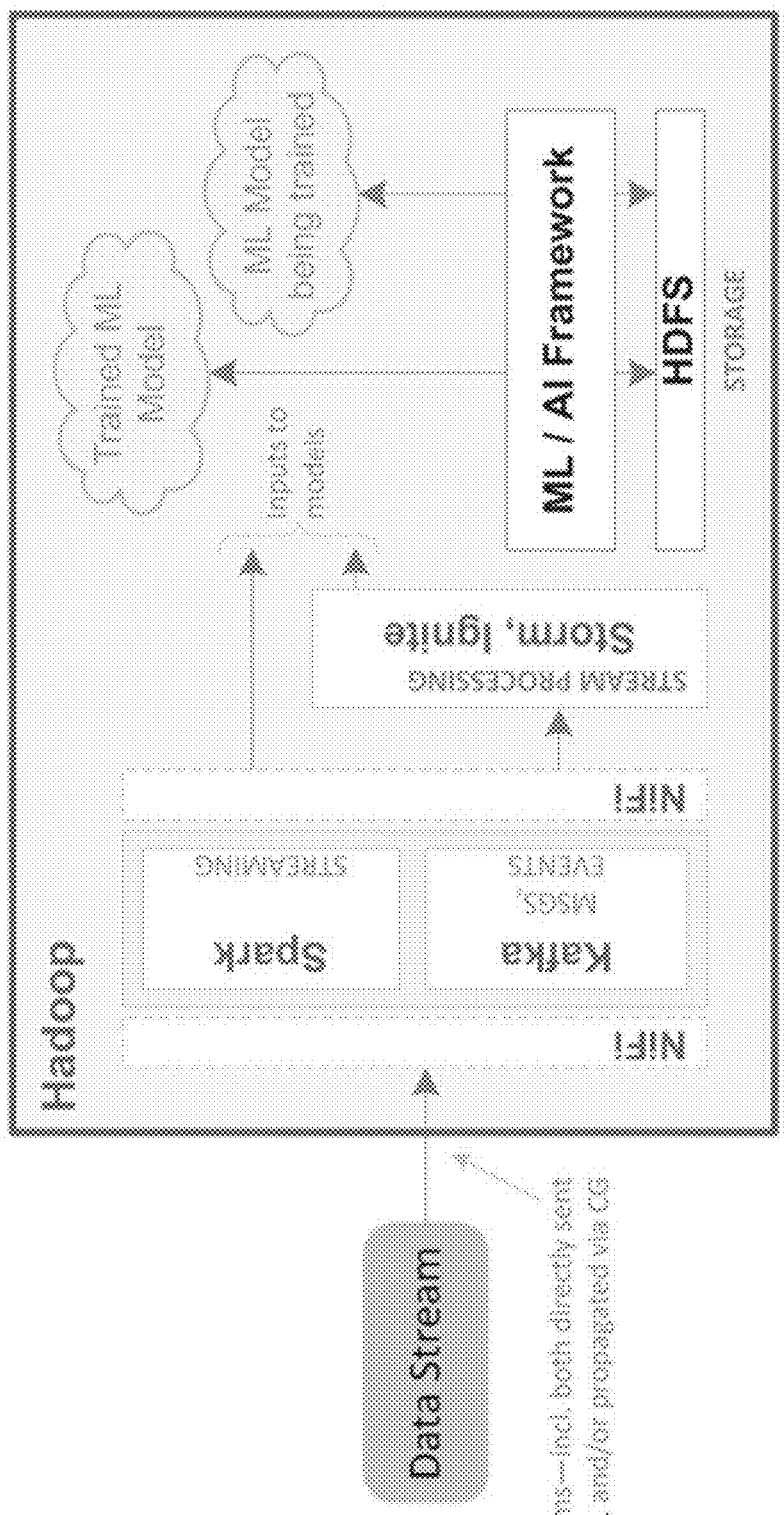

FIG. 55 shows IDP streaming data via machine learning.

Figure 56:
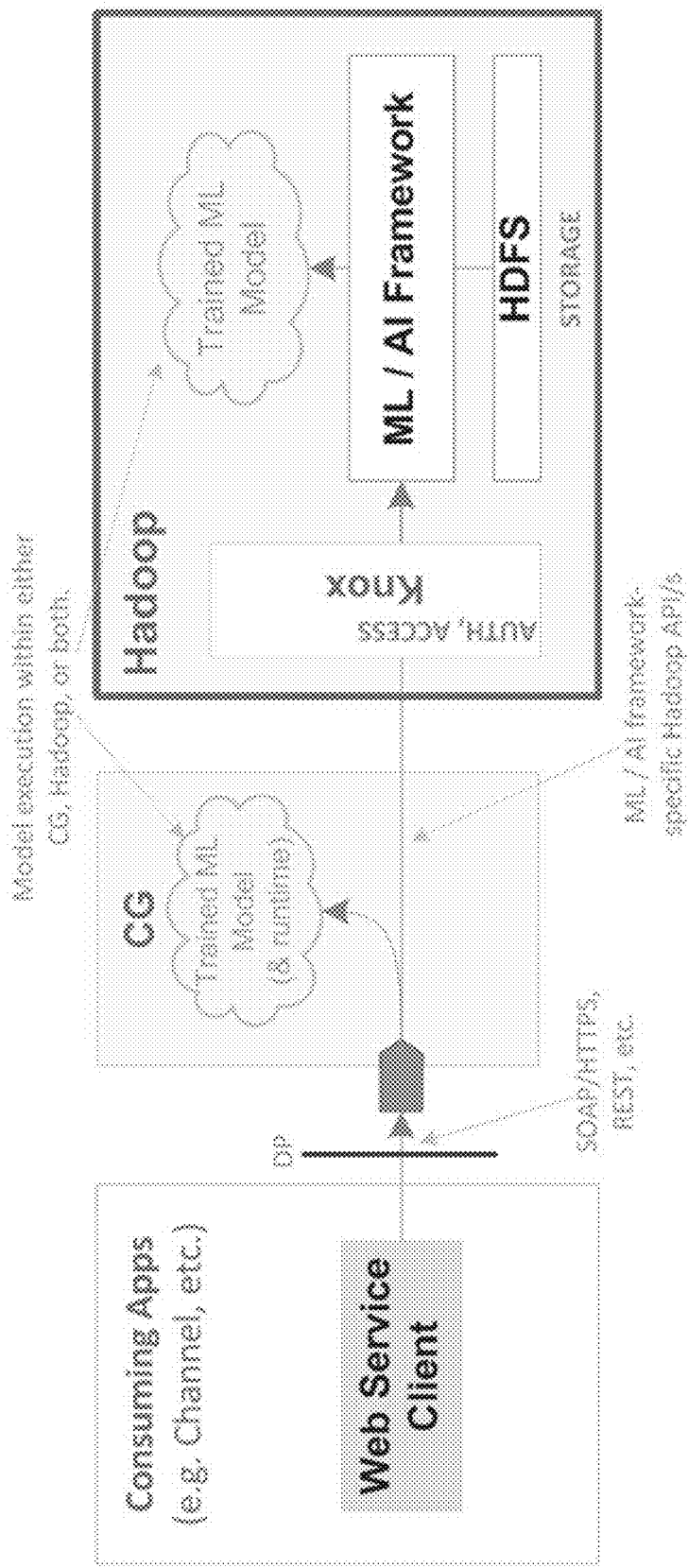

FIG. 56 shows IDP consuming data via connector grids (CG) and executing data models via machine learning.

Figure 57:
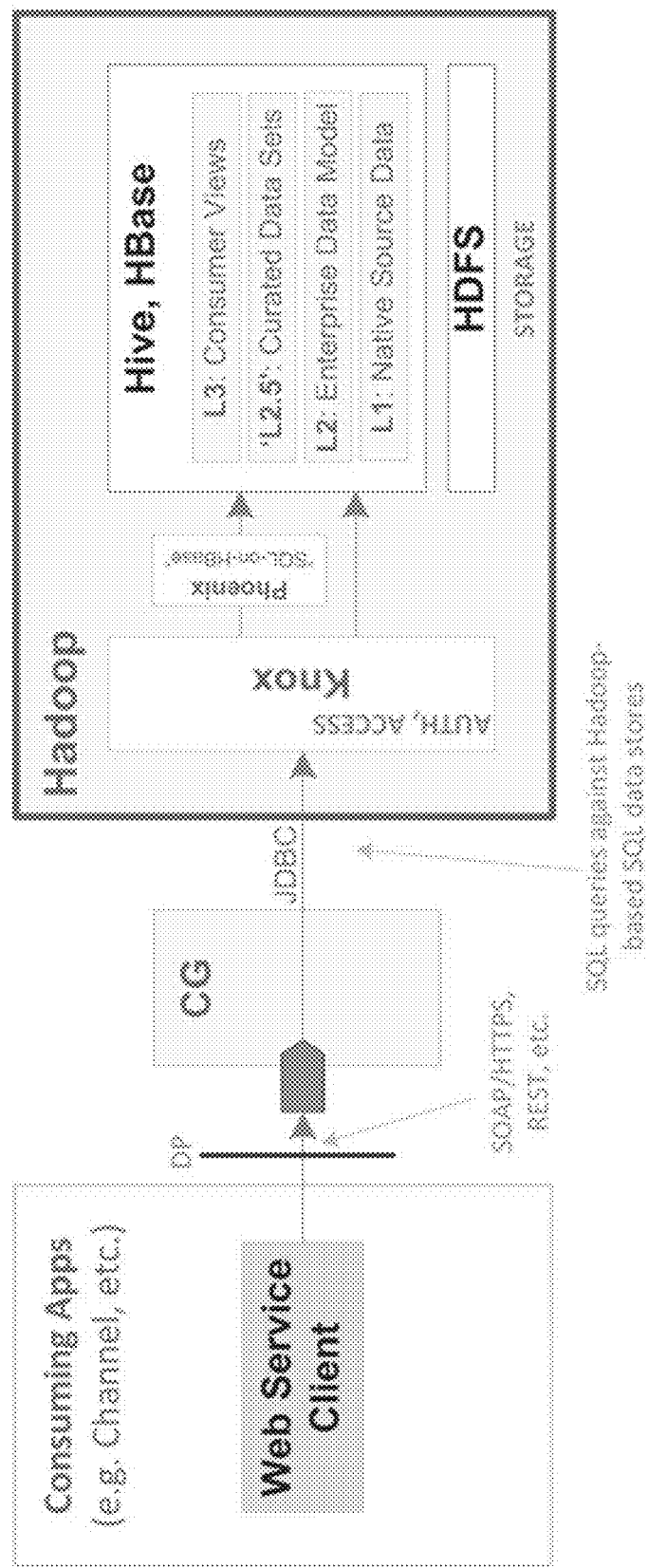

FIG. 57 shows IDP consuming data via connector grids (CG) and via SQL (JDBC).

Figure 58:
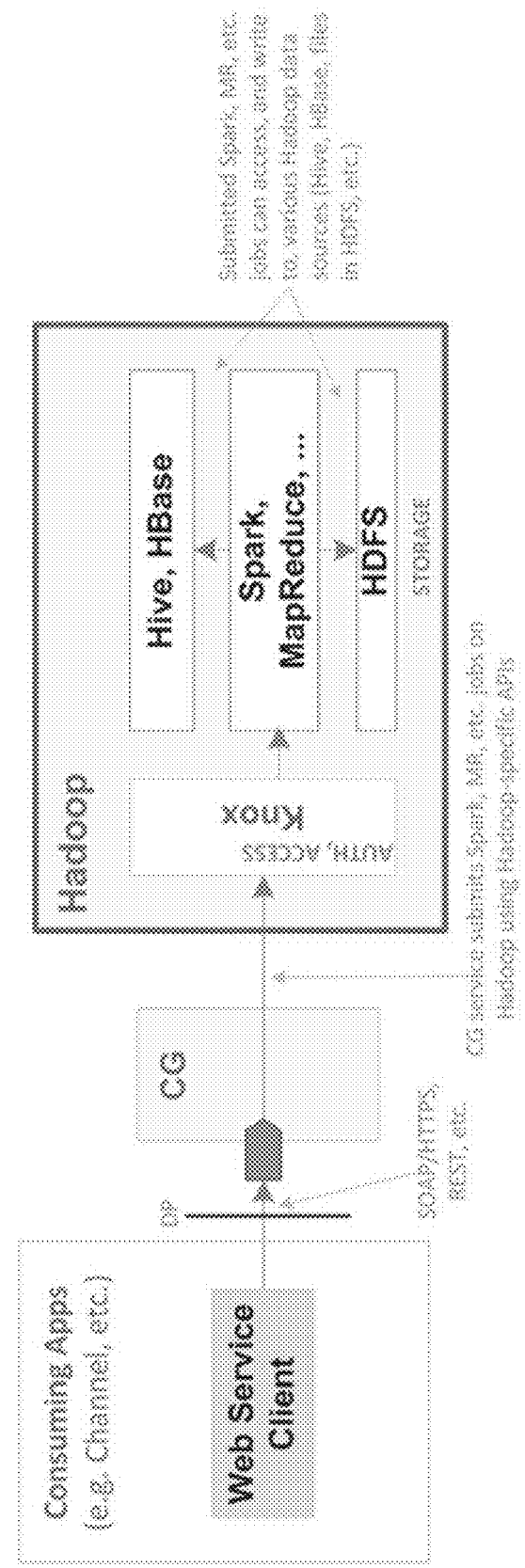

FIG. 58 shows IDP consuming data via connector grids (CG) and via API of a IDP.

Figure 59:
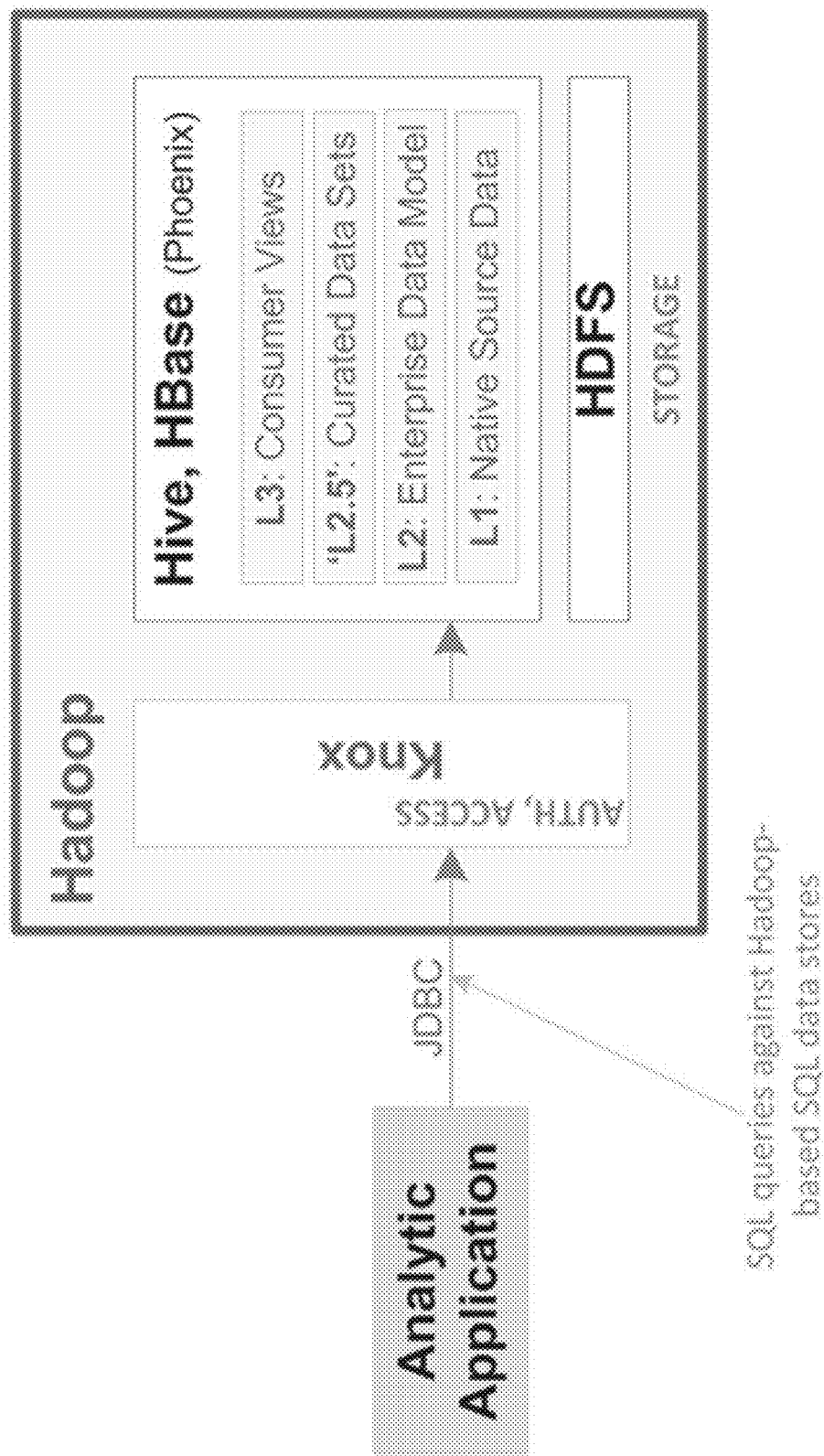

FIG. 59 shows analytic applications executing SQL queries against data stores.

Figure 60:
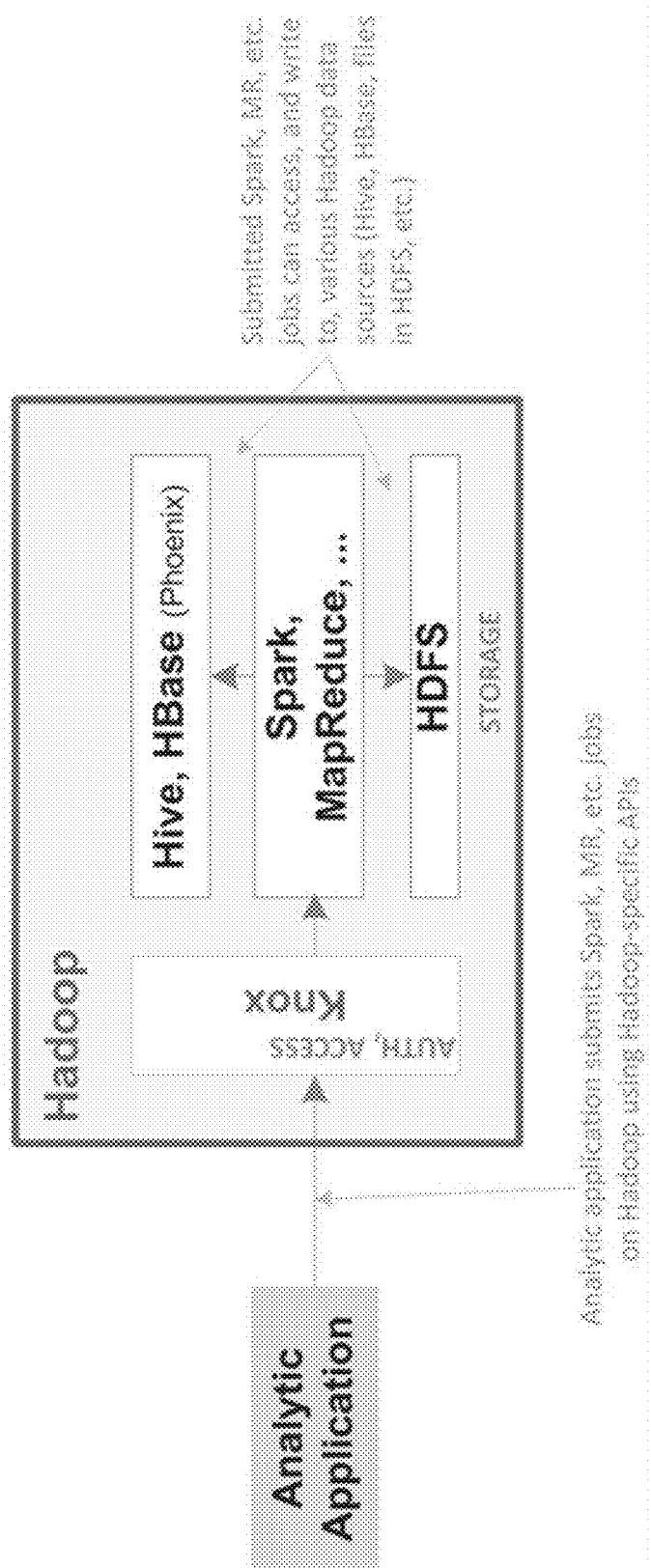

FIG. 60 shows analytic applications executing "queries" against stored data using APIs.

Figure 61:
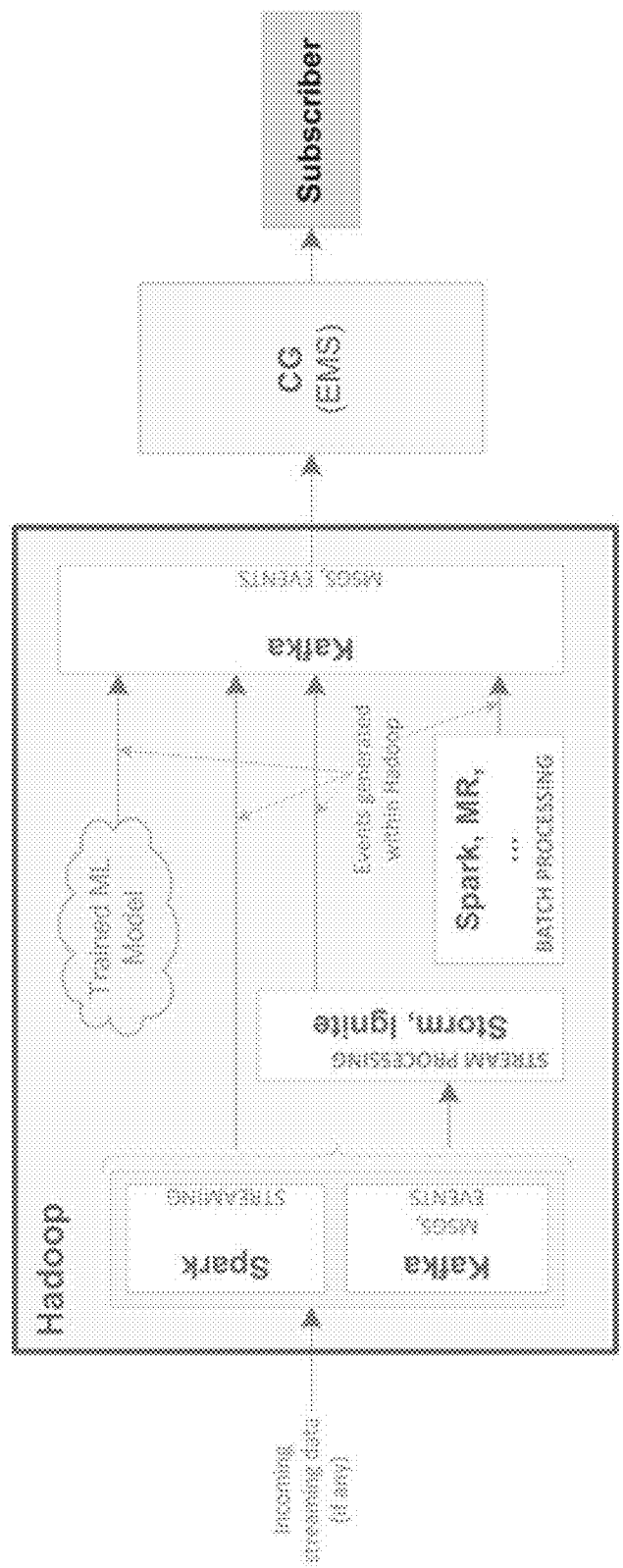

FIG. 61 shows event generation through Event via Connector Grid (CG).

Figure 62:
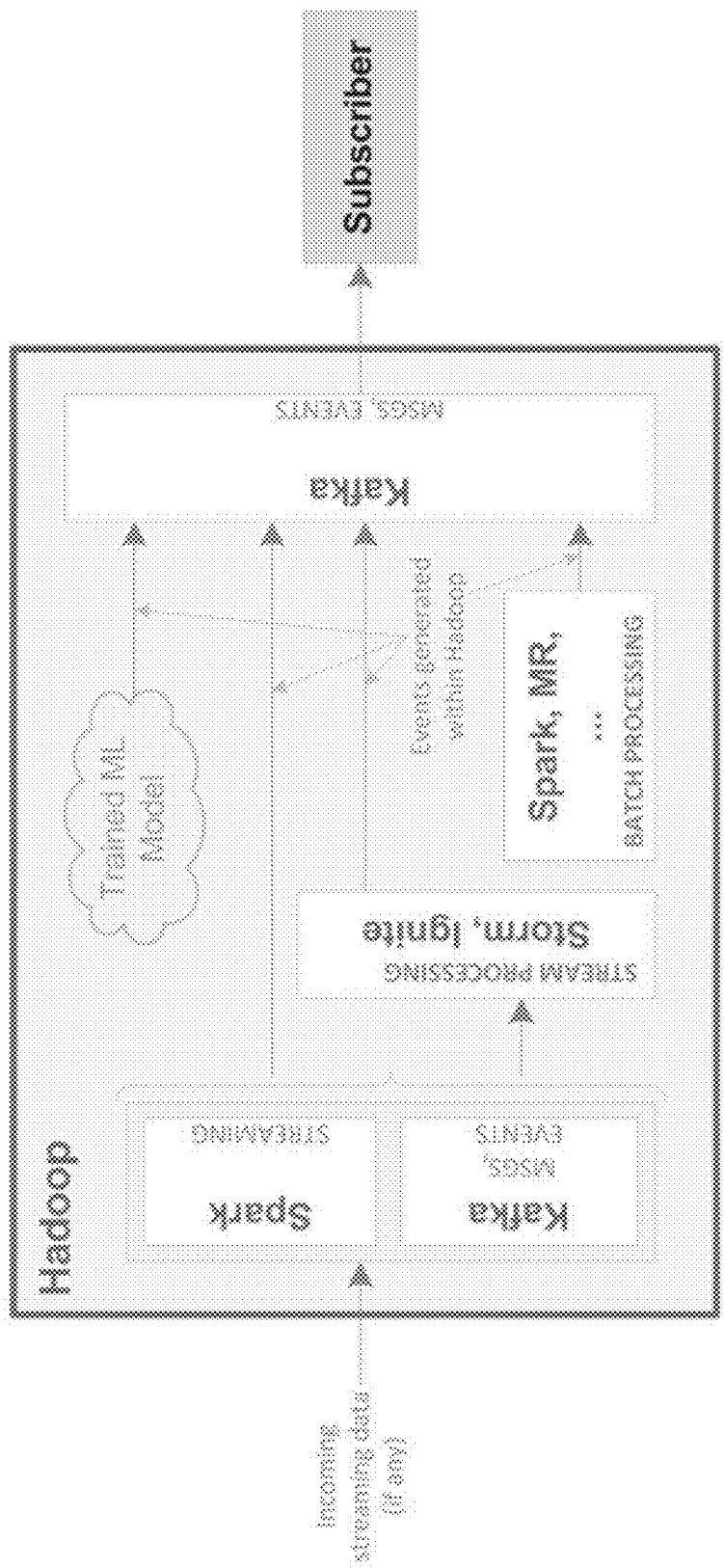

FIG. 62 shows event generation.

Figure 63:
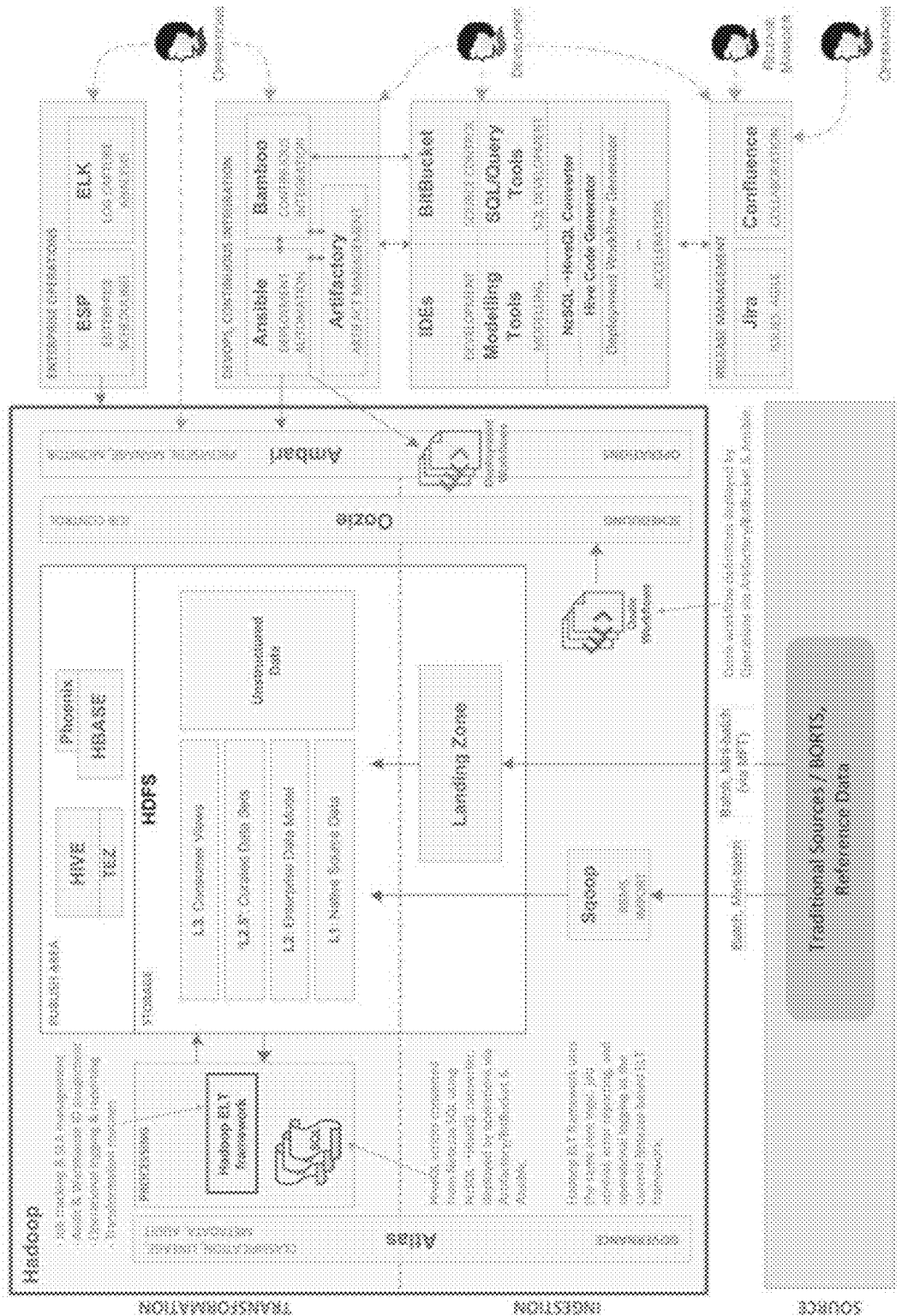

FIG. 63 is a schematic block diagram showing ELT jobs processed within IDP.

FIG. 64A for an example value chain of Book of Records and FIG. 64B for example value propositions for Book of Records repository.

Figure 65:
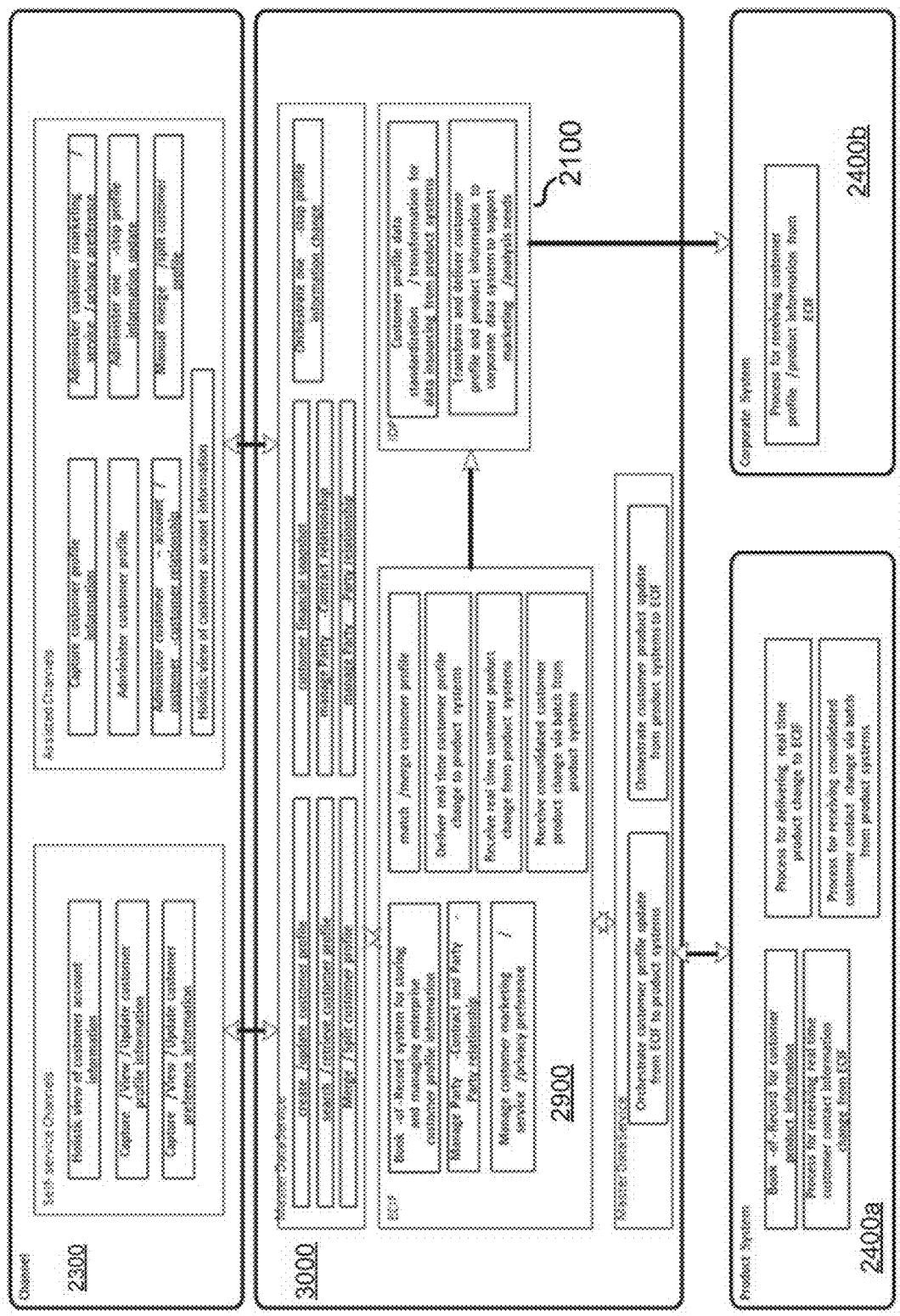

FIG. 65 shows an example architecture diagram of central data hub with book of records and IDP.

Figure 66:
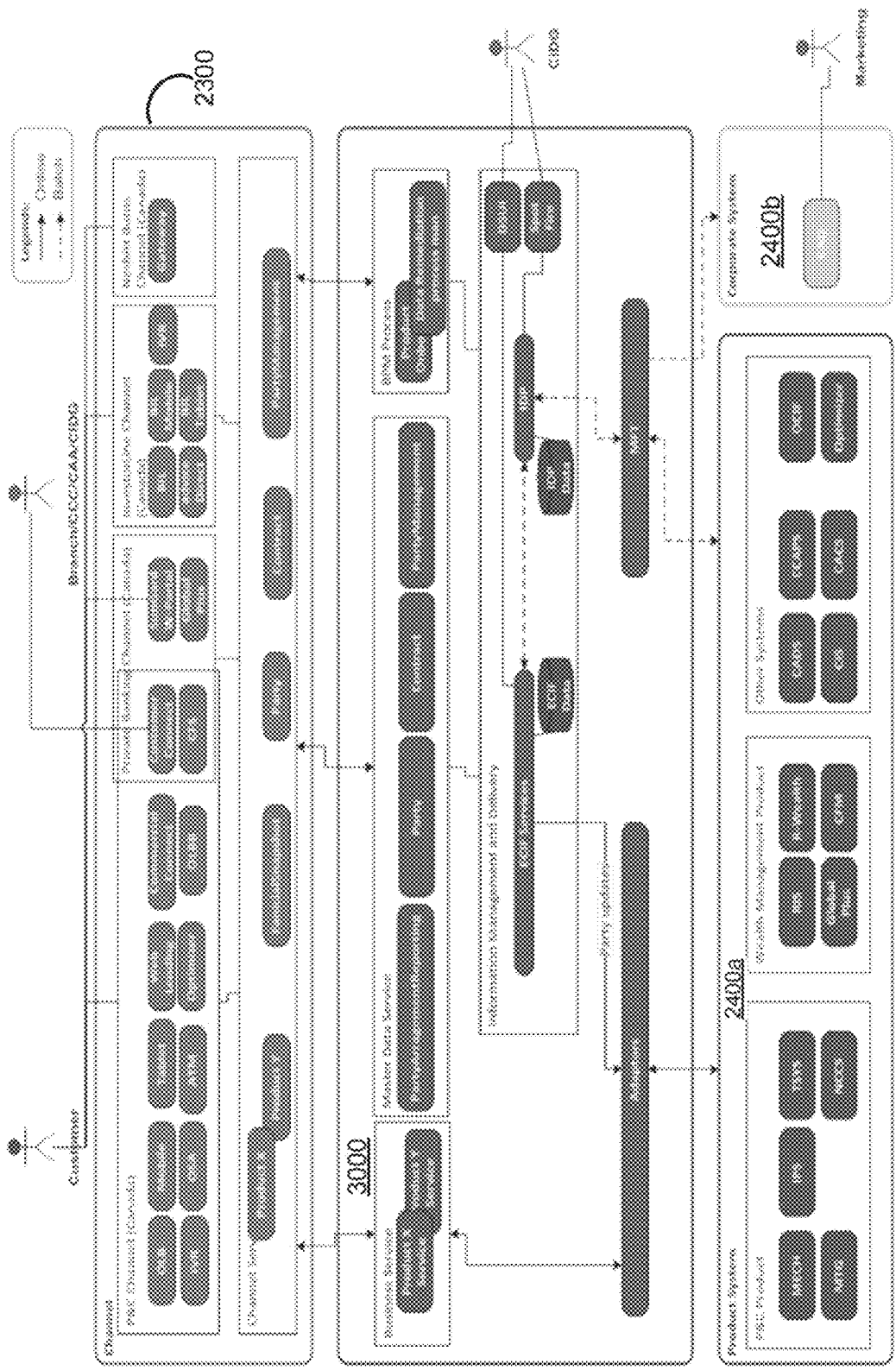

FIG. 66 shows an example system/application view of central data hub with book of records and IDP.

Figure 67:
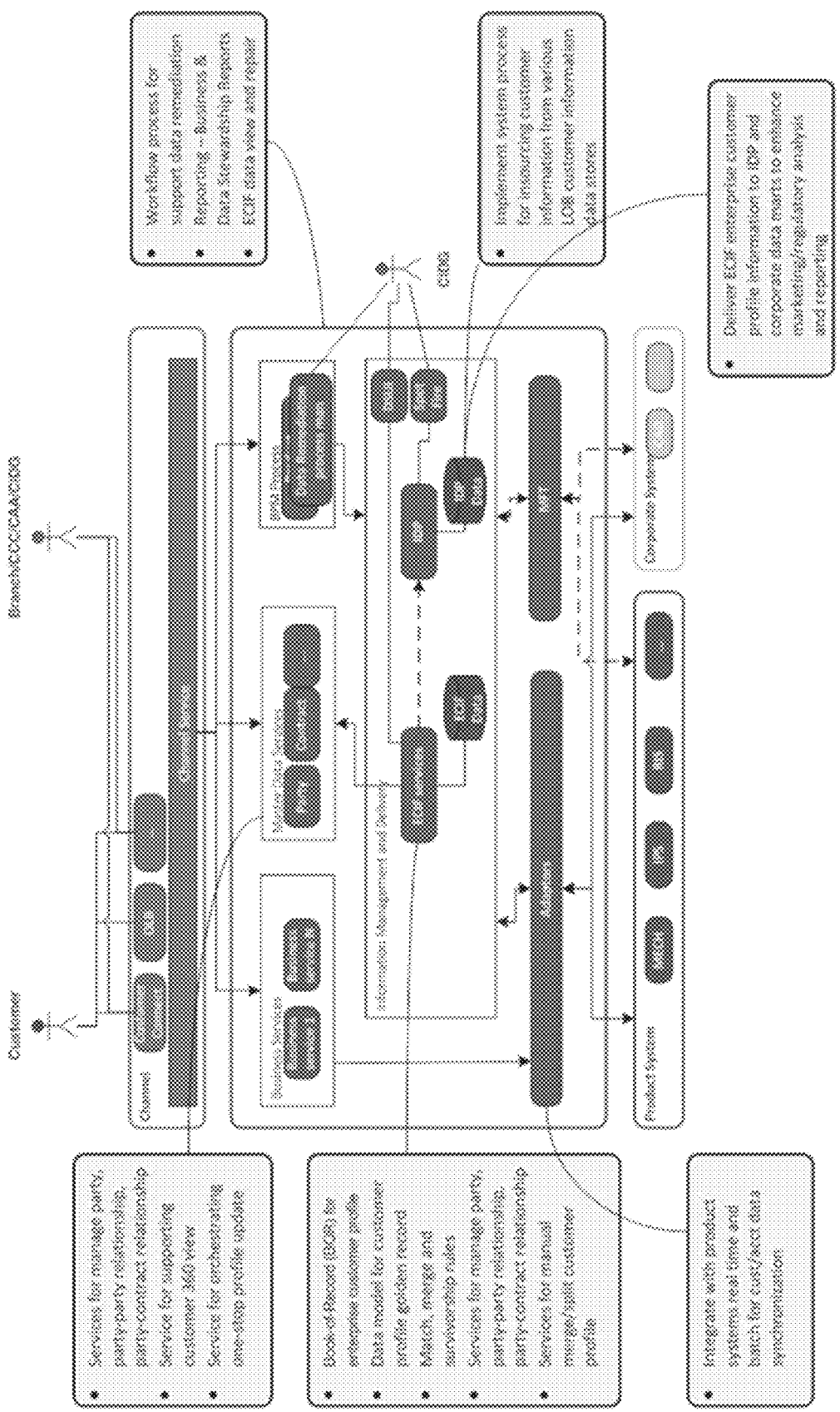

FIG. 67 shows central data hub capabilities with respect to a book of records.

Figure 68:
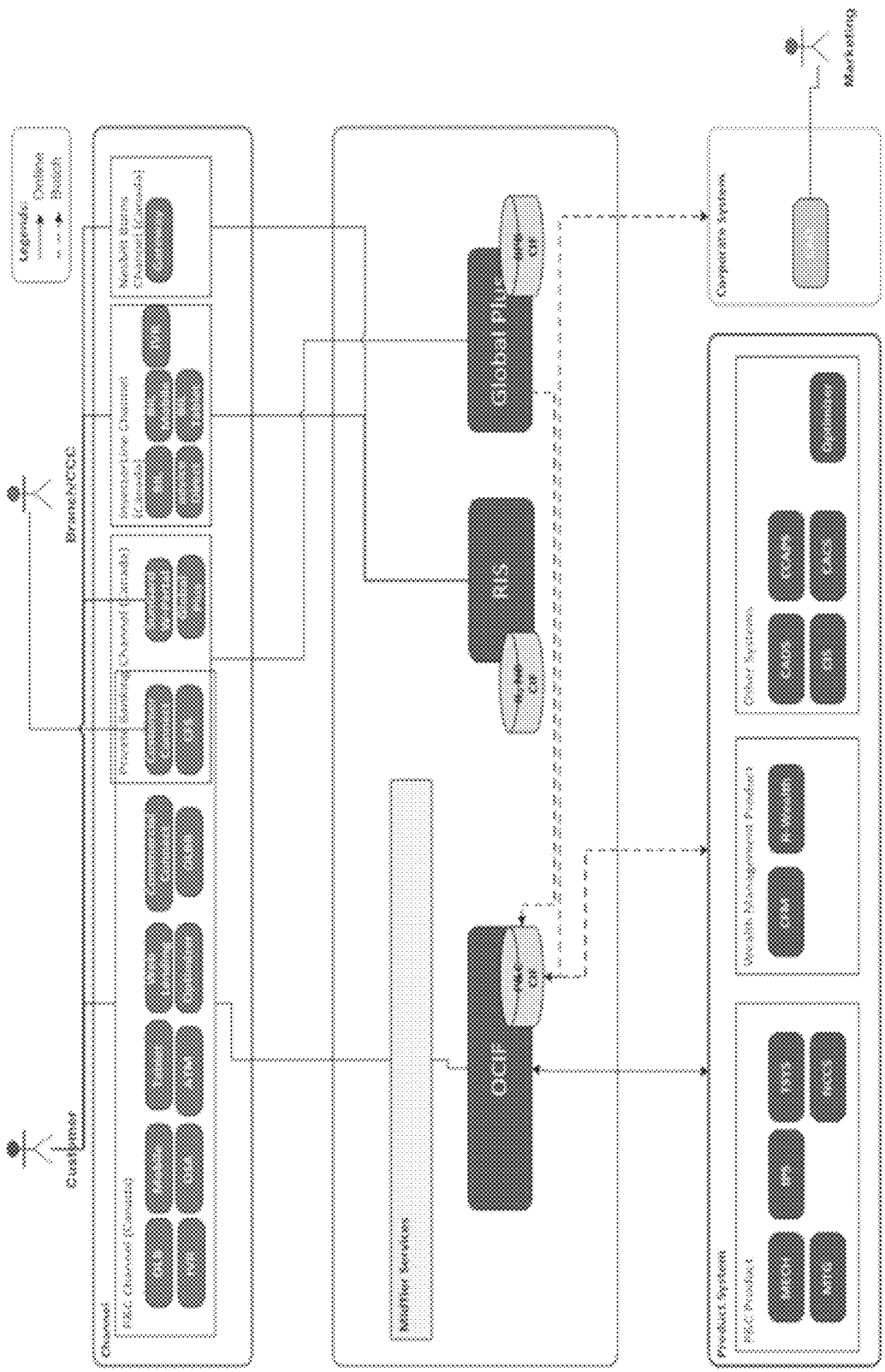

FIG. 68 shows an example state of book of records with channels, product systems and corporate systems.

Figure 69:
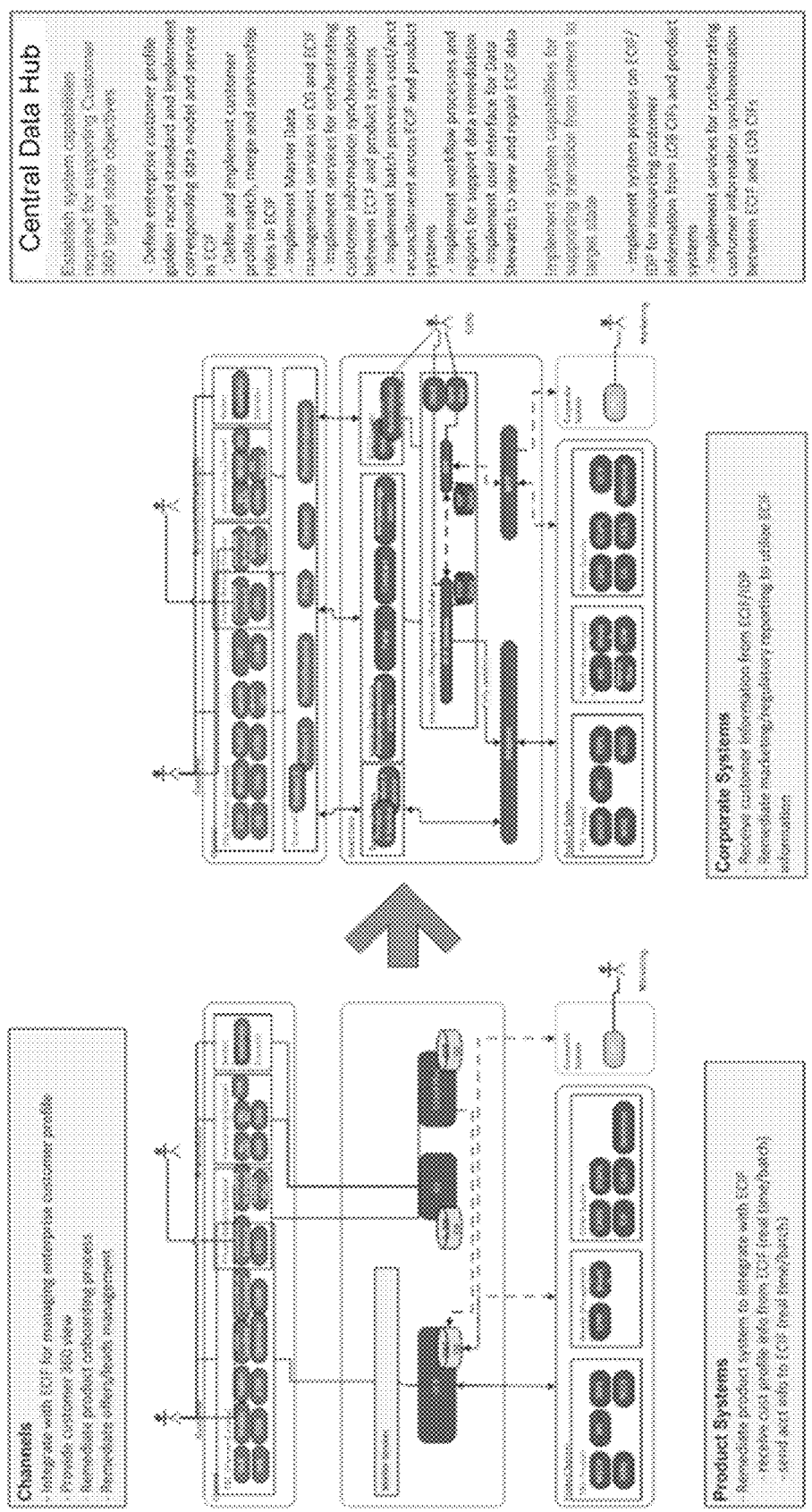

FIG. 69 shows an example transformation from a first example state to a second example state.

Figure 70:
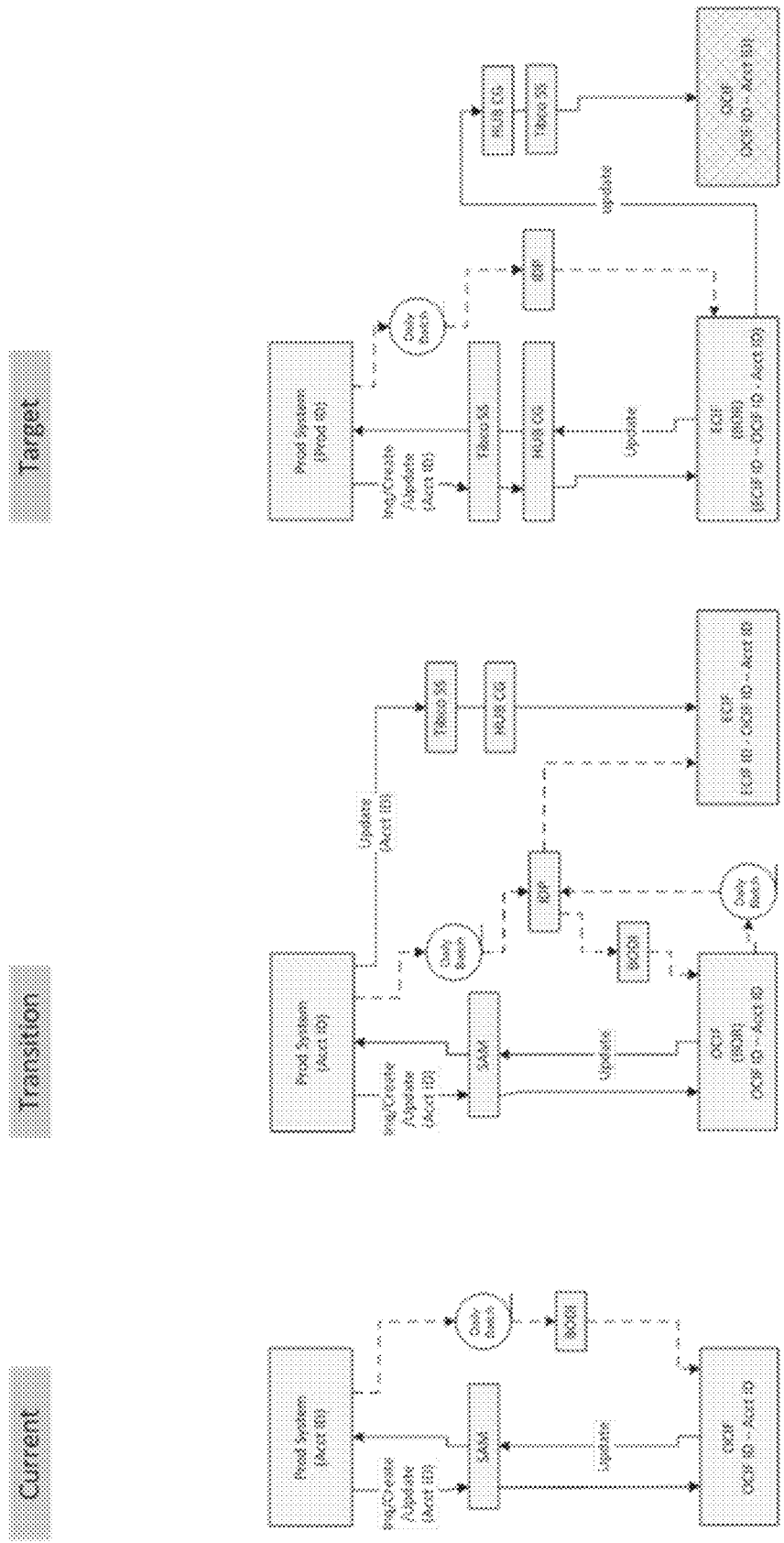

FIG. 70 shows example patterns for product system integration.

Figure 71:
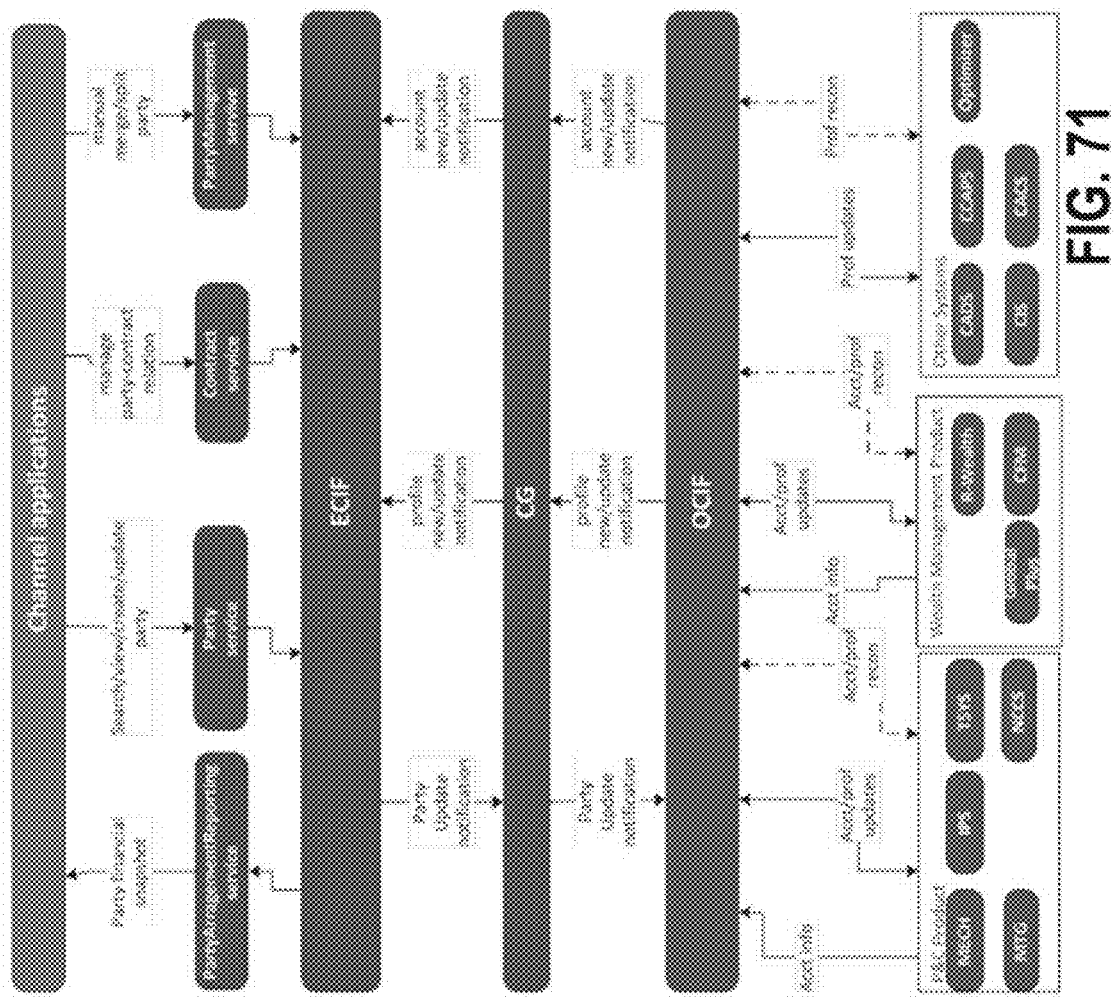

FIG. 71 shows architectural consideration for managing Operational Customer Information File (OCIF) back doors.

Figure 72:
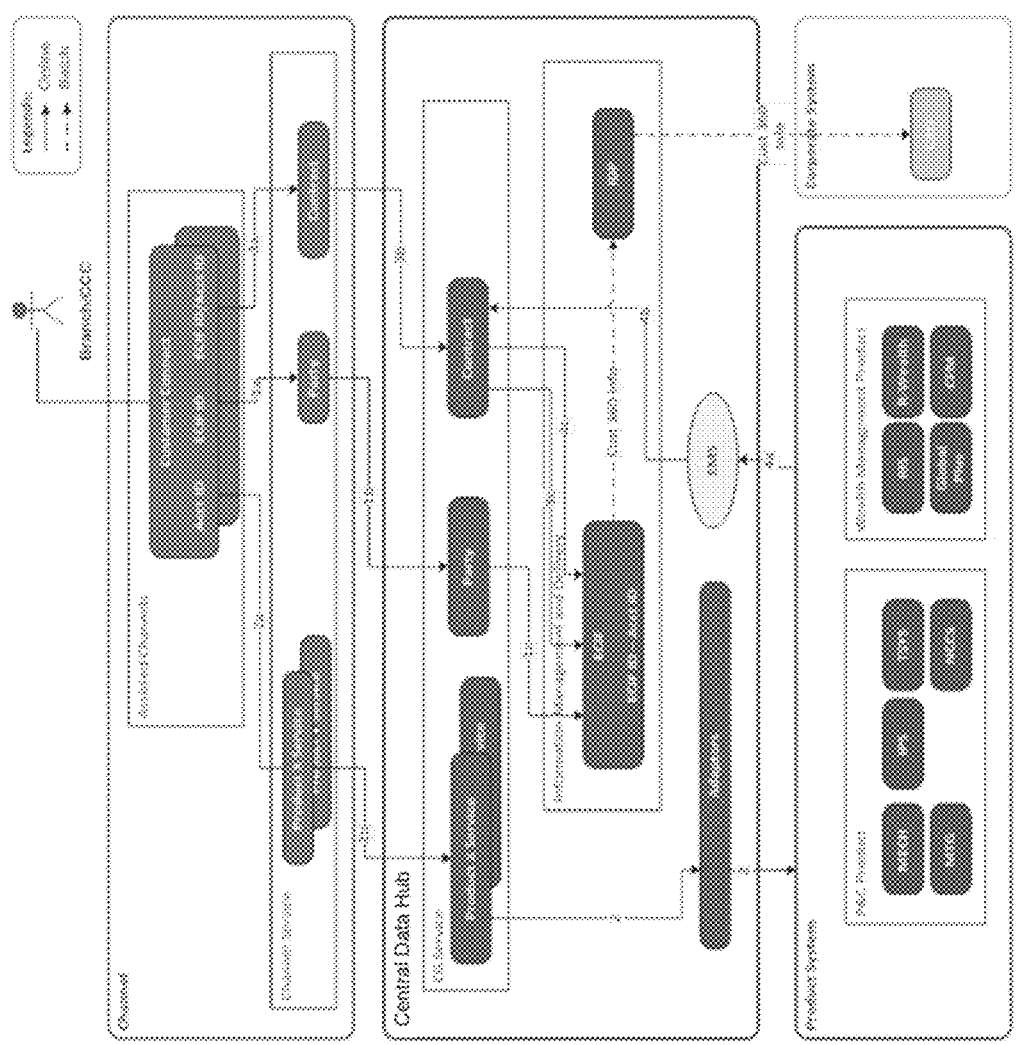

FIG. 72 shows example process for onboarding a customer using channel application.

Figure 73:
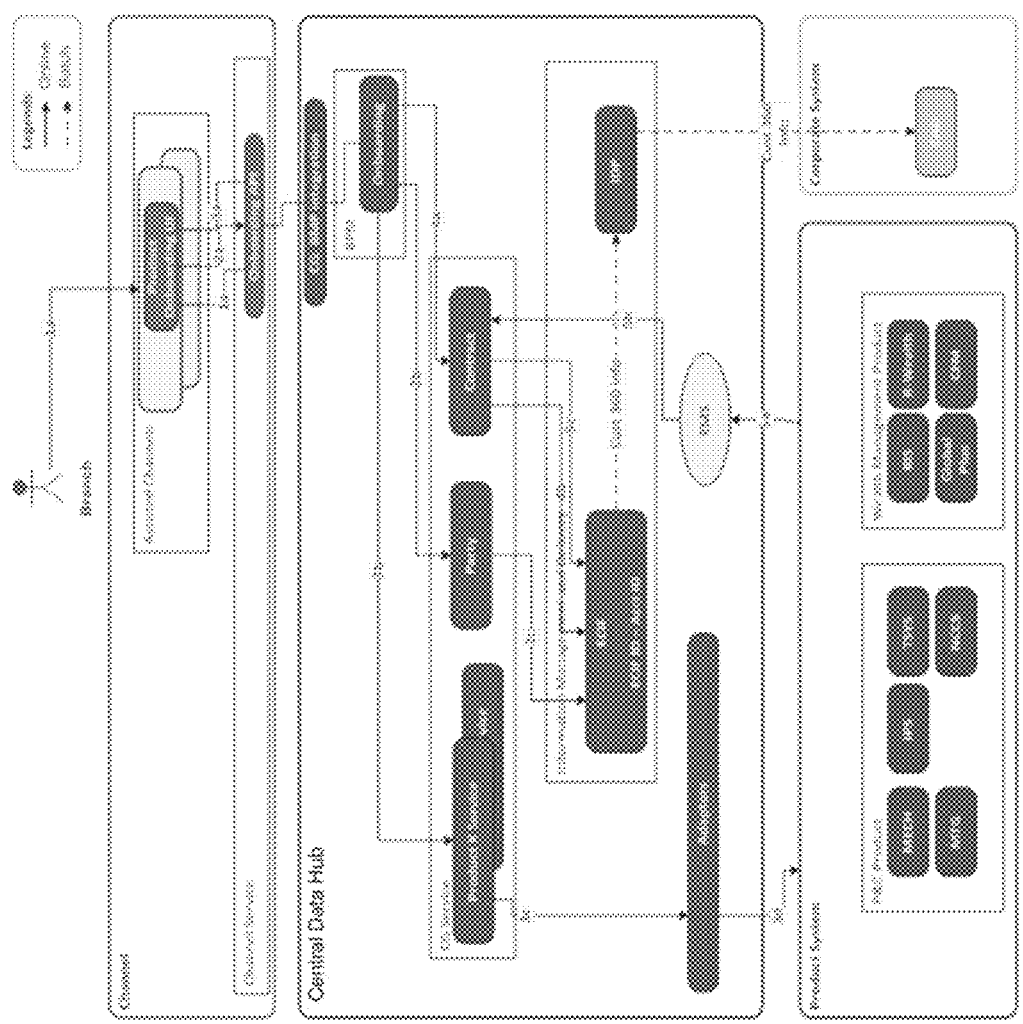

FIG. 73 shows example process for onboarding a customer using BPM.

Figure 74:
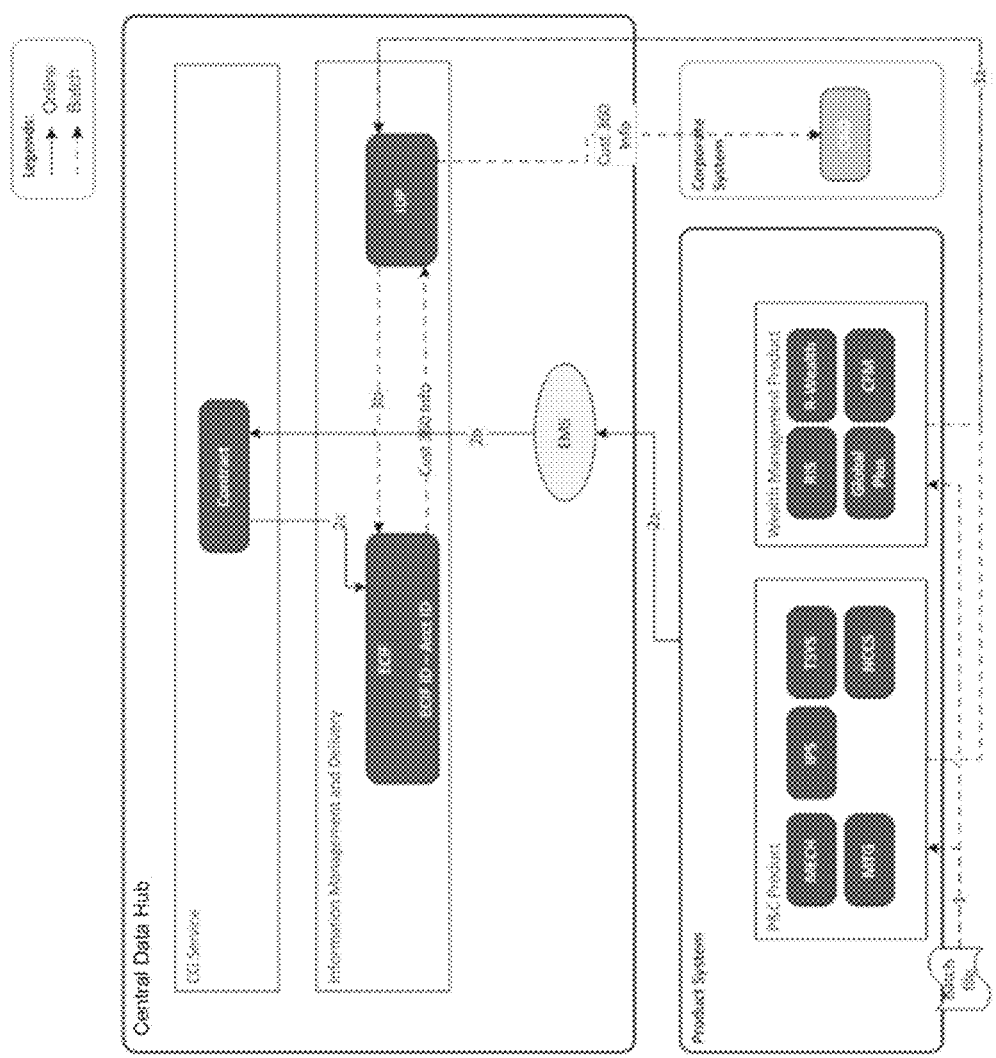

FIG. 74 shows example process for onboarding a customer and opening an account via batch process.

Figure 75:
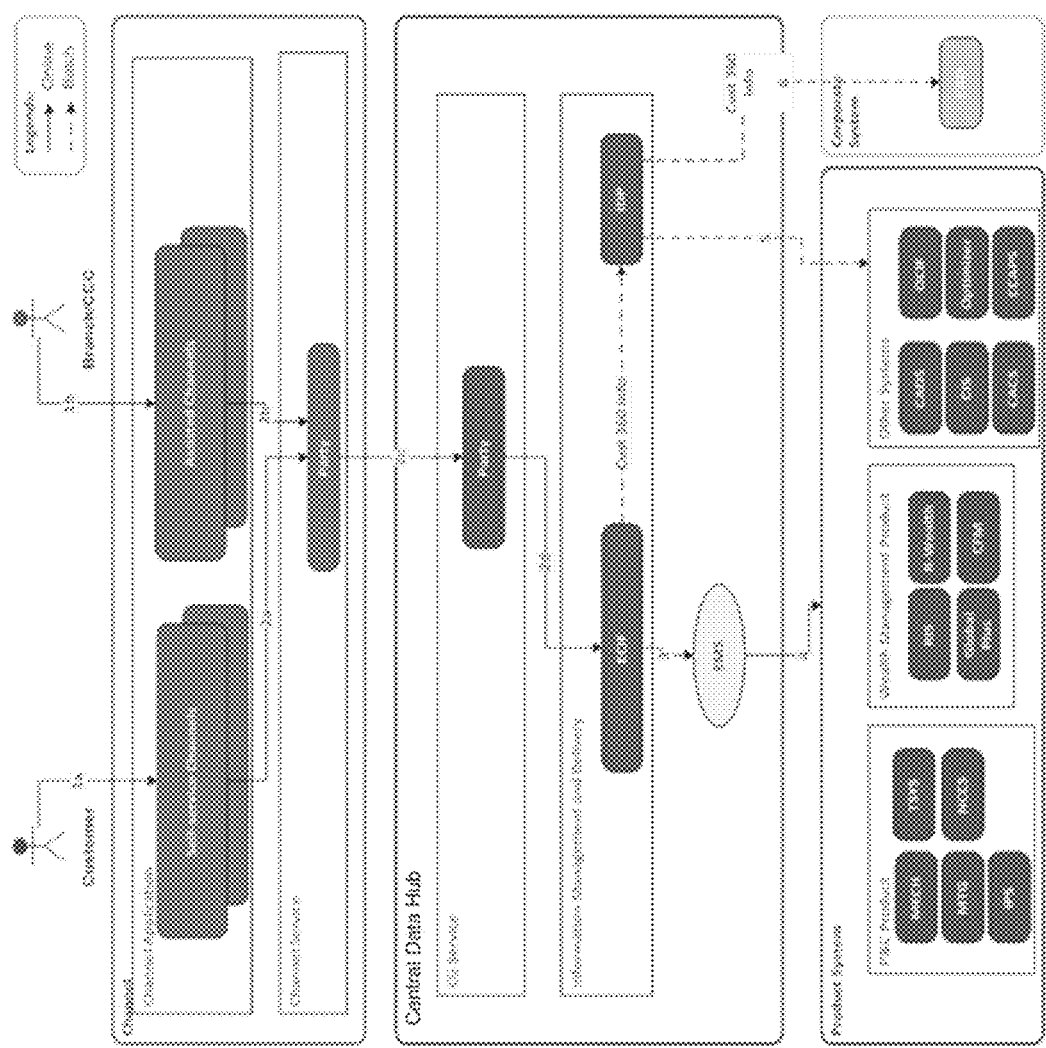

FIG. 75 shows example process for updating a party information in a customer profile.

Figure 76:
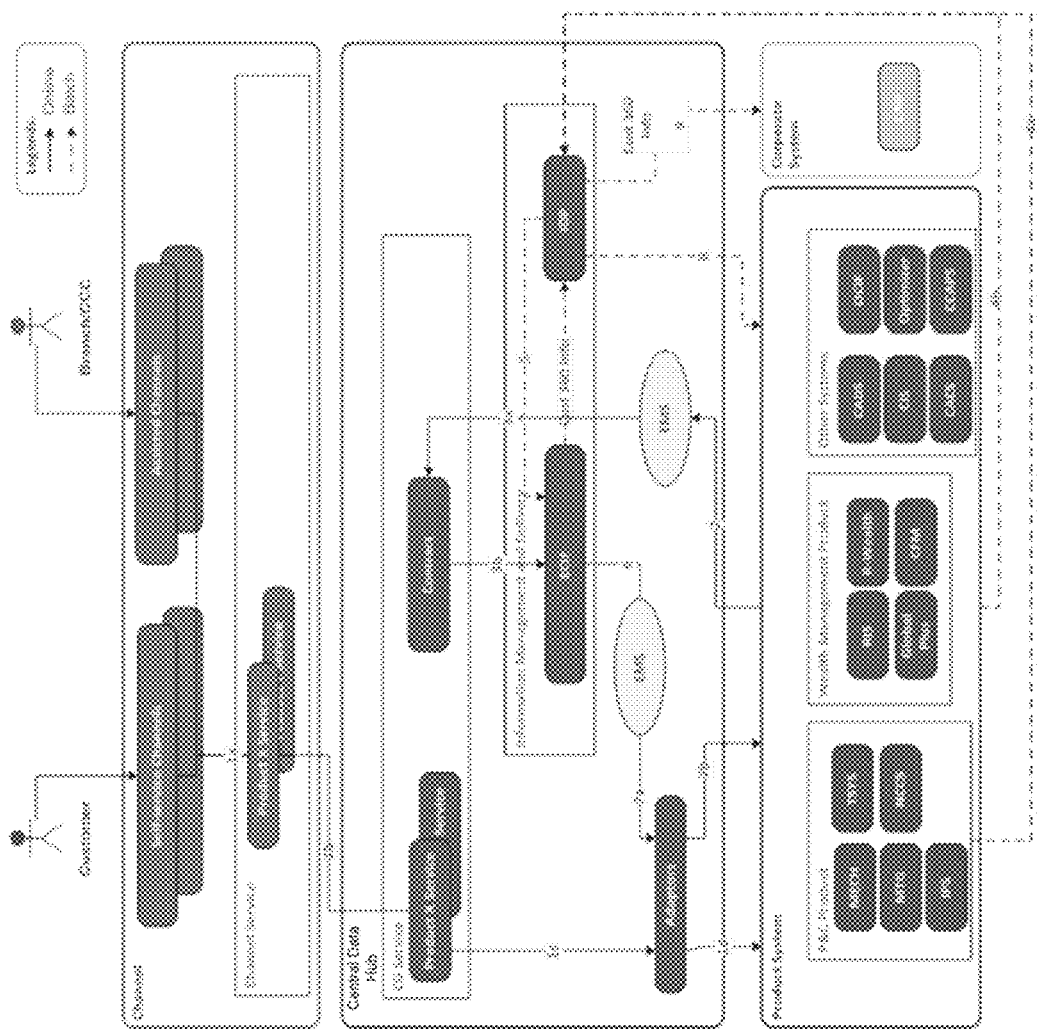

FIG. 76 shows example process for updating contract information in a customer profile.

Figure 77:
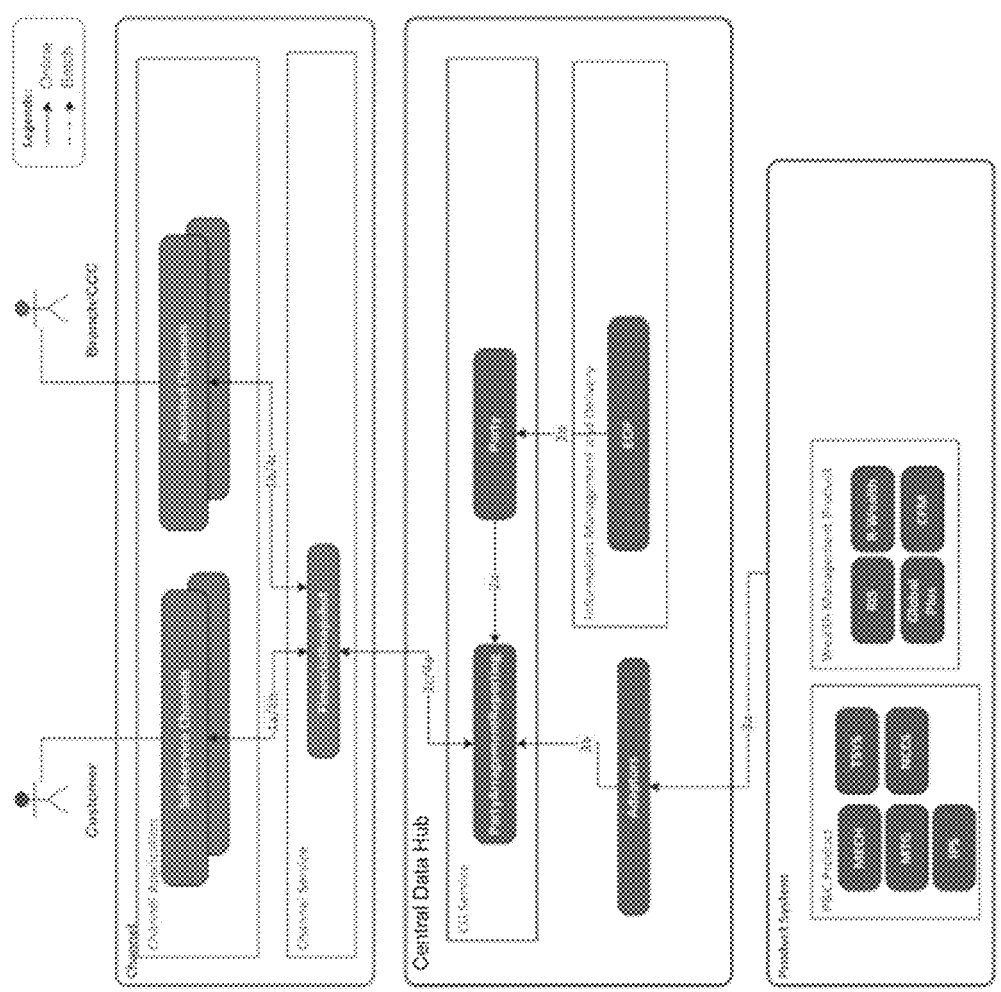

FIG. 77 shows example process of generating customer financial snapshot view on a channel.

Figure 78:
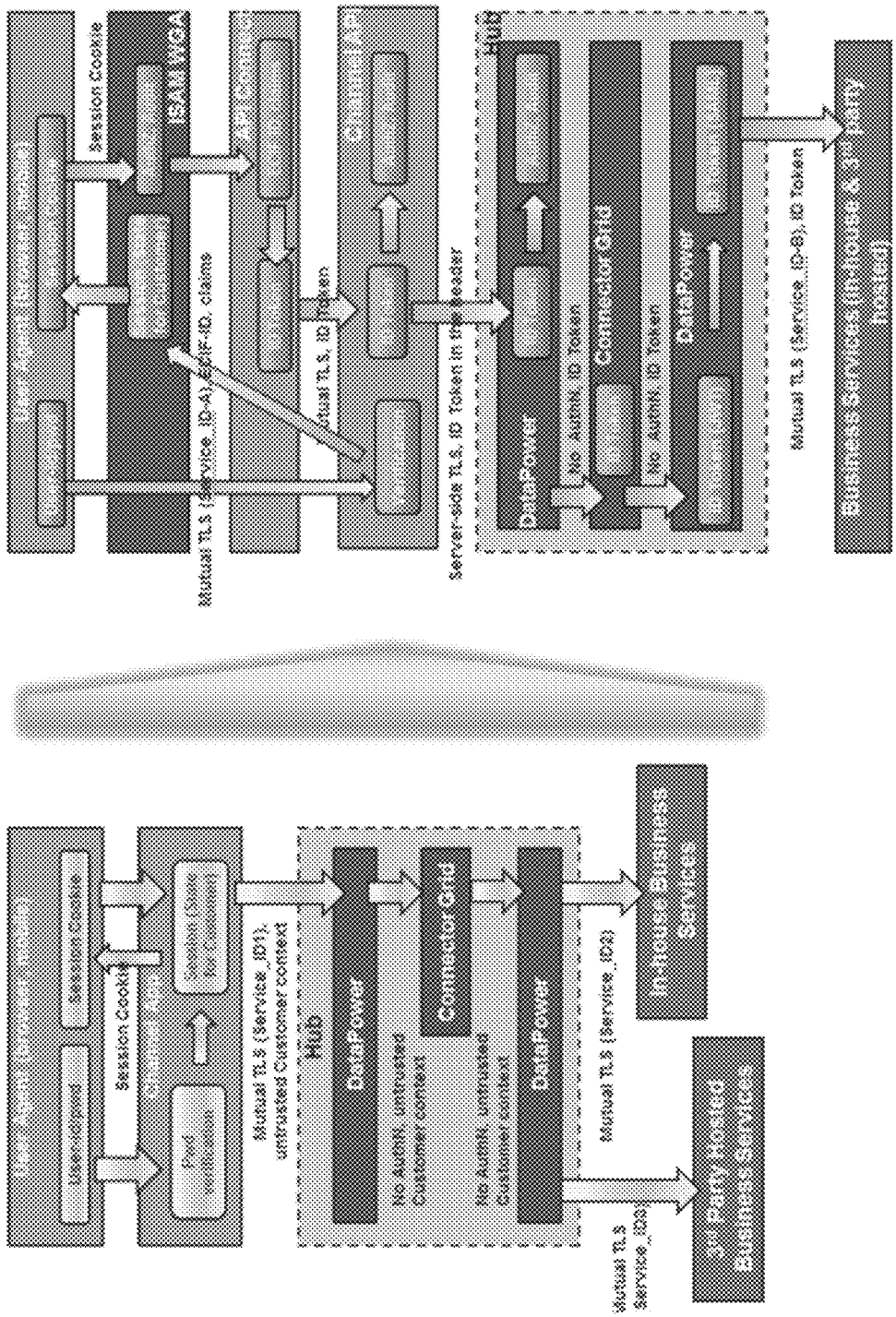

FIG. 78 shows example CIAM workflows with various agents and applications.

DETAILED DESCRIPTION

Embodiments of methods, systems, and apparatus are described through reference to the drawings.

The following discussion provides many example embodiments of inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

The embodiments of the devices, systems and methods described herein may be implemented in a combination of both hardware and software. These embodiments may be implemented on programmable computers, each computer including at least one processor, a data storage system (including volatile memory or non-volatile memory or other data storage elements or a combination thereof), and at least one communication interface.

Within an enterprise data repository, there may be large volumes of data being ingested and stored; computational demands may also be high for extracting, transforming or otherwise processing the volumes of data into end target databases or end appliances. With traditional ETL techniques, there exists a number of pain points: "data silos", which refer to data that is under control of one group or application and isolated from the rest of the organization may be common, and there may be a need for replication of large volumes of data between the various appliances. In addition, computing and storage capacity are inherently coupled, and cannot be independently scaled. Data access control and security may be negatively affected.

The financial cost of data aggregation and consumption with current technology may be high, and meeting demand may become increasingly technically challenging.

Network bandwidth may also become a significant constraint for data communication between an enterprise data system and external systems, as well as in/out of the landing zone for batch data transmission for the enterprise data system.

In addition, capturing and maintaining accurate data lineage may also be challenging under the traditional approach.

There may be no "balance and control"/enterprise-level reconciliation patterns or models for data stored within a traditional enterprise data system. This may be the case if the enterprise data system serves as a book-of-reference and not a book-of-record. However, there is growing need for enterprise reconciliation/balance and control capabilities and patterns.

Improving ease of understanding of the data glossary and relationship between data/sources is needed to support self-serve data science initiatives.

The Financial Services Industry is amongst the most data driven of industries. The scope, quality, cost, performance and freshness of data that has been "good enough" in the past is no longer good enough. Many critical organization processes require low cost, easy to access, reliable and consistent data. These processes include but are not limited to: Anti Money Laundering Compliance, Regulatory and Compliance Reporting, Risk Management, Customer Insights, Sales Performance Management and Channel Optimization.

While an organization may have multiple "point to point" and shared data acquisition and management platforms in place, none of these platforms are currently fully meeting that organization's needs for data reliability, flexibility, low cost and performance.

The Information Delivery Platform described in the embodiments herein incorporates new technology, a new operating model that optimizes the accountabilities for data quality and a simplified approach to information management. This platform may provide information management capability to meet the rapidly increasing demand for low cost, easy to access, reliable and consistent data.

Figure 1A:
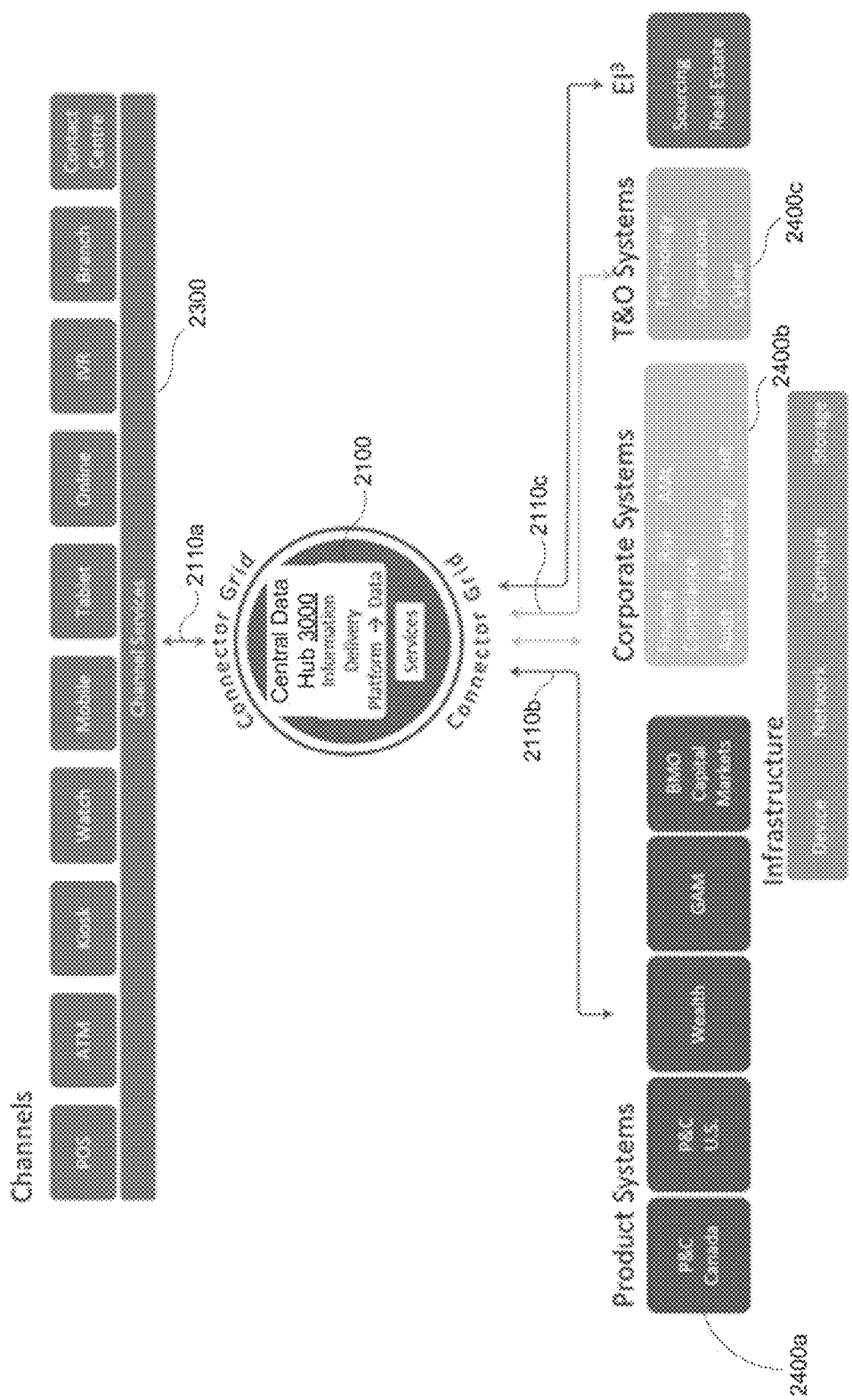
FIG. 1A illustrates an enterprise system architecture diagram of core processing and storage with an Information Delivery Platform (IDP) in accordance with one embodiment.

FIG. 1A illustrates an enterprise system architecture diagram of an example Information Delivery Platform (IDP) 2100 with Channels 2300, Product Systems 2400*a*, Corporate Systems 2400*b* and T&O (Technology and Operation) Systems 2400*c*.

In an example embodiment, IDP 2100 is a data aggregation, processing, and analytics environment, combining multiple sources of data into a single organization-wide repository, and providing fast and cost-effective access to data.

An example organization is a bank. However, it should be appreciated that the organization can be any type of organization or company that requires storage and processing of data for daily operations such as a reasonably complex and large enterprise that has many needs for large data sets aggregating from many sources. For example, the organization can be a government entity, a law firm, a school, a store, or a restaurant, and so on.

IDP 2100 provides more data in less time. It provides users with a high performance platform for processing queries. It has built in data quality management, high availability and disaster recovery. Its innovative operating model provides subscriber businesses a direct CIO accountability. It may provide the opportunity to eliminate data sprawl by eliminating the motivations to create redundant and overlapping data marts. It may provide the following benefits: CIO accountability model means conversations about sourcing data, its content and it's quality take place directly between the owners of the source systems and the consumers of the data; high performance, cost efficient staging platform means improved query performance and lower costs for accumulating low level detail data; data quality management means problems in the source data are identified early and actively managed; consumer driven data model means the integrated database structures are presented in simple, business friendly terminology; and provides for self-serve data usage.

IDP 2100 is a shared information management component of an Analytical/Data Hub that will provision well managed data to meet multiple reporting and analytical requirements quickly and efficiently. Its innovative operating model leverages the strengths of all stakeholders and eliminates unnecessary hand offs. It is built from the ground up to meet the requirements of regulators and business processes that demand on-going demonstration of data quality management and proof that the data is an accurate and complete representation of reality. It presents data to the business community using, e.g., industry terminology. It will provide the opportunity to eliminate data sprawl by eliminating the motivations to create redundant and overlapping data marts. It may provide robust, highly resilient infrastructure, DR (Disaster Recovery), high performance as most queries and loads run in a fraction of the time of existing platforms, easy tracking of data assets under management, data stewardship and data governance, data quality management and reporting capability, and data in a cross application integrated model (e.g. L2 when applicable).

In one example embodiment, central data hub 3000 includes IDP 2100. IDP 2100 may include a scalable data store (also referred to as a "data lake"), which may collect and store massive amounts of data for long periods of time. The data stored may be structured, semi-structured, unstructured, or time-sensitive data (e.g. events, etc.). A central aggregation and distribution point ("book of reference") may be generated for all book-of-record data within the organization, which provides consistent and efficient access to reference data. Both raw and processed data within the data lake may be available for consumption; powering analytics; machine learning; consumer-specific data accessible via batch, SQL, streaming, native Hadoop APIs. Linear scalability of data is also provided.

In some embodiments, IDP 2100 is connected to channel services 2300 through connector grid 2110*a* and connected to product systems 2400*a*, corporate systems 2400*b* and T&O systems 2400*c* through connector grids 2110*b* and 2110*c*.

Channel services 2300 may include internal or external interfaces adapted for different service groups, such as Point-of-Sale (POS) terminals, watch interfaces, mobile devices, tablet devices, online portals, ATMs, branches, call centers, sales forces, and so on. Each of these service groups may receive and utilize data from IDP 2100 through connector grid 2110*a*. Each channel may have a user interface designed to display various data and information and to receive user inputs.

Across channels 2300, customer information is captured consistently at all points of collection for all LOBs and channels, and is aligned to standards defined for the Enterprise Customer Domain. A single view of customer information and aggregate view of customer holdings can be displayed on channels, in real-time or near real-time, and on demand if necessary.

In addition, product systems 2400*a*, corporate systems 2400*b* and T&O systems 2400*c* may also receive and utilize data from IDP 2100 through connector grids 2110*b*, 2110*c*.

IDP 2100 may receive raw data from a variety of data sources. Data sources include, among others:
- Book of record transaction systems (BORTS);
- Clickstreams (web-logs);
- Social media;
- Server/machine logs;
- Unstructured data; and
- Real-time event streams.

Raw data may be received and stored into a staging area. The staging area may be part of a "data lake" foundation from which groups across the organization can draw needed data. This staging area may be also referred to as "level 0 (L0)" data storage.

For example, different groups may utilize data from the data lake. The groups may include, e.g.: AML (Anti-Money Laundering), BCBS 239, Conditional Offer Pricing, Volcker, CCAR, FATCA, IFRS9, Stress Testing Model Development, Reg-W, Procure-to-Pay, Enterprise Customer Information (ECIF) Canada & U.S., Leads, ECIF Canada & U.S., Leads, TF, LRM/SMR, U.S. Heightened Standards, Enterprise Wire Payments, LOB (Line of Business) Scorecards, Corporate Audit Analytics, Fraud/Criminal Risk Investigation, Legacy Data Marts Simplification.

IDP 2100 may be the foundation for the overarching data environment, combining multiple sources or book of record transaction systems (BORTS) into a single organization-wide repository and providing fast and cost-effective access to both raw and conformed data.

Figure 1B:
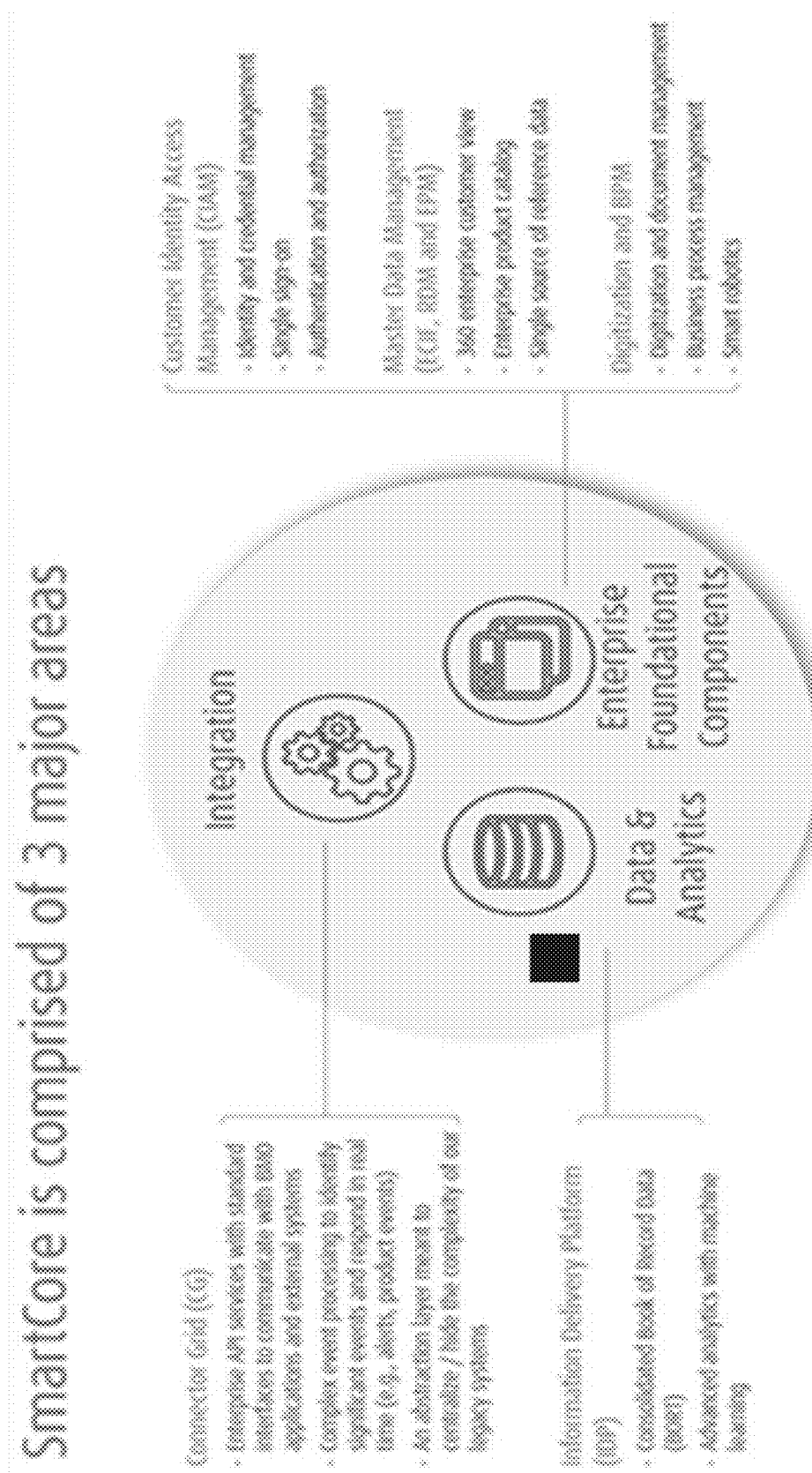
FIG. 1B is a high level description of components of a core data storage and processing system including IDP.

FIG. 1B is a view of components of a core data storage and processing system. The core system includes an integration component, a data and analytics component, and enterprise foundational components. The core system has a connector grid. The connector grid provides enterprise API services with standard interfaces to communicate with applications and external systems. The data and analytics component has a consolidated Book of Record Data (BORT) and advanced analytics with machine learning. The core system includes IDP, the connector grid, and other components.

The enterprise foundational components include Customer Identity Access Management (CIAM) for identity and credential management. CIAM enables single-sign on for application function and data access with authentication and authorization. The enterprise foundational components include Master Data Management components ECIF, RDM, and EPM to provide a 360 degree, holistic view of customer data. The Master Data Management components have an enterprise product catalog. The Master Data Management components provide a single source of reference data. The enterprise foundational components include digitization and business process management for digitization and document management with smart robotics.

Figure 2:
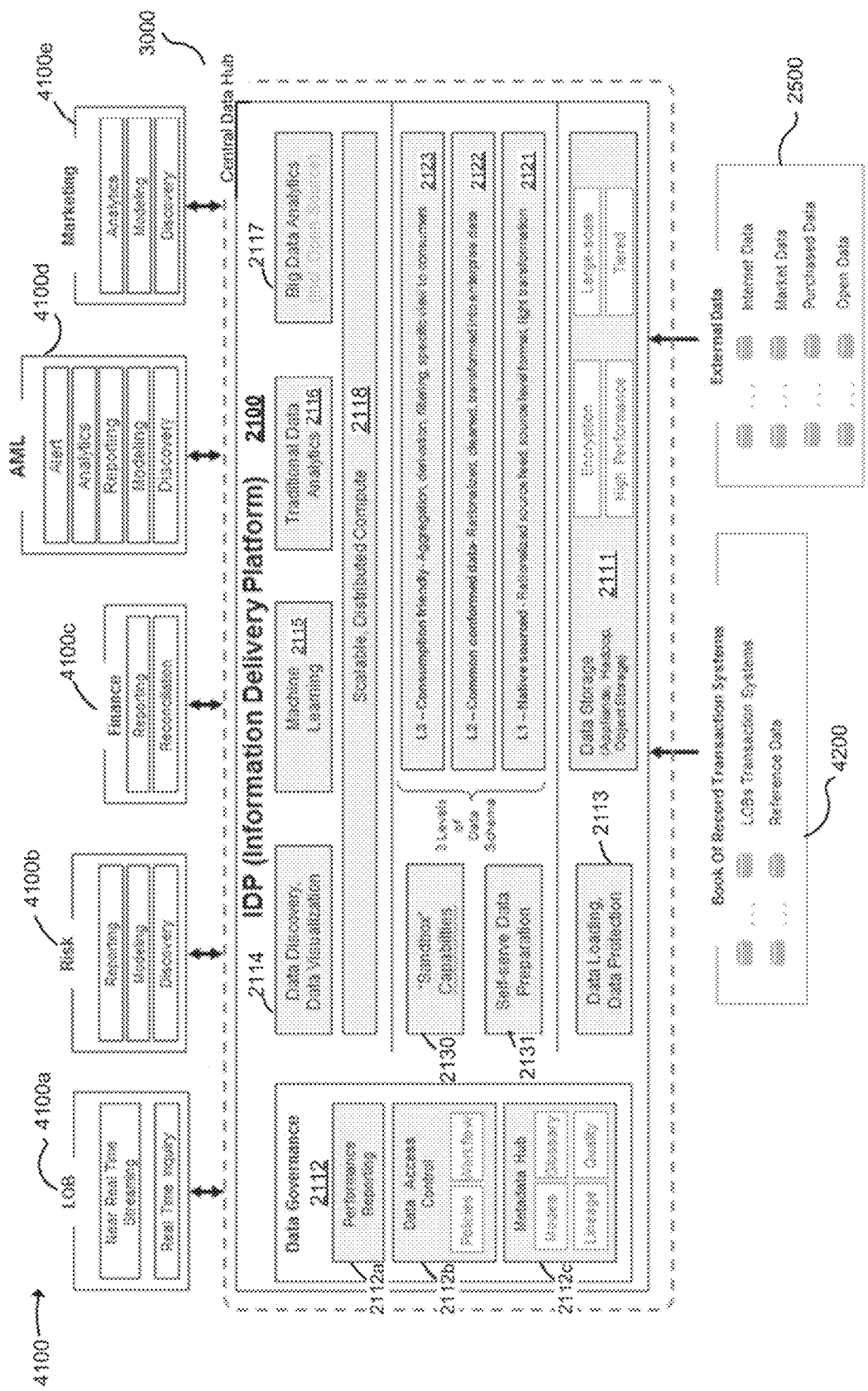
FIG. 2 illustrates an example contextual schematic block diagram of a system including IDP.

FIG. 2 illustrates an example system architecture of IDP 2100. IDP 2100 includes components such as data governance 2112, data loading 2113, data discovery and visualization 2114, machine learning 2115, traditional data analytics 2116, big data analytics 2117, distributed computing 2118, sandbox 2130, data preparation 2131, and three levels of data schema 2121, 2122 and 2123. Data storage 2111 may include encryption data, large-scale data, high performance data and tiered data.

IDP 2100 can provide processing tools for an enterprise data fabric with a central data and a consolidated book of record data and advanced analytics including machine learning. Large and complex organizations rely heavily on the use of large volumes and varieties of data for business operation and insights. To manage and transform the ecosystem for an organization, IDP 2100 provides a platform to collect and aggregate critical data from the large amount of business applications to serve as a single efficient repository for various consumers (human or system). IDP 2100 can use a standard efficient mechanism to ingest data. Data is then stored and transformed based on consumption pattern (or consumption requests) to facilitate usage. As part of the IDP 2100, a set of analytic tools are integrated to generate insights and analytical models. Trained models can then be integrated to the real-time transaction flow as part of the overall integration capability. In addition to housing the data, IDP 2100 also provides the computing power (e.g. computation engine like a graphic processing unit or GPU) to support the processing of data within IDP 2100. This Bring-Processing-to-Data instead of moving data to where processing is required has significant performance and efficiency advantages especially when large volume of data is involved. Finally, IDP 2100 can also provide a robust data governance function, such as meta-data catalog and data lineage, to ensure effective control and management all in one place.

IDP 2100 may be configured to receive from and transmit data to various data sources such as external data sources 2500 and internal data sources such as BORTS 4200 and different data consumers 4100.

IDP 2100 receives raw data from a plurality of source systems (e.g. external data sources 2500 and BORTS 4200). IDP 2100 loads and stores the raw data at data storage 2111, which can include one or more appliances. The data storage 2111 (or the one or more appliances) provides a non-transient data store and computation engine. The computation engine processes the data (at the data storage 2111) in response to requests. For example, IDP 2100 receives a request to generate data for consumption and the request can indicate a specific purpose for the consumption. IDP 2100 selects a set of data from the raw data based on the request. IDP 2100 transform, using computation engine at the data storage 2111, the set of data into a transformed dataset for different application consumption. The set of data is maintained at the non-transient data store during transformation. IDP stores the transformed dataset at the non-transient data storage 2111.

IDP 2100 can include three levels of data schema: level 1 2121, level 2 2122, and level 3 2123. Level 1 data can include raw data in a source level format. Level 2 data can be transformed into a common data model. This can generate enterprise data or unify data. This can also involve cleaning a normalization of the data. Level 3 data is consumption friendly and it can include aggregation, derivation, filtering, and specific views for consumers. Accordingly, Level 3 data is transformed data that is consumption ready.

In some embodiments, IDP 2100 does not involve using level 2 data. That is, IDP 2100 does not require transforming raw data to a common data model in order to generate the consumption ready data. IDP 2100 can transform raw data directly into consumption ready data which can result in processing efficiencies. Further IDP 2100 can transform the data at data storage using an embedded computing engine.

Level 1 data can be source system raw data. A user on the consumption side indicates what data they are looking for (via a request) and this triggers transformation of the raw data to level 3 consumption ready data. The transformation does not require a common data model.

For example, a consumption request can involve "account balance" data for a type of customer. The customer can have three different products and, accordingly, three source systems have relevant data (account balance data). IDP 2100 receives data files from all 3 systems. IDP converts and loads the file into storage.

In an ETL environment then the data would be extracted and loaded into an external engine to aggregate the three data sets and re-load the result data set back into storage to get data for consumption (by data consumers 4100). The ETL environment requires data transfer from source into storage, then another data transfer to the computation engine, and then re-transferring the result to storage. IDP 2100 uses an efficient process that reduces data transfer operations. IDP 2100 stores the source data at data storage 2111 and within the storage 2111 there are computation engines that can create the calculations or computations on the raw data to transfer the data to be consumption ready. For this example, IDP 2100 aggregates the account balance data from the different sources at the data storage 2111 to save or eliminate data transfers (e.g. the transfer from the storage to the engine and then re-transfer back from the engine to the storage). Even if the processing operations on the raw source data are efficient, in the ETL environment, more resources are spent moving the data from storage to engine and then transfer the results back.

IDP 2100 does not require Level 1 data to be transformed into Level 2 data and a common data schema or model before that data can be transformed into Level 3 data. This can also efficiently use processing resources as it can eliminate intermediating processing for the common data model. Consumption requests can come from different channels indicating different requested data formats. Instead of storing the same source data in different formats in anticipation of different types of consumption requests, IDP 2100 can store the data in the source format or raw data format until the consumption request is received. For example, finance application 4100*c* can request transaction data in accounting format and risk application 4100*b* can request the same transaction data in risk related format. These are different formats of the same source data.

The IDP 2100 also does not have to transform the source data into a common data model (L2) in order to respond to a channel consumption request. Instead, IDP 2100 can transform the source data directly into the format indicated in the consumption request. Accordingly, the consumption request can indicate a requested data format. Common data models are not "common" in that they are not readily understandable and needs to be learned. This can be an inefficient use of resources. Further, the source data format may be closer to the format of the consumption request and so the intermediate conversion to a common data model may use more resources than a direct transformation from source data format to the consumption request format. As an illustrative example, the common data model may be in language C, source data 1 in language A, and source data 2 in language B, and consumption request for data in language D. IDP 2100 can transform source data 1 in language A and source data 2 in language B directly into language D for consumption. A common data model requirement would require source data 1 in language A and source data 2 in language B be first transformed into language C (common data model) and then transformed into language D. This intermediate processing may inefficiently use resources. Language C (common data model) may not be closer to language D (consumption request) than language A (source data) or language B (source data). In some instances, it may be easier to transfer source data into the format of the consumption request than into a common data model.

Accordingly, even though Level 2 2122 is shown in FIG. 2 the data schema is not required to respond to consumption requests.

IDP 2100 receives consumption requests (e.g. account balances) that can indicate relevant data types and formats. IDP 2100 uses rules that govern how to identify data relevant to the consumption request. IDP 2100 can use metadata hub 2112*c* to define models or schemas to facilitate re-use of the aggregation or transformation in response to the consumption request. If IDP 2100 receives a similar consumption request, then it can re-use the model at metadata hub 2112*c* to efficiently generate the consumption data. Metadata hub 2112*c* stores data or attributes that are descriptive of data (which includes models and schemas).

IDP 2100 can create actions that are linked to real-time transaction data/interaction.

Data discovery 2114 can involve intelligent search (e.g. request everything related to account balance) to help identify attributes that are relevant as a consumption request. IDP 2100 can send attributes that may be potentially relevant to search query and the responses can be used to create the schema or model that can be used in the metadata hub 2112*c* to compute or aggregate data in response to a consumption request. A consumption request can include specification for data.

IDP 2100 transforms the source data (level 1) for consumption (level 2) using code that defines the rules for calculations/computations at data storage 2111 or appliance level, which has both storage and embedded parallel processing engine to store and compute the result data for consumption at the channels 4100. The code transformation runs within the appliance at the data storage 2111. The consumption schema links the request to the relevant snippet of code. The metadata hub 2112*c* (e.g. data catalogue) can be a dictionary that describes attribute names, lineage and can also indicates what data entries to use for the computation in responses to the consumption request Data governance 2112 also includes data access controls 2112*b* as controlling access to data is important as all the data is stored centrally (may be more vulnerable).

Big data processes 2117 can include code that enables further transformations. For example, IDP 2100 might require a different storage format, and so may offer an additional storage option that still has processing capabilities in addition to storage.

In some embodiments, the IDP with Smart Core (or core processing and storage) is configured to receive raw data from a plurality of source systems. In some embodiments, the source systems are data centres, applications, or appliances associated with a single line of business of an organization. In some embodiments, the IDP is configured to receive raw data from one or more source systems from more than one line of business. In some embodiments, different lines of business may provide different data types, data associated with different data models, data encoded using different semantic attributes, and/or data that requires different processing for its use, for example, based on context of the data, including context related to how the data was produced, received, generated at the source, and the line of business providing the data.

In some embodiments, the IDP is then configured to load and/or store the raw data at a non-transient data store. The non-transient data store may be a single data store included in the IDP or may be a network of data stores included in or associated with the IDP. Using a data store (or network of data stores) allows aggregation of the raw data, transformations of the raw data, or subsets of same, such that data transmission is reduced. For example, in some embodiments, this data management by the IDP allows the raw data to only have to be moved or transmitted once-when it is ingested by the IDP from the one or more source systems. The data that is ingested remains in the same appliance for processing. Additional data is ingested regularly. This can allow for management of all the raw data to be centralized without the need for further requests for and transmission of data if the data is used by applications or appliances. This can help avoid the need to transmit very large datasets, which can take long periods of time that are unfeasible for the purposes that the data is being transmitted for. In this way, IDP can provide functionality for improved data management and data use.

In some embodiments, the IDP is then configured to select a set of data from the raw data based on a data map. For example, the IDP can determine data in the one or more non-transient data stores. This determination or selection can be based on a data map. In some embodiments, the data map is a data structure or set of data structures that store attributes associated with the raw data. These attributes can be used to identify the data, for example, its source, how it can be used, what client it is associated with, and features extracted by machine learning that further allow for management, organization, or use of the data. The data map can therefore be used by the IDP to select a set of data that is appropriate or otherwise relevant for a particular use, request, and/or transformation.

In some embodiments, the IDP is then configured to transform the selected set of data into a transformed dataset. In some embodiments, the IDP is configured to transform more than one selected sets of data. For example, sets of data can be selected sequentially or in parallel based on the same or different or multiple data maps. The IDP can then transform the selected sets of data by applying data transformation techniques, machine learning, or other data processing capabilities. The transformations can be used to clean the data, to make aggregations, and so on. In some embodiments, the data is transformed according to a defined series of data transformation processes, for example, in order to provision one or more transformed datasets for a particular use. For example, in some embodiments, an application or appliance associated with or built into the IDP requests data so that the can be used to generate an aggregated summary of relevant data for a fraud assessment, where the data originated from more than one source system. The IDP is configured to receive such request, select the relevant raw data stored in its centralized non-transient data store using a data map, transform the data by generating classifications of the data using machine learning, and provide the transformed data to the requesting appliance by storing the transformed dataset at the same non-transient data store. As the appliance is built into the IDP, the appliance can access the transformed data requested without a data transmission or replication step, thereby avoiding the unnecessary transmission or replication of large amounts of data.

In some embodiments, the IDP is then configured to store the transformed dataset at the non-transient data store.

In some embodiments, the IDP is configured to generate one or more data models of any one of the raw data, selected set of data, or transformed datasets. In some embodiments, this is generated using machine learning and the data model represents an ontology of the data. In some embodiments, this allows for the automatic generation of useful encoding of data. In some embodiments, the one or more data models generated by the IDP of the raw data, selected set of data, or transformed dataset encodes data for using the raw data, selected set of data, or transformed dataset. In this way, an ontology of the data is provided, in some embodiments.

For example, this can avoid or reduce the need for people to directly engage with the data, significantly reduce the time needed to usefully represent the data in an appropriately encoded form in the computer, uncover new patterns or trends or associations in the data or between different datasets that could not have been otherwise practically uncovered, improve or facilitate the extraction of useful data corresponding to a defined set of features or a request, and allow the data to be organized in an improved way. Improved data organization can, for example, allow for improved or optimized data extraction times or data processing times by the computer. In some embodiments, the features extracted during the machine learning process are selected to provide an improved or an optimal classification of the data or determine the semantics of the data to allow the data to be better understood or more easily used. For example, classifications of the data can be encoded as data descriptors, for example, in a data map of the data. For example, a data descriptor can encode information useful for particular applications, for example, fraud detection units.

In this way, the data model or machine learning processes provide the IDP with a functionality of usefully flagging and/or organizing the data for the purposes of one or more applications for consumption of the data. In some embodiments, the applications (for example, applications built-in to the IDP such that no data transmission is required for the application to access and use data, such as, transformed data, in stored in the IDP) are applications engaging artificial intelligence capabilities. For example, the transformed data stored in the non-transient data structure at the IDP can be further classified or manipulated using machine learning at the application level.

In some embodiments, an application is configured to provide a user with a view of the transformed data, as appropriate according to the requests of the user and/or the functionality of the application. In some embodiments, the user is a computing device for applying or facilitating research, trend and pattern, statistical, and other data processing techniques on data. Different users can relate to different lines of business for an organization.

In some embodiments, the IDP can use one or more generated data models to populate one or more data maps, which can, as previously discussed, be used by the IDP to select a set of data from the raw data in a non-transient data store.

In some embodiments, the information delivery platform receives the raw data sequentially from the plurality of source systems. For example, in some embodiments, the information delivery platform is configured to order the ingestion of raw data sequentially, for example, according to the time each respective source system transmits or indicates transmission of raw data, according to the time raw data from one or more source systems arrives at certain defined intermediary servers, or according to other differences in the raw data or data ingestion process of different raw data, batches of raw data, or jobs for ingestion of raw data.

In some embodiments, IDP sequentially stores and loads the raw data ingested from the plurality of source systems. For example, in some embodiments, the information delivery platform is configured to order the storage and/or loading of raw data sequentially, for example, according to the time each respective source system transmits or indicates transmission of raw data, according to the time raw data from one or more source systems arrives at certain defined intermediary servers, according to the time ingestion of the raw data is completed or received by the IDP, or according to other differences in the raw data or data ingestion process of different raw data, batches of raw data, or jobs for ingestion of raw data.

In some embodiments, the IDP thus avoids or reduces the need for data silos and multiple systems (e.g. between which data must be transmitted for transformation or use) by storing the transformed data in a way accessible by applications without the need for data transmission, for example, at a non-transient data store included in the IDP. Further, in some embodiments, the IDP is configured to generate a data model using machine learning to improve data engineering of large amounts of data, for example, to allow for generation of a computationally useful ontology of the data, such that a wide variety of very different applications can more easily receive only data relevant for their distinct or different purposes. This also allows the same sets of data to be used for very different purposes (e.g., by these very different applications) without duplicating the data or requiring large amounts of data to be accessed from remote servers, as a data model or data map (e.g., populated by machine learning classifications of the data) can be used to identify relevant data.

In some embodiments, the IDP is provided at an enterprise level, ingesting large amounts of data from a wide variety of sources, including different lines of businesses within the enterprise.

Figure 3:
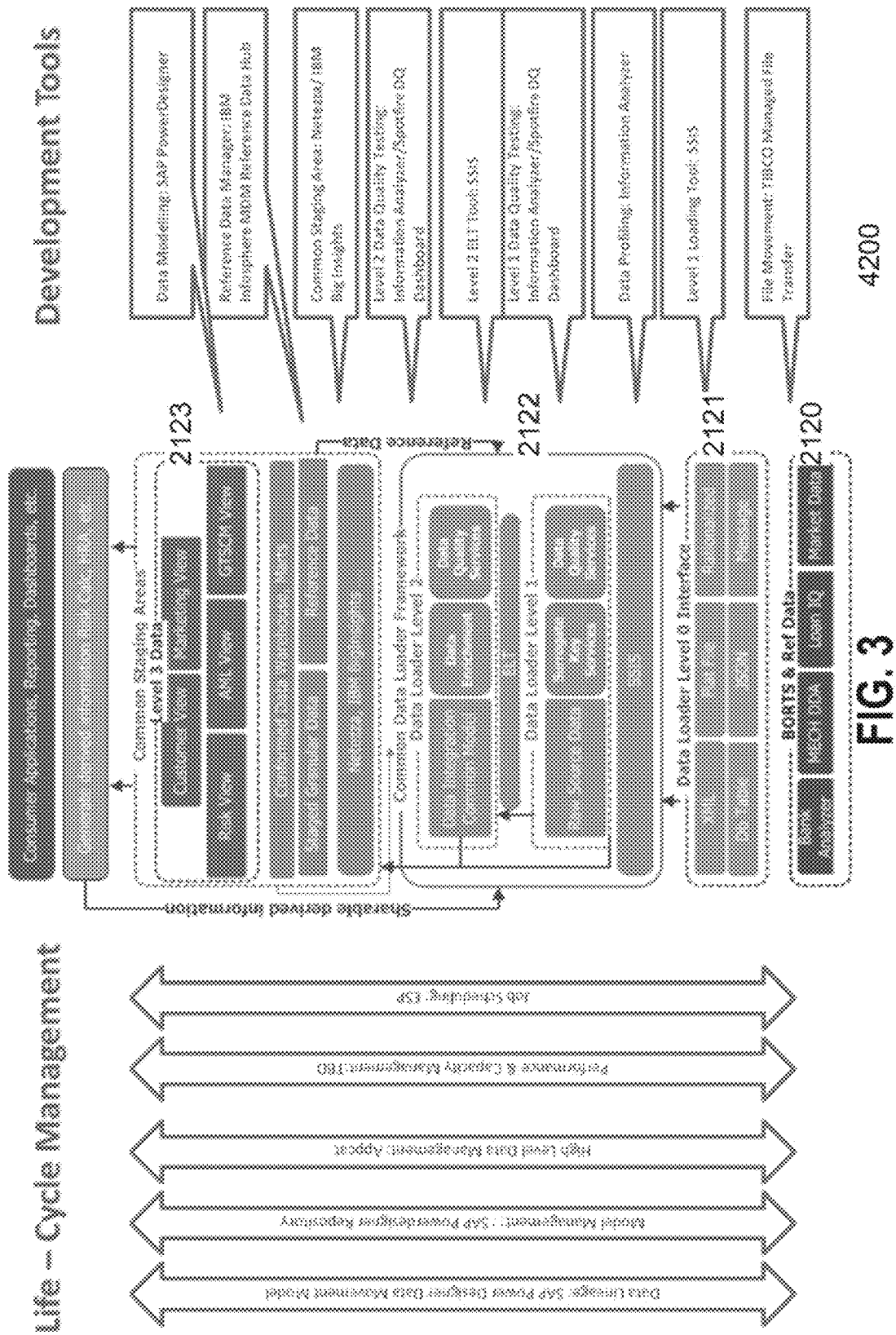
FIG. 3, shows example schematic diagrams of data flow at three levels.

Referring now to FIG. 3 which shows schematic diagrams of data flow at three levels. BORTS and reference data 4200 may come from different source systems or groups. At L0 2120, the source data may be stored in different formats (e.g. XML, Flat file, rationalized, database table, JSON or message), as if still in source systems. The source data at L0 then gets loaded through SQL Server Integration Services (SSIS) to become L1 data 2121, which may include raw source data with no or minimal transformations. At this level, data profiling may be performed and data quality testing may be performed. Next, L1 data may be transformed through SSIS into level 2 data 2122 using a data integration common model, to create a unified view for each group of data. This is optional in some embodiments. In other embodiments, curated data sets may be generated at level 2. At level 2, data quality testing may be performed. Data from multiple BORTs may be brought to common terms and definitions at level 2. Then L2 data may be further processed through applications to become L3 data 2123, which may feed integrated data to calculation engines, and dashboards and reports, and customized to be viewed by a specific business group or channel (e.g. Customer View, Marketing View, Risk View, or AML view). Level 3 data may be ready for consumption and generated in response to a consumption request. Detailed data processing and transformation are described herein. As an example, reference data can refer to currency code (C, CAD) and IDP can directly access level 3 reference data automatically on the consumption side. The data can also be used for loading/transformation. The result data that is created at level 3 can be used at level 2 along with sharable derived information—e.g. aggregated account balance.

Through level 0 to level 3, data lineage can be tracked through models, and available for display by different users. Data models may be managed by IDP. Job Scheduling may be done through ESP.

In some embodiments, prior to L1, data may be stored in a staging area, which can be referred to as "level 0" or L0. Generally speaking, there is no data transformation between data sources (L0) and L1 data. At staging area, source data are stored as it exists in source system, for example, the data may be internal tables, internal tables etc. L0 data can provide data feeds, data dictionary and data lineage.

At level 1, data is processed to be rationalized based on source system feed. There may be no or very minimal transformation of data at this stage, as this is still source systems level data, put into a source system-level format users can understand. L1 data can be provisioned by CIO Group, and specified by the metadata hub. L1 components may include data loader, data dictionary and data lineage.

At level 2, data can be processed to be rationalized and transformed (e.g. mapped) into common message/model format, for example to create a unified view of data across systems. This is optional and in some embodiments, data is transformed from level 1 to level 3 in response to a consumption request. If applicable, multiple L1 data can be rationalized into portfolio common L2. Transformations may be use case and project driven. At this level, there may be validation on business level, reconciliation, and derivation. L2 data represents common data model for a portfolio, cleaned and ready for enterprise use. For example, L2 data may include APMSN Loan IQ, LTL, LTSL rationalised into "transaction-account-risk type-facility-legal entity-lending product" message structure. Generally speaking, data scientists, through IDP interface, may map raw data to the conformed data model, as described in detail below. L2 components may include data model, data dictionary and data lineage.

In some embodiments, L2 may be implemented with support from a Relational Database Management System (RDBMS).

In some embodiments, existing L2 model and transformation rules can be stored within a knowledge base. Without physicalizing these L2 models, one may create and physicalize curated datasets L3 leveraging the model and transformation rules. The transformation rule from a field from L1 going into L2 should be reusable for the L1 data going into the L3 curated dataset.

At level 3, data are processed so that they are adapted for project or consumer specific views and in response to consumption requests. Aggregations, derivations and filtering based on project specific requirements are applied to the data. Multiple L3 can coexist, accessing same L2, L1 and in theory L0 if needed. For example, L3 data may include MDIL view for LRM, Oracle Mantis view for AML. In some embodiments, at level 3, data can be generated on demand for a specific purpose. L3 data may be displayed through various channel interfaces.

FIG. 52 illustrates an example method 5000 of data extraction, loading and transformation by IDP 2100 in accordance with one embodiment. At step 5100, raw data may be extracted from various source systems (e.g. traditional sources such as BORTS or non-traditional sources such as cloud databases). At step 5200, IDP 2100 may load and store the raw data at a data store (e.g. HIVE or HBase); the data may be stored at level 0 or level 1 at this stage. At step S300, IDP 2100 may receive or otherwise determine a request to generate consumption data for a specific purpose. The specific purpose may be, for example, for data analytics, or for displaying certain information to a specific group of users (e.g. Retail Banking employee). At step 5400, IDP 2100 may, in response to the request, identify and select a group of data from the raw data based on a data map. The data map may be pre-existing and stored in a database. The data map may be a visual graph, for example. The data map may link different data entries or values in level 1 to one or more data fields in level 2. For example, if the request is to display a borrower's address information to a Retail Banking employee, the data map may identify that a borrower's address (level 2 data model) must have at least three data columns from level 1 data: namely, address line 1, address line 2, and address line 3. Based on this data map, IDP 2100 may select the appropriate data columns from level 1 data at step 5400 in response to the request for data consumption. At step 5500, the selected set of data may be transformed (e.g., cleaned, rationalized or otherwise processed) into a curated set of data (e.g., level 2 or level 2.5) based on the data map. At step 5600, the curated set of data may be transmitted to an appropriate channel for consumption (e.g. level 3), in accordance with the request. The data transmission may be conducted through connector grid. The channel may be, for example, a data analytics engine in Anti-Money Laundering Group. The channel may be, for another example, a user interface display customized to employees within Retail Banking. The curated set of data at step 5600 may be adapted for different purposes depending on the specific data consumption request or need.

Figure 4:
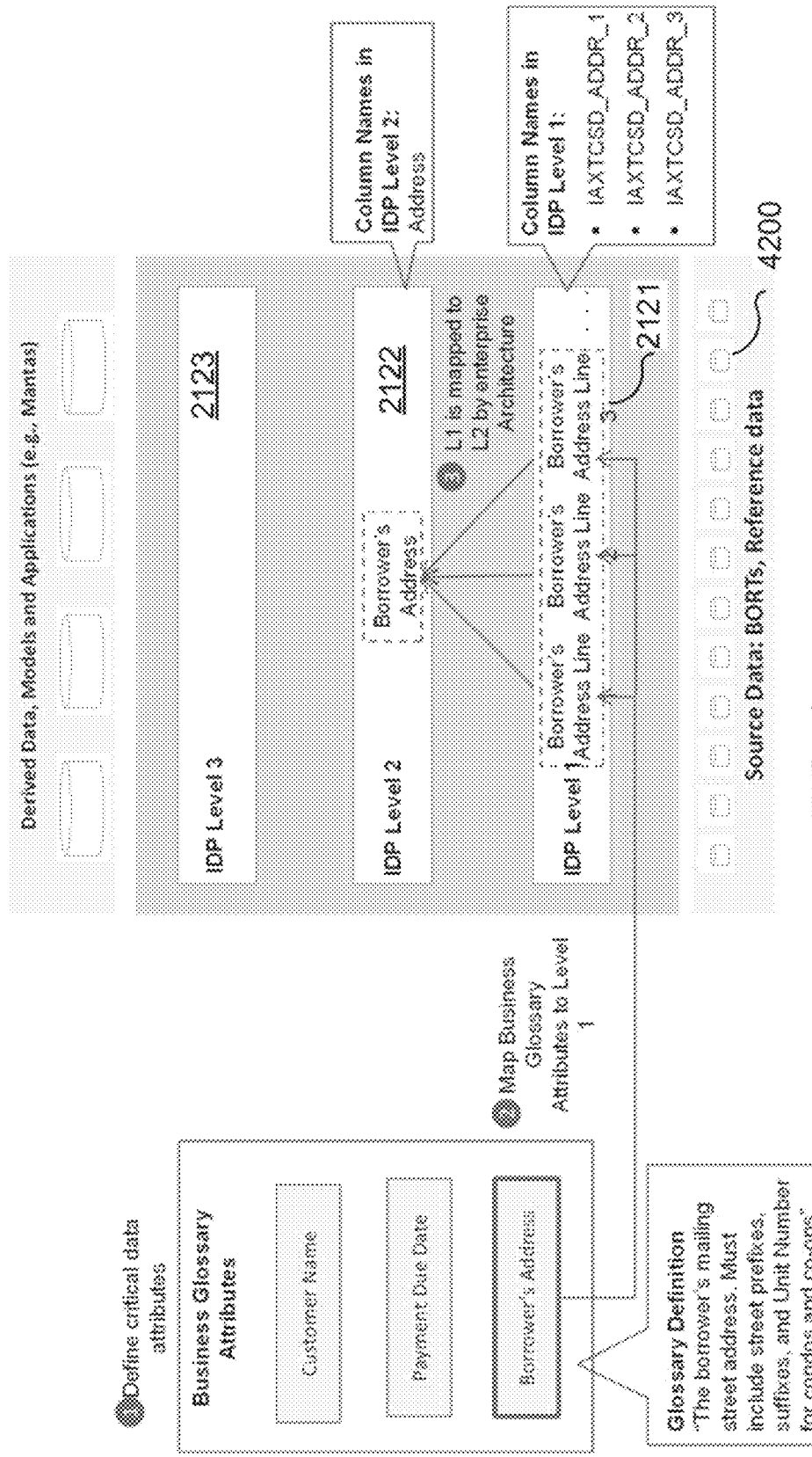
FIG. 4 illustrates an example case of data processing from level 1 to level 3 in accordance with one embodiment.

Referring now to FIG. 4, which illustrates an example case of data processing from level 1 to level 3 in accordance with an embodiment. For example, if an employee in retail banking needs to view customer address information, raw data can be accessed, transformed and processed on demand, in real-time, in order to generate and display the appropriate customer address information. The employee can also request to view data lineage, in order to see where the address information data has come from. IDP generates schemas that can then be reused for other use cases. The schema or map is stored at appliances to be run to process and transform data. IDP can reuse the schema for different consumption requests. The schema can be saved at the metadata hub. Although L2 is shown this is optional and it can also refer to L3.

Specifically, at level 1 2121, a borrower's address information may come from source systems 4200. The address information may be stored as different lines of information at level 1, similar to how it was stored in source system 4200. For instance, address line 1 has a column name "IAXTCSD_ADDR_1" and includes data "23 Westeria Lane", address line 2 has a column name "IAXTCSD_ADDR_2" and includes data "Suite 638", address line 3 has a column name "IAXTCSD_ADDR_3" and includes data "City of Guelph". In addition, based on critical data attributes, such as glossary definition, borrower's mailing address must include street prefixes, suffixes, and Unit Number for condos and co-ops. Based on these data attributes, business glossary attributes can be mapped to level 1 data.

Next, level 1 data 2121 may be mapped to level 2 data 2122 by enterprise architecture. A data map can be created, either through manual creation or through system auto-generation, linking three different data columns (e.g. "IAXTCSD_ADDR_1" "IAXTCSD_ADDR_2" "IAXTCSD_ADDR_3") to one common data field "Borrower's Address" (or simply "Address") at level 2. A data map or schema can also be used to aggregate data from L1 to L3.

At level 3 2123, borrower's address information may be adapted for display to different groups or for different consumption purpose.

Other examples of data transformation include: for Anti-Money Laundry (AML) transaction monitoring, data may be provisioned in L1 or L2, and presented in L3 for consumption. For AML Capital Markets Transaction Monitoring, data may be provisioned in L1 and L2, and then presented through L3. For PCD Productivity Tree, data may be provisioned in L1 or L2, and presented through visualization. For AMI Reports, data may be provisioned in L1 or L2, and presented through visualization. For OSFI intraday, data may be provisioned in L1 or L2, and presented. For Finance & regulatory reporting, data may be provisioned in L1 or L2, and presented through reporting.

Figure 5:
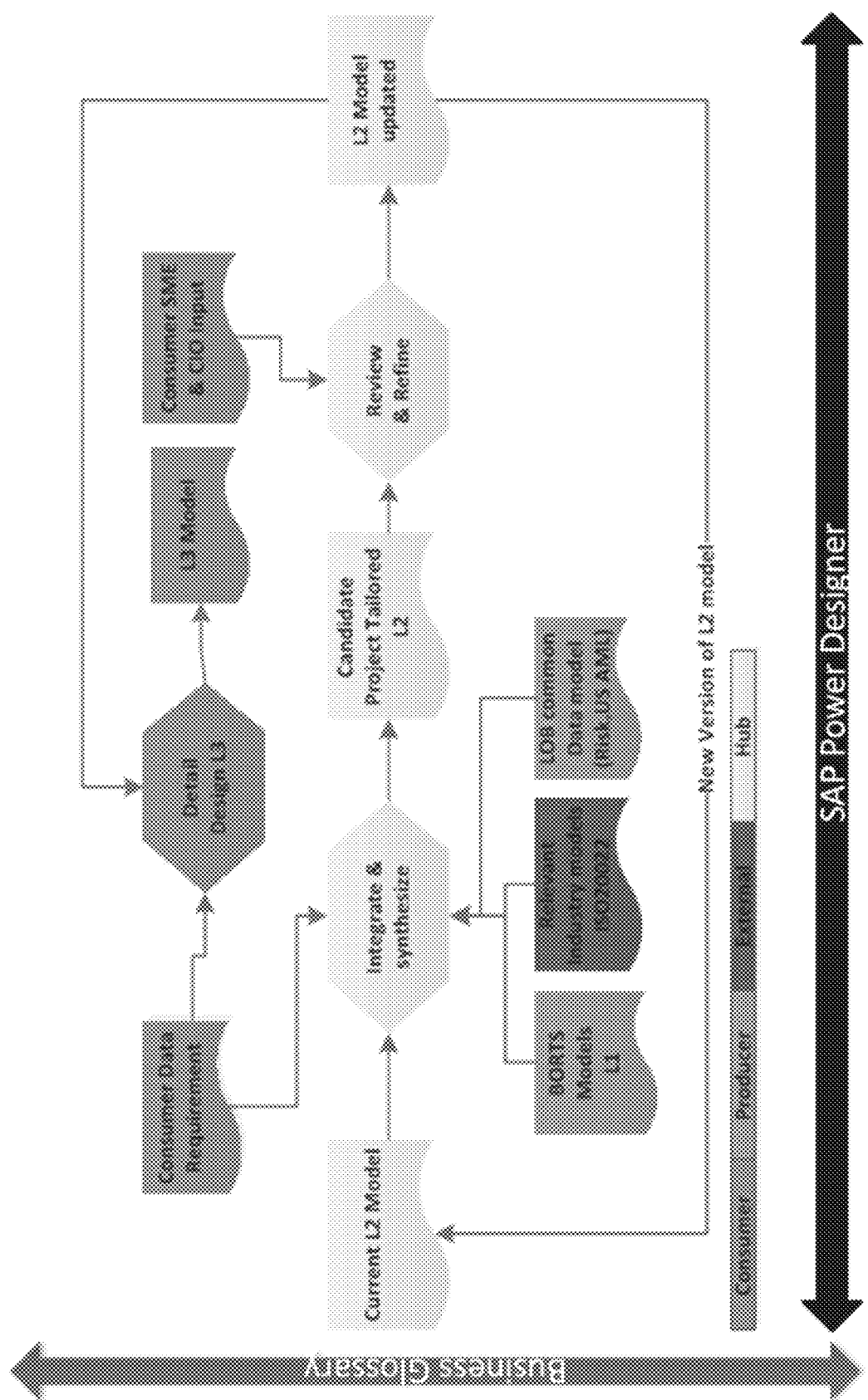
FIG. 5 shows an example level 2 and level 3 data model build out process in accordance with an embodiment.

FIG. 5 shows an example level 2 and level 3 data model build-out process in accordance with an embodiment. As illustrated, a current L2 model may be used to iteratively update a data model, based on level 1 data models and consumer data requirements. L2 model may also be used to design L3 data model.

Data maps may be generated based on meaningful data relationships. For example, data maps may be defined in an interface. From originating data source to a visual dashboard, users can track and view data lineage in a visual interface. Data maps may be generated by a human administrator, or may be automatically created based on data schema and metadata information.

Model data may be mapped to become curated datasets or graph datasets. That is, a group of data from data lake may be identified based on particular needs or requirements, and then transformed. The curated datasets may be generated on demand for a particular group of consumers based on the data maps, which can be used to identify relevant data for a particular user groups. In some embodiments, insights can be generated using the visual data mapping.

In some embodiments, machine learning may be applied to train data and generate the curated data for a particular consumption purpose. At the same time, machine learning may be used for event analysis to prevent fraud, or to generate predictions regarding the next offer to present to a potential customer. Curated datasets and graph datasets become ready for consumption such as analytic and reporting, or enterprise search and graph analytics.

Figure 6:
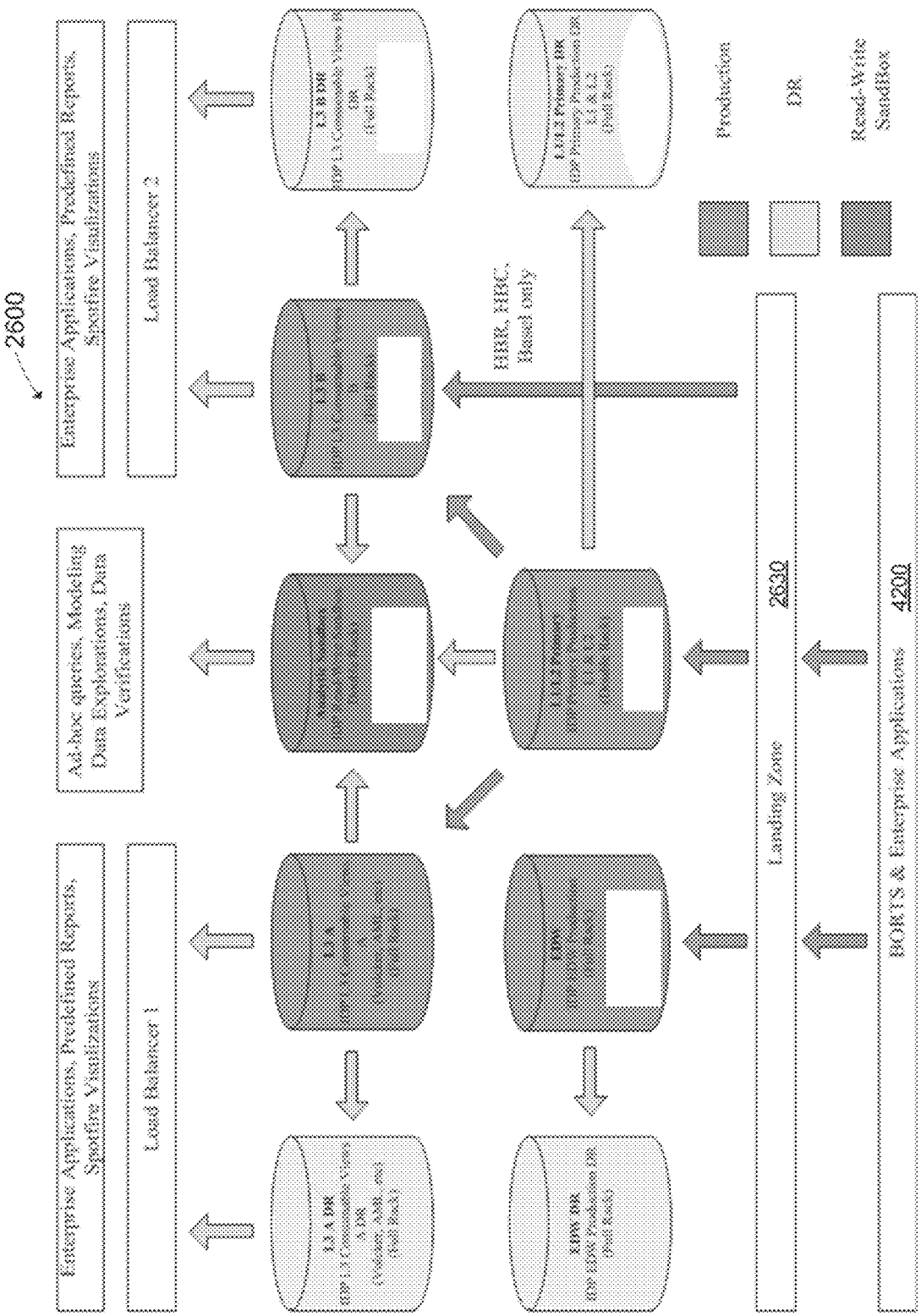
FIG. 6 shows various physical data appliances within IDP.

FIG. 43 shows example production data flows of a data repository system with data storage integrated with processing engines. FIG. 44 shows example sandbox data flows of a data repository system. These illustrate logical views of IDP. FIG. 6 shows a physical instantiation or construction of IDP.

As shown in FIG. 46, level 3 (L3) data population process is done in the L3 boxes. This approach has the advantage to leverage on the CPU power available in the L3 boxes. This aligns with the strategy of evenly distributing work load across entire IDP platform to provide a more stable and efficient platform for the business. There can be different views (interfaces) for different channels or consumption components.

Source data, either L1 or L2, will be extracted via Fluid Query and stored into Staging tables in L3 boxes. Source data will be purged following the Data Maintenance Guideline.

There can be a special case for L3 data population in the L1 and L2 Primary box: this special case is applicable if and only if the project requires large amount of historical data on L3 data population. In this scenario, due to the size of the historical data, it is recommended not to duplicate historical data into L3 boxes in terms of the efficiency in calculation and disk storage aspect.

L3 result will be populated from L1 & L2 Primary Box to its corresponded L3 box after the process. L3 data in L1 & L2 Primary Box will be purged following the Data Maintenance Guideline.

All Level 1 and Level 2 data may be stored in L1 & L2 Primary box, level 3 data may be stored in new Level 3 View box. To further enhance the performance of the two Level 3 box, L3 data is distributed into two L3 boxes based on below criteria: L3 View A Box (L3A)—Contains All L3 data, e.g. AML, Volcker, Customer 360, ECIF, etc.; and L3 View B Box (L3B)—Contains L3 Credit Risk data. No L1 & L2 Data.

A golden copy of source data can be stored at the L1 & L2 Primary box. A golden copy of L3 data can be stored in L3 box, based on above criteria.

FIG. 45 shows example IDP Physical Architecture, illustrating L0 to L3 data flow. At L0, data are extracted from various sources including BORTS, and stored in staging area, unique "audit ID" per file may be generated. From L0 to L1, ELT processes transforms BOR data to production-ready data. Unique "repository IDs" per row or record can be inserted into L1 tables From L1 to L2, data are processed and mapped to common data models for a portfolio, cleaned and ready for enterprise use. From L2 to L3, consumer-specific views are generated based on common data models. Data may be prepared on behalf of consumers for control of security and data ownership as well as to avoid multiple consumers to query IDP which may slow down its performance. In this example, CCAPS generates files for IDP. The application loads the files into the appliance (SSIS). IDP loads the file and, in response to a consumption request, transforms the file data. For example, at L0 the source data can be a string. At L1 the data is transformed from a string into columns with attributes (10 digit string is a SIN attribute) to define records. There can be an L2 optional transformation (but not required to use a common data model). At L3 (can go straight from L1 to L3) IDP generate files required for consumption and user can query at different levels. For some data domains there can be a defined L2 schema.

Referring back to FIG. 2, which illustrates an example system architecture of IDP 2100. As shown, IDP 2100 may process and customize data for various data consumers 4100 such as LOB group 4100*a*, risk group 4100*b*, finance group 4100*c*, AML group 4100*d* and marketing group 4100*e*. Each of the groups may have different data applications, such as reporting, modeling, discovery, reconciliation, alert, analytics, and so on. IDP 2100 may be configured to receive raw data from BORTS 4200, which may include LOBs Transaction Systems and reference data, and from external data sources 2500, which may include internet data, market data, purchased data, open data, and so on. IDP 2100 receives a consumption request and generates a result data set in response. The result data can be generated using L1 data. The result data set can be generated at the storage location of the source data.

In one embodiment, IDP 2100 may also provide scalable computing capacity to support a wide variety of heterogeneous compute-intensive workloads. For example, IDP 2100 may be configured to process batch, interactive-query, data-exploration, streaming/stream-processing, and near real-time ("OLTP") requests. The computing capacity may be linearly scalable, scalable independently of storage. The computing capacity may facilitate multi-tenancy; fine-grained resource allocation and workload management, and pre-emptive scheduling.

Data Movement

In one embodiment, IDP 2100 may be configured to implement loosely-coupled data flows and avoid tightly-coupled designs where data flow and/or control is centralized within one overarching component. Instead of using a "pull model" where IDP is responsible to "pull" files/"orchestrate" file delivery from BORTS into IDP, IDP may use a loosely-coupled "pull" model to orchestrate file movement (in the case, for example, of BORTS data being loaded into IDP), allowing for clean operational boundaries and separation of responsibilities.

In one embodiment, IDP 2100 may be configured to move the code to the data instead of moving the data to the code. That is, distributing computation across the data lake, leveraging Hadoop's massively parallel processing (MPP) capabilities, instead of moving data out into a separate compute environment/cluster to be processed.

In one embodiment, IDP 2100 may be configured to use MFT-direct-to-HDFS for landing source files in IDP. Batch data loads (e.g. BORTS data to be loaded into IDP) may be transferred to the IDP Landing Zone (hosted on HDFS) using managed file transfer system and deposited directly into HDFS. Not only does this avoid the need for additional "native" storage for a "landing zone" outside of Hadoop, but it improves performance by reducing unnecessary I/O and leveraging HDFS's parallel-write capabilities.

In one embodiment, IDP 2100 may provide an enterprise data science platform configured for data exploration, collaboration, deep analytics, machine learning, and AI. The data science platform may be implemented using tools like Dataiku in some embodiments. The platform may enable faster and more cost-effective model development. IDP 2100 may also provide a single, enterprise-wide, repository of metadata and self-service data access. IDP 2100 may also provide user-writable sandboxes.

In some embodiments, IDP can be used to implement collaborative data science platform.

Data Science Platform capabilities may be evaluated based on the criteria described below.

1. Collaboration Capabilities Across Model Lifecycle
    a. Setting up projects/project teams for effective collaboration; organizing shared artifacts into projects
    b. Sharing commentary between Development/Validation teams for questions and clarifications
    c. Team activity tracking
    d. integration with code repository for versioning and baselining model artifacts (documentation, data and code) at various stages of lifecycle
    e. Audit capabilities-Modeling activities and comments are captured for easy access and publishing
2. Model Development (Click or Code)
    a. Visual Modeling: Make transition into R/Python easier for existing SAS users, Citizen data scientists and new modeling users
    b. Simplify access to multiple hand-scripting tools—e.g. Jupyter/RStudio integration for R, Python & Scala; Minimize need for technical knowledge for modelers on working with Hadoop/Spark
    c. Integrated Data Prep during model development suitable for modelers to iterate during model dev, validation and testing-including comprehensive data profiling (univariate, crosstab)
    d. Push-down execution of Model Training & Data Prep steps in Spark/Hadoop (closer to data in Data Lake)
4. Model Validation & Model Performance Monitoring Capabilities
    a. Ability to create multiple challenger models with a variety of alternate algorithms/assumptions to compare against Model developer's submission
    b. Built-in Model Validation & Model Performance testing functions & related reports
    c. Ability to version code/datasets, package them and move between stages (Dev to validation to Prod)

5. Algorithm Library & Reusable Code Repository
   a. GUI displaying a library of approved algorithms for Statistical Modeling, Machine Learning & Deep-Learning—e.g. Python Sci-kit learn, Spark ML Lib, H2O sparkling water, XGBoost, cloud services
   b. Ability to add custom algorithms into the library—e.g. common model validation tests
6. Model Promotion & Execution
   a. Ability to deploy model as a batch execution job (without recoding)
   b. Ability to create a REST API for deploying as a service for real-time scoring from another application (say, credit scoring during onboarding)
   c. Ability to build a Web-App to provide a scoring GUI for certain use cases—e.g. what-if analysis application for pricing.

In one embodiment, IDP 2100 may provide enterprise-grade data governance. For example, IDP 2100 may provide data access and control that is well-controlled, efficient and easy access by authorized users to the data they need. In some cases, the data governance configuration can manage data as a corporate asset, with enterprise-level data quality and data profiling. There is also enterprise-wide data lineage, as well as capturing filtering, mapping, and transformation of critical data elements across the enterprise. IDP 2100 enables consistent, efficient systems development life cycle (SDLC) across all data types.

Data governance component 2112 may include performance reporting 2112a, data access control 2112b and metadata hub 2112c. Performance reporting component 2112a may generate reports on data usage and data consistency, based on user feedback and internal rules. Data access control 2112b may be used to implement or restrict user access, based on user roles and rights as set by administrators or by default settings. Policies and workflow may both affect user access rights. Metadata hub 2112c may store metadata settings and other related data schemes, and may have sub-components such as models, glossary, data lineage and data quality.

Data discovery and visualization 2114 component may generate, prepare and explore enterprise-grade data to perform big data analytics. For example, it may visually prepare, profile, and transform the raw data in the data lake into appropriate format for display and presentation. In some embodiments, an analytics platform may be used to implement data discovery and visualization.

Machine learning 2115 and cognitive computing may be implemented to decrease data model development time and enable self-learning predictive models and analytics, improving AML, fraud detection, marketing efforts, and so on. Advanced data analytics may be performed by machine learning. For example, machine learning component may be leveraged to conduct CRI Analytics, AML Analytics, marketing, and Cyber Analytics.

Big data analytics component 2117 may be performed on raw, unstructured, or semi-structured data, as well as structured data. Big data analytics 2117 may also leverage machine learning component to analyze data. In addition, with big data analytics, on-premises deployment is not required. Instead, cloud-based infrastructure (e.g. Amazon AWS, Microsoft Azure) may be implemented to provide significant time-to-market and innovation advantages, while at the same time reducing overall cost of ownership.

Traditional data analytics 2116 may be responsible for performing data analytics on structured data.

Distributed computing component 2118 can be configured to provide scalable, distributed computing power to process raw and curated data sets. A network of autonomous computers may be leveraged to provide scalable computing capacity.

Sandbox 2130 and self-serve data components 2131 may be configured to offer users an ability to request and receive raw or semi-processed data from Netezza or Hadoop data lake into a private area and be able to use other advanced analytics tools to transform the data and prepare data models. The sandbox may be configured to provide business data-glossary, enabling self-serve provisioning of data sandboxes, including data and tools, self-serve model- and data-promotion to production. In some embodiments, sandbox 2130 may provide model development/validation, data discovery or data verification/validation that is not for production use. Sandboxes may be created and maintained in IDP (Netezza, Hadoop, Datameer Server, R/Python Server, SpotFire Server) to ensure end to end control over security and privacy of data and lineage and cost efficiency.

Sandbox 2130 may be set up with initial limitations, for example, each sandbox may be limited to a particular size (disk space) and time limit (e.g. no more than 1 year). For data security reasons, one user may be limited to no more than one sandbox user community.

Self-serve data components 2131 may provide user selection of analytical tools\. There can be provided user privileges to create new objects (e.g. tables and views).

In addition, there may be provided user ability to share data with others in their sandbox user community (e.g. via a stored procedure). There may also be user ability to bring in additional data, provided by support for one-time intake as well as regular data intake.

In some cases, IDP sandbox data cannot be written back into IDP production area, and IDP production data is read-only for all sandbox activities.

FIG. 34 shows the standard process for self-service data access, preparation, reporting/analytics, and promotion to production: 1. Business users use a BPM workflow to specify attributes (data set/s, size, tools) for a new sandbox, which is automatically provisioned after approval; 2. Users prepare data, business rules, etc.—with the ability to pull in data from ad hoc (non-IDP) data sources as well as IDP; 3. Users create analytics, reports, visualizations, machine-learning models using tools; and 4. Users "hand-off" prepared data sets, models, analytics, etc. to IDP for deployment to production.

FIG. 35 shows an example IDP Integration-Logical Architecture. The connection types include: remote servers via SSH, databases via JDBC, web services, and distributed file systems.

FIG. 36 shows an example IDP Logical Architecture-Objects Workflow. An analytics platform administrator can create Connections that point to external data sources. Users can create Import Jobs or Data Links that leverage Connections to bring data to analytics platform. Users create Workbooks that profile, clean, prepare, aggregate, filter, join, sort and compute data from the Import Jobs and Data Links. One Workbook can provide data to another Workbook. Users build Infographics to visualize results from one or more Workbooks. Users create Export Jobs to send Workbook results to external locations, including HDFS directories, Tableau Server, Tableau TDSX files, RDBMS and other File Systems. Metadata data for all analytics platformobjects may be stored in MySQL, including Connections, Import Jobs/Data Links, Workbooks, Infographics, Export Jobs. Import Job results and Workbook results may be stored in analytics platformHDFS directory.

FIG. 37 shows example Authentication and Authorization. An analytics platform provides LDAP/Active Directory (AD) authentication and managing users. Administrators can configure analytics platformto use their existing LDAP or Active Directory system as the system of record for centralized management of user identity, organizational units, and credentials. Users can authenticate into analytics platformusing their credentials, which are checked against LDAP/AD on every login. Users are identified as a member of group(s) just like in LDAP/AD.

The system provides role-based access that controls which user can perform specific tasks within the application. The viewing, creation and execution of jobs (such as ingest and analytics) are governed by role membership, as are performance of administrative functions and the scope of artifact sharing. Individual user can only access his/her own artifacts (file, job, connection and etc.) unless group sharing is enabled.

FIG. 38 shows Collaborative Data Exploration.

A Notebook (as part of consumption 7300) is an web application that allows a user to create and share documents that contain live code, equations, visualizations and explanatory text. Uses include: data cleaning and transformation, numerical simulation, statistical modeling, machine learning and much more. Jupyter is run on edge nodes, with notebooks able to access the full power of Hadoop. Jupyter Notebook provides multi-language support for over 40 programming languages, including those popular in Data Science such as Python, R, Julia and Scala. Notebooks can be shared with others using email, Dropbox, GitHub and the Jupyter Notebook Viewer. Jupyter Notebook can produce rich visual output such as images, videos, LaTeX, and JavaScript. Interactive widgets can be used to manipulate and visualize data in real time. Jupyter Notebook can provide multi-framework support such as multiple Hadoop compute/analytic frameworks and data tools, such as Apache Spark, Python, R and Scala, can be used to explore data stored in Hadoop.

IDP 2100 may use RStudio (also known as "R") for data analytics. R is a powerful programming language for statistical computing, machine learning and graphics. Generally, there may be four options for building R to Hadoop integration:

Running R on central server (pull data to the R server);
Wrap R code on central server and submit to Hadoop server;
Push down R functions to Hadoop through RHive; and
Execute R inside Hadoop using MapReduce algorithms.

FIG. 39 shows an example logical architecture of IDP—R Integration.

FIG. 40 shows example advantages of IDP—R intergration.

FIG. 41 shows example IDP—R Integration—Production Physical Architecture.

FIG. 42 shows example authentication and authorization scheme of RStudio.

RStudio Server Professional Edition can authenticate users via the Linux standard PAM (Pluggable Authentication Module) API. PAM is configured to authenticate against ActiveDirectory. RStudio Server requires a local user account to be created in order for it to launch a R session on behalf of the user. These local user accounts do not and will not have shell level access to the server.

In terms of authorization, the access of users to the R-Studio server file system and Hadoop HDFS are authorized through POSIX. The access of user to Hadoop HIVE is authorized through Ranger. The access of user to Hadoop resource manager YARN is controlled by Ranger.

Central data hub 3000 may enable utilizing advanced predictive analytics in conjunction with enterprise data to increase revenue growth using deep analytics capabilities and improve customer experience.

Central data hub 3000 can consolidate diverse data preparation and consumption tools by providing strategic, enterprise tools, thereby decreasing total cost of ownership.

Central data hub 3000 can provide storage for all types of data, including unstructured, semi-structured and structured (e.g. BORTS) of data. Data aggregation and consumption costs may be decreased. The data hub may encourage cost-effective growth in storage and compute capacity (independently of each other).

In some embodiments, central data hub 3000 may run without Netezza, which can address certain performance and storage limitations, and provide cheaper long-term growth platform for structured data/analytics.

In some embodiments, central data hub 3000 may provide support for a variety of compute patterns/data-processing workloads: batch, analytics, ad-hoc/data exploration, data preparation, (near-) real-time, OLTP, on a linearly scalable storage and compute foundation.

In some embodiments, central data hub 3000 may directly support the a number of data governance objectives. For example, the data hub may provide: single high performance platform with scale, technology supported with tight SLAs, scalable lower cost environment, fit-for-purpose capabilities to rationalize license fees, reduced on-going manual reporting efforts through automation, and analytics environment with fully captured lineage and may facilitie to measure data quality and launch remediation plans.

Referring now to FIG. 6, IDP may include various appliances including four for production (Primary, L3A, L3B and EDW), one for the Analytic Sandbox, and four for DR. The use of multiple appliances can be linked to the storage and compute needs of a data platform. In some cases, there is a need to replicate data between appliances. FIG. 6 shows a physical view of IDP (logical). EDW can refer to a legacy data repository. The L1/L2 levels can refer to loading data and loading schema to generate transformations for L3A (reporting) L3B (risk)/sandbox view can be used for experimental models etc. away from production data and systems.

Figure 7:
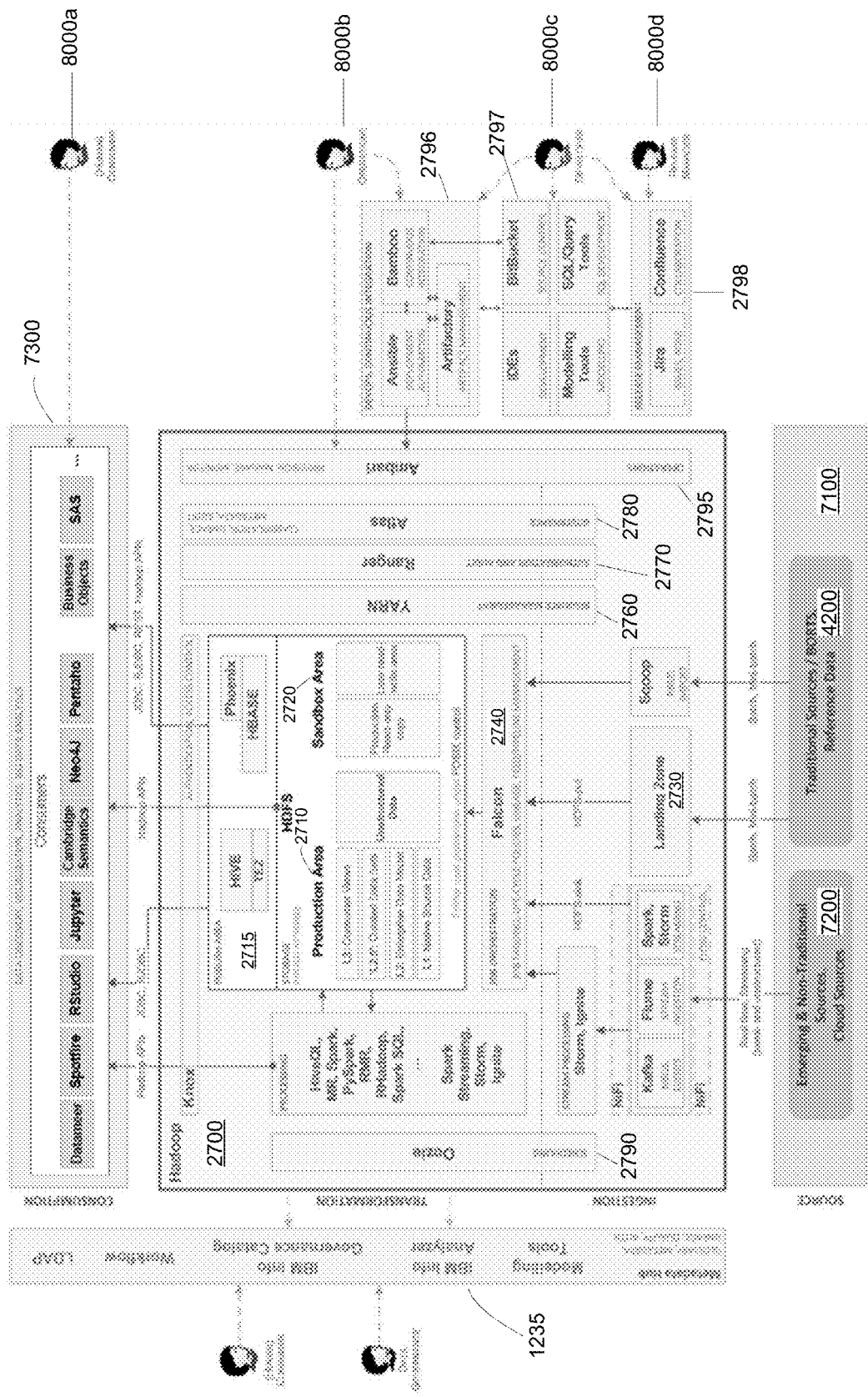
FIGS. 7 and 8 show an example logical architecture of IDP.
Figure 8:
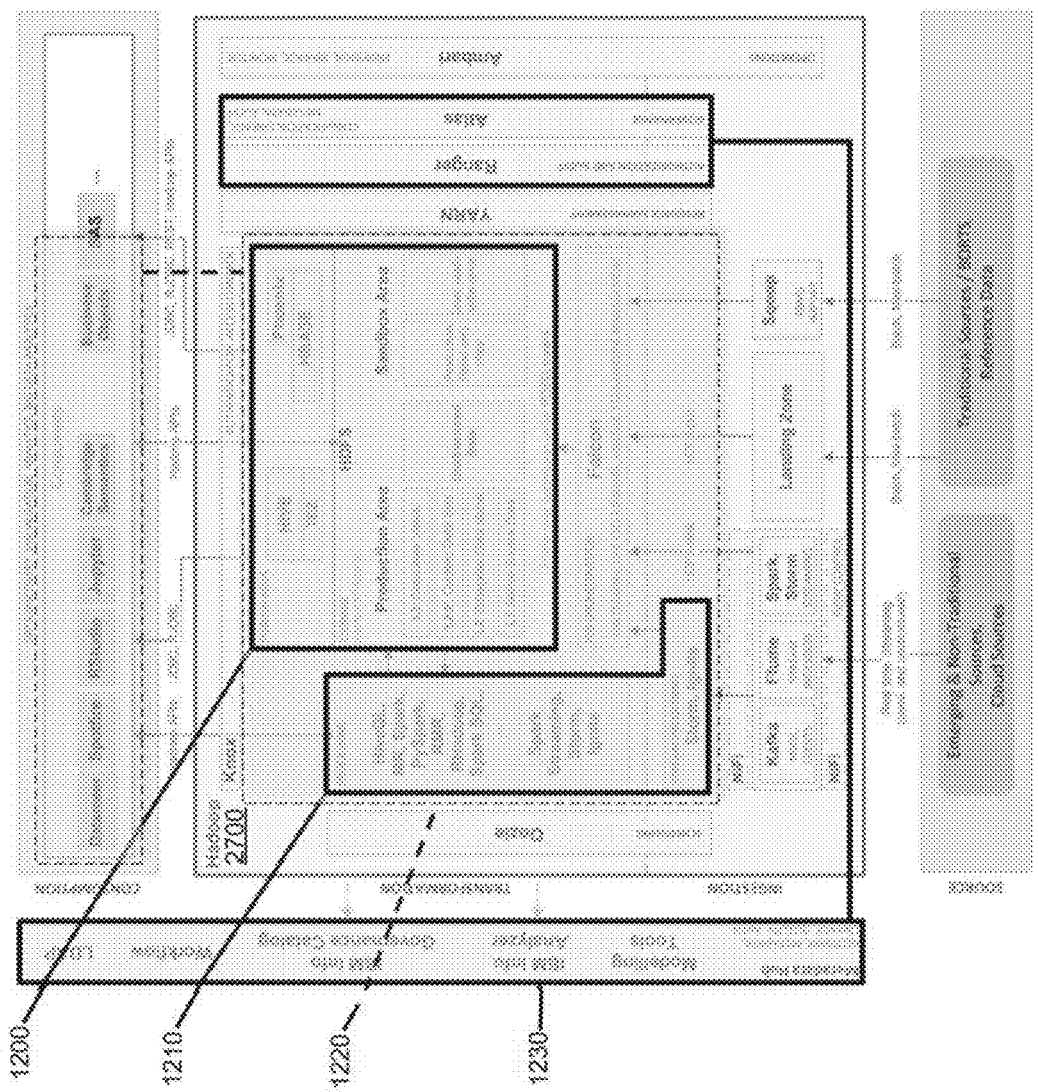

FIGS. 7 and 8 illustrates individual components of IDP 2100, in accordance with one embodiment. A highly-scalable data storage 1200 may include publish area 2715, production area 2710 and sandbox area 2720. Production area 2710 may prepare raw and processed data for consumption. The data may be structured, semi-structured, unstructured, or time-sensitive data. Production 2710 may include different levels of data, namely, L0 staging data, L1 native source data, L2 enterprise data model, L2.5 curated data set, and L3 consumer view data, which are described in detail herein. Data storage 1200 may include a central aggregation and distribution point ("book of reference") for all book-of-record data within the organization. Publish area 2715 may be configured to prepare and publish data for consumption 7300. Multiple "access engines" (e.g. Hive, HBase, Phoenix) within Publish Area 2715 may be configured to meet consumer-specific SLAs and requirements.

Consumption 7300 may be carried out by various data application such as Datameer, Spotfire, RStudio Jupyter, Cambridge Semantics, Business Objects, SAS, and so on.

A scalable computing component 1210 may include processing component and stream processing component. The computing component 1210 can process heterogeneous compute-intensive workloads, such as data batch, interactive-query, data-exploration, streaming/stream-processing, and near real-time ("OLTP"). The computing component 1210 may be carried out by a data repository system such as Hadoop. The computing component 1210 also support multi-tenancy, fine-grained resource allocation and workload management, and pre-emptive scheduling. Automated workflows (access request & approval, sandbox environment provisioning, etc.) may be provided computing component 1210.

Both data storage 1200 and computing component 1210 support linear scalability, where each application can scale just by adding more machines and/or CPUs, without changing the application code.

Enterprise data science 1220 may include computing component 1210, production area 2710, publish area 2715, sandbox area 2720, and job orchestration 2740. Enterprise data science 1220 may be configured to provide data exploration, collaboration, deep analytics, machine learning, and AI, enabling faster and more cost-effective model development. A single, enterprise-wide, repository of metadata, self-service data access, and user-writable sandboxes are also provided by enterprise data science 1220.

Enterprise-grade data governance 1230 may include metadata hub 1235, authorization and audit 2770 and data governance 2780. Authorization and audit 2770 may provide data access and control, facilitating well-controlled, efficient and easy access by authorized users to the data they need. Data governance component 2780 may manage data as a corporate asset. Metadata hub 1235 ensures enterprise-level data quality and data profiling as well as enterprise-wide data lineage (capturing filtering, mapping, and transformation). Consistent, efficient SDLC across all data types may be provided as well. Unified, authoritative, access to enterprise-wide reference data may be provided by Enterprise-grade data governance 1230.

In one embodiment, data ELT (Extract-Load-Transform) transformation may be performed by a data repository system such as Hadoop 2700. The system may have storage and processing capabilities.

In some embodiments, some or all of the ELT jobs processed within IDP 2100 may be performed using a SQL-based ELT approach (see e.g. FIG. 63): data may be extracted from source systems and delivered to the IDP landing zone; data is loaded into Netezza; then data is transformed (within Netezza) using SQL scripts that "slice and dice" the data, creating Level-1, Level-2, and Level-3 datasets from the raw data. The SQL scripts may be plain ASCII text files, which can be source-controlled and updated easily, improving developer productivity and cross-team work.

In some embodiments, a "Lift and Shift" approach for migrating from Netezza to Hadoop may use automated SQL-script conversion tools to convert ELT scripts from Netezza-SQL to Hadoop-specific SQL syntax (HiveQL, etc.), and uses standard Hadoop components (Oozie, Hive, etc.) to provide the "ecosystem" within which the ELT jobs are run. The existing (Netezza-based) ELT jobs may make use of a common "ELT Framework", which provides consistent operational logging, error reporting, SLA tracking and management, etc. using a shared set of control- and logging tables. The "Lift and Shift" approach uses these same tables, providing a consistent, unified operational view of all ELT jobs executed within IDP (whether on Netezza or Hadoop).

The Hadoop ELT Framework, which is developed in-house, provides a consistent framework for job execution and tracking, operational logging, error reporting, SLA management, and so on. The Hadoop framework may efficiently supports daily execution of over 1,500 ELT jobs. Both the Netezza- and Hadoop-based frameworks utilize the same set of "control tables" and log tables, allowing consistent, unified reporting via Spotfire. Shown in FIG. 86 are screenshots showing an example job control flow for both SSIS (used to orchestrate Netezza-based jobs) and the matching Oozie workflow (used to orchestrate Hadoop-based jobs).

Using a "lift-and-shift" approach to migrate Netezza-based ELT jobs to Hadoop may provide the following benefits: automated and/or semi-automated conversion of existing SQL scripts from Netezza SQL to Hadoop-centric SQL (Hive, say) may be dramatically faster than starting from a clean slate; the IDP-developed ELT framework provides for configuration-based SLA management, control, and reporting, as well as consistent logging and error reporting across ~1,500 jobs. This SQL-based ELT framework has been ported to Hadoop, and using this framework on Hadoop will allow Hadoop ELT jobs to seamlessly integrate into the existing operations and SLA management "plumbing" (including Spotfire dashboards, etc.). In addition, using automated conversion of existing Netezza-SQL-based scripts to HiveQL results in migration from Netezza to Hadoop becoming, essentially, a syntax migration. As a result, developers do not need to understand or re-examine the logic required to transform, say, a given L1 schema into L3. This may greatly reduce the development and testing effort required to move from Netezza to Hadoop.

Using a SQL-based approach may allow seamless use of the same user-defined functions (UDFs)—including Optim UDFs used for data masking, encryption, etc.—across both Netezza and Hadoop.

The current data lineage (captured in Power Designer Data Movement Models (DMMs)) may be unchanged if a purely syntactical (SQL syntax) migration approach is used, since the resulting tables may be identical in both Netezza and Hadoop.

Streaming data processing, which takes care of real-time or near real-time data ingestion from non-traditional data sources 7200 and in-memory processing may be processed by applications such as Storm and Ignite.

Standard Hadoop data governance components 2780, 2740, 2770 (Atlas, Falcon, Ranger) may work in concert with other software to provide enterprise level data governance.

IDP can support diverse computational workloads, from different user communities, on a unified Hadoop cluster, with YARN 2760 providing the needed foundational capabilities. YARN may be referred to as "Yet Another Resource Negotiator", which is a "data operating system"/job scheduler.

Figure 11:
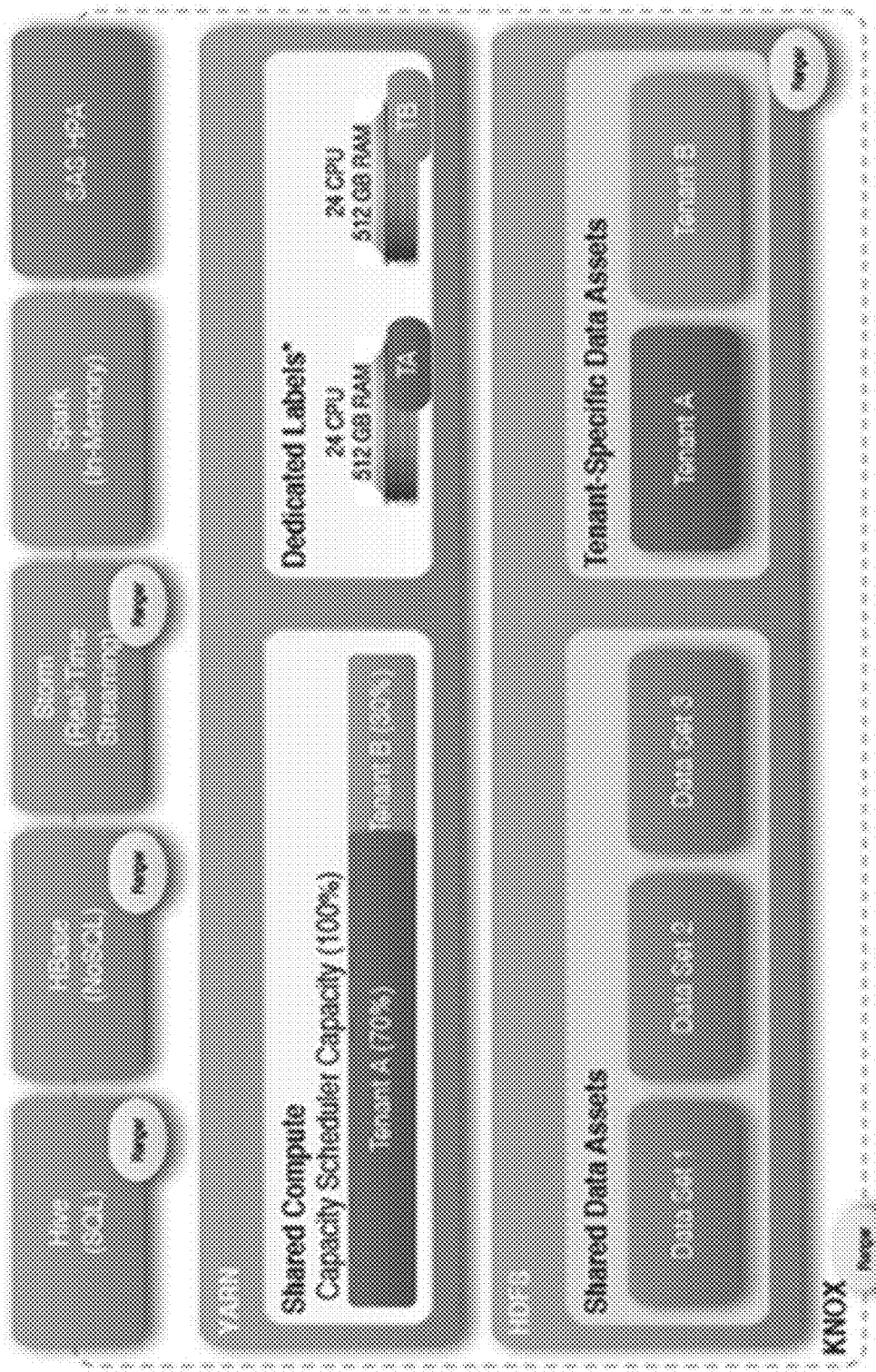
FIG. 11 shows components of resource management application YARN and Authorization and Audit application.

Referring now to FIG. 11, which shows components of resource management application YARN 2760 and Authorization and Audit application 2770. YARN 2760 allows diverse, heterogeneous, workloads, e.g. batch, interactive analytics/query, (near-) real-time OLTP-like queries and updates, to seamlessly coexist on a single (or unified) Hadoop cluster.

Policy-based capacity scheduling allows tenants to share resources, allowing capacity guarantees to be defined (e.g. dedicated minimum and "burst" resource allocations), including pre-emption: while a cluster is idle, a tenant can use additional resources beyond the assigned minimum, but when the cluster becomes "busy", the tenant's compute tasks have their resources transparently scaled back to the guaranteed minimum.

In addition, dedicated labels allow specific hardware/nodes to be dedicated to specific tenants and/or specific workloads.

Efficient and easy administration of resource allocations, etc. via the Ambari 2795 based UI.

Figure 12:
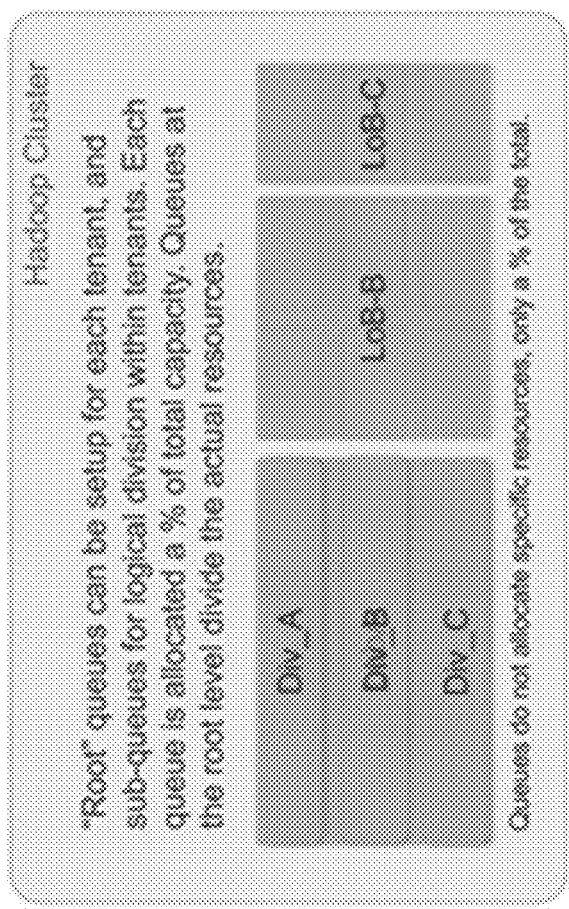
FIG. 12 shows an example root queue, with queues, sub-queues and ACLs.

Referring now to FIG. 12, which shows an example root queue, with queues, sub-queues and ACLs providing per-tenant resource guarantees. "Root" queues can be set up for each tenant, and sub-queues for logical division within tenants. Each queue may be allocated a portion of total capacity. Queues at the root level may divide the actual resources, while sub-queues can sub-divide resources allocated to them.

In one embodiment, there may be provided a scheduler of queues, such as a capacity scheduler, which allows for multiple tenants to share resources. Queues limit access to resources. Sub-queues are possible allowing capacity to be shared within a tenant. Each queue has ACLs associated with users and groups. Capacity guarantees can be set to provide minimum resource allocations. Soft and hard limits can be placed on queues. Tuning of queues and limited minimize idle resources.

YARN's resource management extends not only to Java-based applications, but all the way down into native Linux resource allocation (e.g. Linux CGroups CPU allocation, enforced by the Linux kernel) and Windows (native Job Control). This operating system-level resource management allows resource guarantees/SLAs to be enforced even with "non-Hadoop" applications (e.g. Docker-ized applications, native Unix/Windows applications, etc.).

Figure 13:
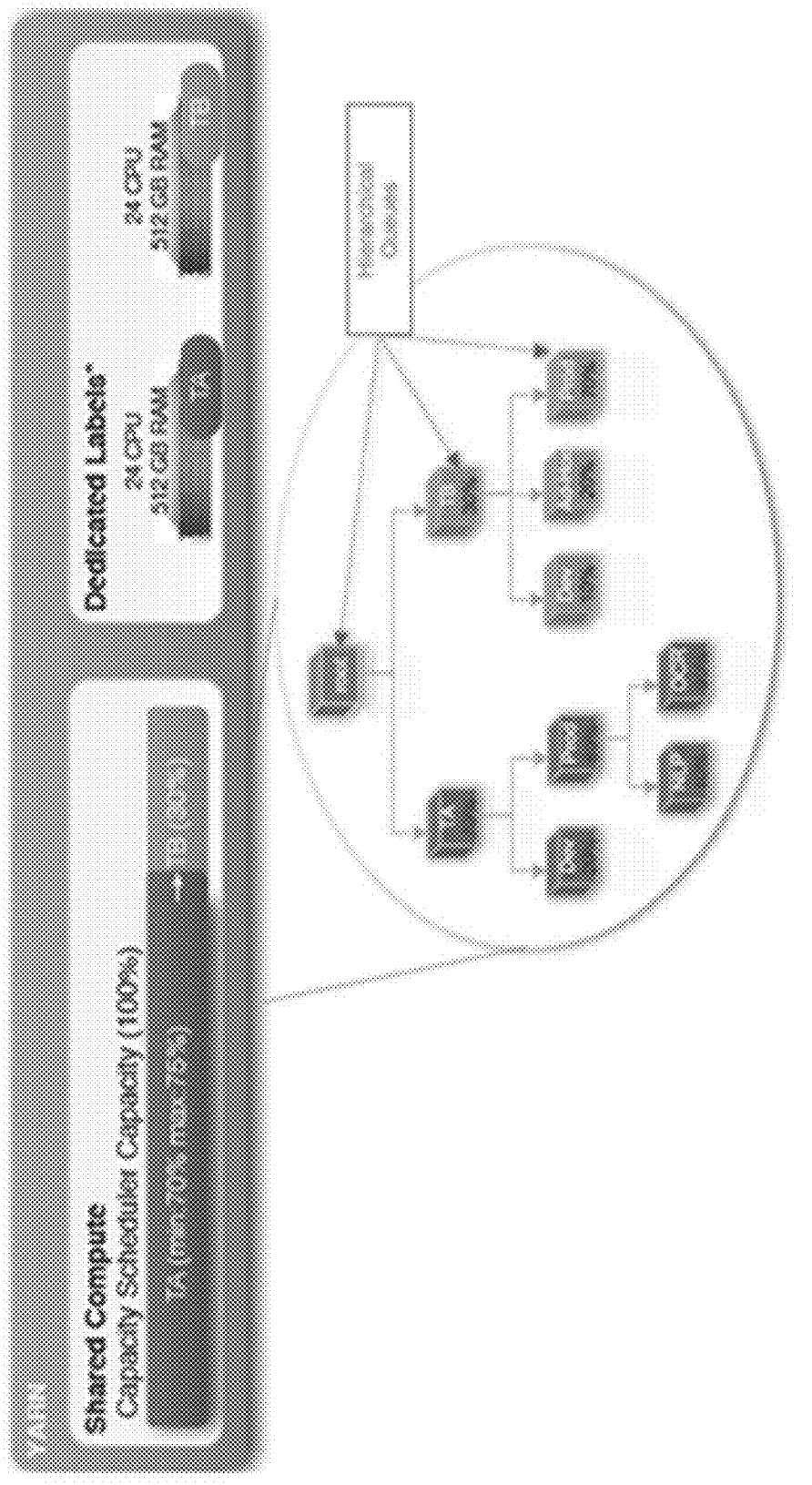
FIG. 13 shows example fine-grained resource allocation.

FIG. 13 illustrates fine-grained resource allocation of YARN, which shows hierarchical queues, resource isolation (Linux CGroups CPU, memory; Windows job control), SLAs, pre-emption, and administration of queue ACLs, runtime re-configuration for queues and charge/show-back.

In some cases, native Unix/Linux applications can only be run on a Hadoop cluster where compute nodes are running Linux. Likewise, native Windows applications can only be run on compute nodes that are running Windows as the underlying operating system. Within IDP, all nodes (admin, edge, and compute/data nodes) can run Redhat Linux.

For certain use cases, however, using "schema on read" access engines, and processing "raw" data for each query, for example, is inefficient and may not meet SLAs or throughput requirements. In these cases, raw data is transformed into "processed" form, and stored in a format optimized for one or more "access engines". For example, raw data might be transformed into columnar data and stored within HBase, allowing clients to benefit from HBase's (and perhaps Phoenix, a SQL layer that runs on top of HBase) high throughput and low-latency queries.

Figure 9:
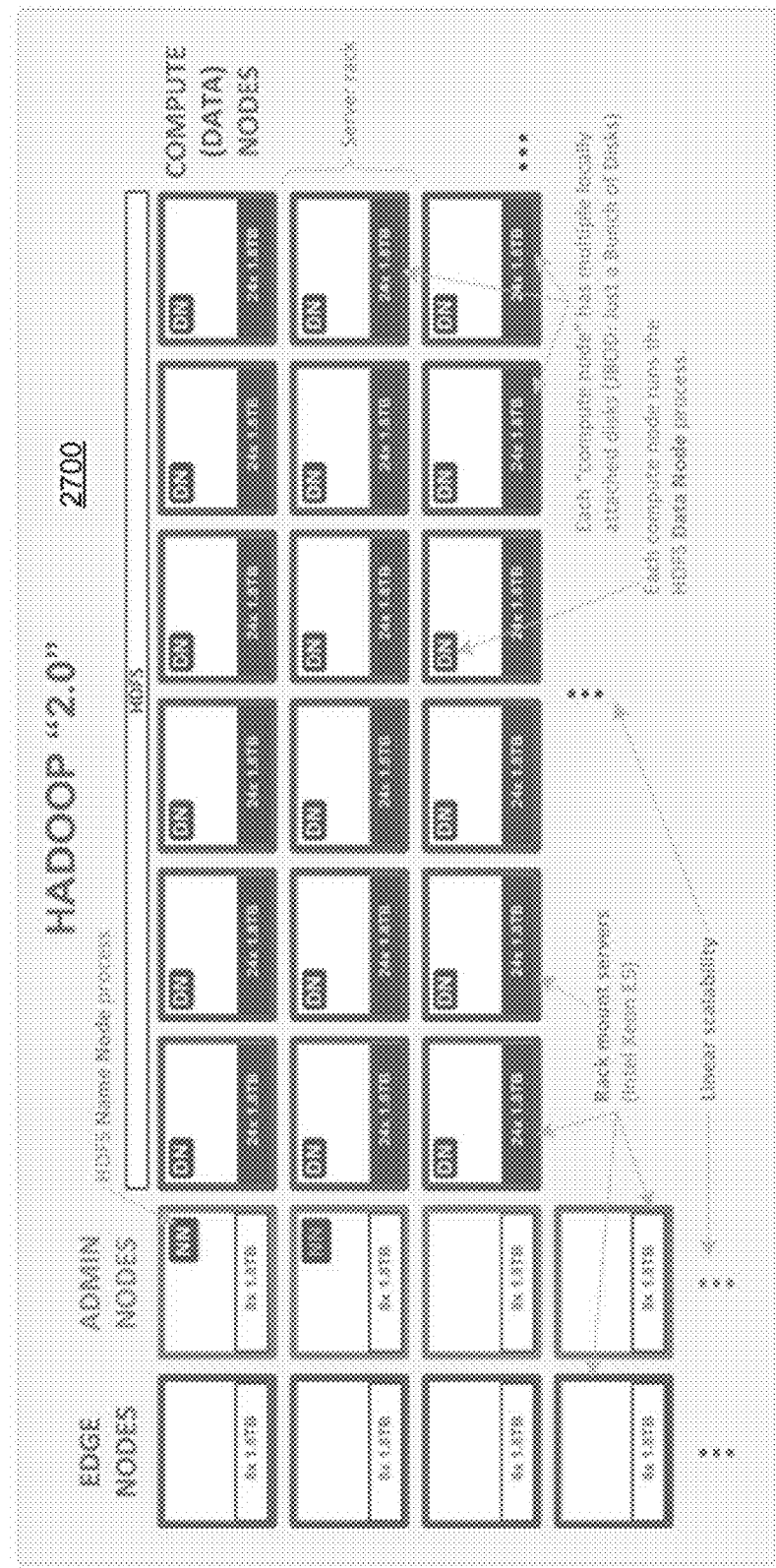
FIG. 9 shows a data repository system with unified "compute and data" nodes.

In one embodiment, as shown in FIG. 9, IDP 2100 may include a data repository system 2700 leverage unified "compute+data" nodes. Each compute/data node may have multiple, locally attached, storage devices. For example, the standard Hadoop HFDS Name Node process may be run, in standard Hadoop fashion, in a fault-tolerant configuration on multiple admin nodes. With this structure, linear scalability of both storage and compute capacity can be achieved.

In standard Hadoop parlance, the term "data node" may refer to the combination of both storage (locally attached) and compute, in a single "node".

Figure 10:
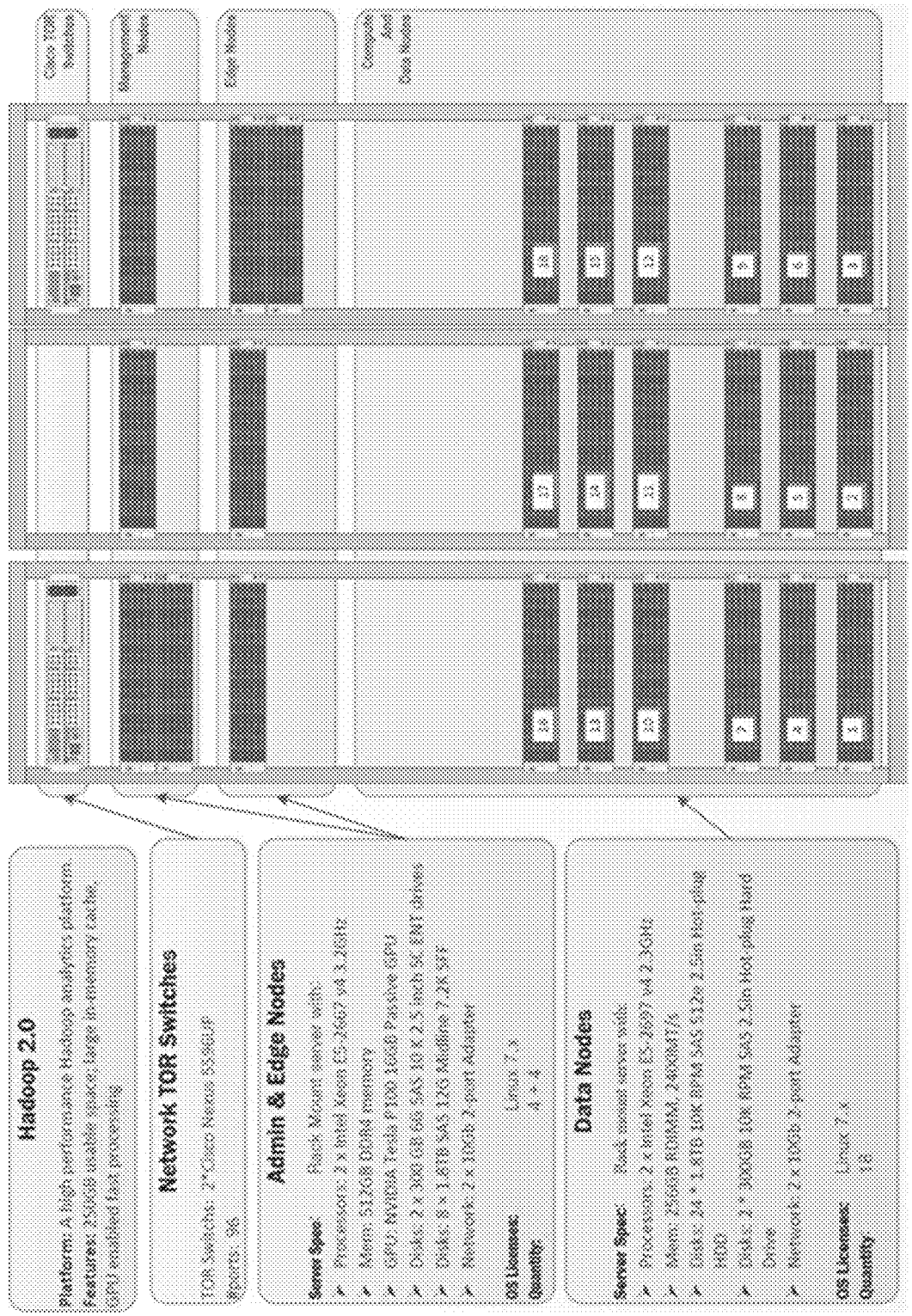
FIG. 10 shows an example physical configuration of the IDP cluster, using a Hadoop setup.

FIG. 10 shows an example physical configuration of the IDP 2100 cluster, using a Hadoop 2700 setup, including 18 compute/data nodes. Additional racks and nodes may be added on as-needed basis to meet growing storage and compute capacity demands.

The table below lists the hardware specifications for admin, edge and data nodes in "Hadoop 2.0" Phase 1:

| | HPE |
|---|---|
| Edge and Admin Servers (admin nodes × 4, edge nodes × 4) | HPE DL380 Gen9<br>Processors: 2 × Intel Xeon E5-2667 v4 3.2 GHz<br>Mem: 512 GB DDR4 memory<br>GPU: NVIDIA Tesla P100 16 GB[1] Passive GPU<br>Disks: 2 × 300 GB 6G SAS 10K 2.5 inch SC ENT drives<br>Disks: 8 × HPE 1.8 TB SAS 10K SFF<br>Network: 2 × 10 Gb 2-port Adapter |
| Data Nodes (×18) | HPE DL380 Gen9<br>Processors: Dual 16-core Intel Xeon E5-2697 v4<br>MEM: 256 GB DDR4<br>Disks 24 × HPE 2 TB SAS 12G Midline 7.2K SFF<br>Disks 2 × 300 GB 6G SAS 10K 2.5 inch SC ENT drives<br>Network: 2 × 10 Gb 2-port Adapter |

Performance (Per GPU):

| | |
|---|---|
| Double-Precision | 4.7 TeraFLOPS |
| Single-Precision | 9.3 TeraFLOPS |
| Half-Precision | 18.7 TeraFLOPS |

In some embodiments, Hadoop may operate on the principle of "bring the code to the where the data is" (in contrast to the traditional compute model of "bring data to where the code is"). Thus, each compute/data node may consist of a combination of both compute (CPU, memory) and storage (disk, etc.). However, a homogeneous arrangement—where all data nodes have the exact same attached storage device/s, isn't optimal. As a data lake grows, not all data is "hot" or "active" data.

For example, some "hot" data nodes, where high throughput is required, might have locally attached SSDs (and, likely, high CPU and memory capacity), while "cold" data nodes might have high-capacity spinning disks (and possibly less CPU and memory resources).

Figure 14:
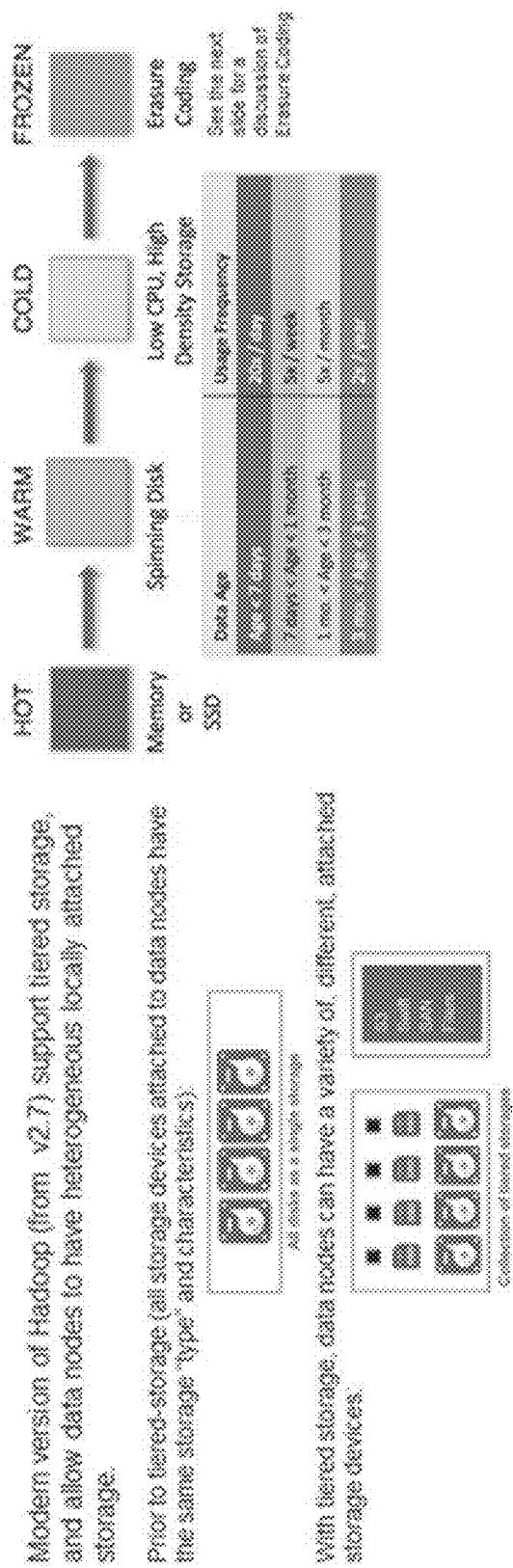
FIG. 14 shows example tiered storage.

Tiered storage allows Hadoop to "be aware" of the performance characteristics of each data node's attached storage, and transparently move "hot" or "cold" data to the most suitable data nodes. Data is tagged as "hot", "warm", "cold", "frozen", etc. using administrative polices and/or batch processes, and HDFS transparently moves data to matching data nodes in response. As data ages and "cools down", it can be moved to cheaper (albeit slower) storage, as shown in FIG. 14. Modern version of Hadoop (from v2.7) support tiered storage, and allow data nodes to have heterogeneous locally attached storage.

Figure 15:
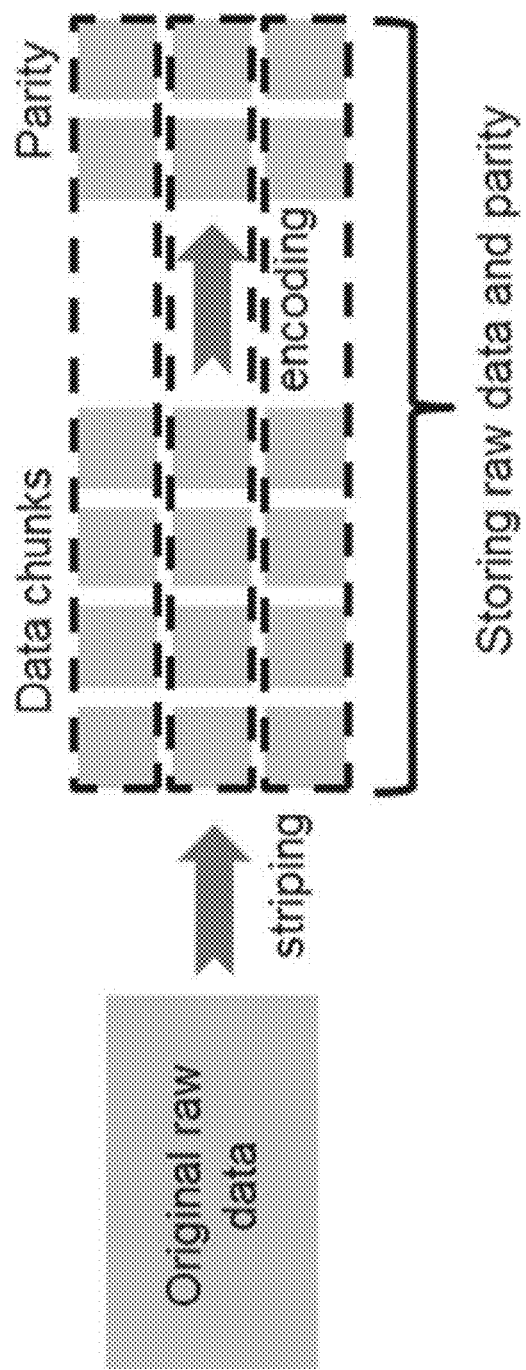
FIG. 15 shows raw data storage with parity.

In some embodiments, erasure coding (see FIGS. 15 and 16) may be implemented. Erasure coding is a technique for storing raw data, along with parity bits. Parity data is typically smaller than the original data. Erasure coding can achieves the same durability as standard Hadoop (3×) replication but using half the storage, which can be a component of a tiered storage strategy. Erasure coding can be used to store cold data. Data is not simply replicated 3×, as in "plain" HDFS. Instead, lost data (due to a failed data node or disk, say) is a reconstituted using an algorithm and the parity data. This reconstitution requires computation. There are both write- and (possibly, minor) read performance impacts (in the case of read-errors/failed disks). Erasure coding is not suitable for "hot"/"active" data but forms a key part of long-term data archiving within the data lake.

Hadoop 2700 is, by design, a highly available platform, with data replicated across a clusters (typically copies, spread across racks), and distributed processing resilient in the face of node failure/s (failure of one or more nodes in a distributed computation causes Hadoop to simply restart the failed piece/s on other nodes). Thus, within a data centre, Hadoop provides high availability and reliability. This reliability, however, does not mitigate the risk of losing an entire data centre. In one embodiment, a full replica of the production environment (BCC) may exist at the DR site (SCC).

Cross-Site Synchronization

In the "Hadoop 1.0" cluster, cross-site data replication/synchronization is provided by EMC Isilon's SyncIQ replication capabilities, transparently synchronizing Isilon storage arrays across sites.

For the "Hadoop 2.0" cluster, which uses locally attached disk on each data node, cross-site replication will enabled using Hadoop's DistCP in conjunction with Oozie (Hadoop's scheduler).

DistCp (distributed copy) is a tool used for large inter/intra-cluster copying, using MapReduce to effect its distribution, error handling and recovery, and reporting.

FIGS. 17, 18 and 19 demonstrate example migration process from Netezza to Hadoop. At stage 1 (FIG. 17), data and applications are copied and synchronized; at stage 2 (FIG. 18), Hadoop is prioritized as the main data repository system; and at stage 3, Netezza is removed and Hadoop is the only data repository system implemented.

FIG. 20 shows migration process from Netezza to Hadoop for data landing zone.

In one embodiment, migration from Netezza to Hadoop entails a number of steps. One step is Netezza-to-Hadoop Replication. Replication of data from Netezza to Hadoop allows consumption workloads to be shifted to Hadoop before ETL/ELT workloads are shifted to Hadoop. Data from Netezza can be transferred to Hadoop using sqoop, and stored in Hive.

Another migration step is ELT & SQL-script Migration: transformations of data within Netezza (from staging, to L1, L2, L3, etc.) are performed using in-database processing (i.e. ELT and not ETL), with "knowledge" of what transformations to perform encoded into SQL scripts (using Netezza's SQL dialect). As part of migrating the ELT workload from Netezza to Hadoop, these SQL scripts will be altered to use Hive's SQL dialect, but otherwise perform the same logical transformations, allowing the ELT jobs to be moved onto Hadoop. Conversion from Netezza's SQL dialect to Hive's dialect will be performed using custom automated migration utilities (developed by the IDP team).

Another migration step is SQL Engine. Hive as a "SQL engine" may be used to store BORTS data currently stored in Netezza. While Hive's query performance is good, for cases where very low-latency or interactive queries are required (e.g. where consistent sub-second response times are required), data may be replicated from Hive into HBase and exposed via Phoenix.

In an earlier version of Hadoop (e.g. Hadoop 1.0), cluster may utilize EMC Isilon storage nodes to provide storage for "data nodes", while an updated version (e.g. Hadoop 2.0) of cluster may use locally attached disks (where each data node has its own set of locally attached storage devices), see FIG. 21. Both clusters may have their own HDFS Name Nodes (provided by Isilon in the earlier cluster, and run as a standalone process on an admin node in the updated cluster). Federation of Isilon's OneFS with native Hadoop HDFS NameNode, while technically possible using ViewFS, is not a viable long-term solution. "1.0" Data nodes (which currently have no locally-attached storage) will be retrofitted with locally-attached disks, and added to the Hadoop "2.0" cluster. "1.0" Admin and Edge nodes will be added to the Hadoop "2.0" cluster. Isilon may be decommissioned or repurposed.

Below is a table illustrating example use cases for different components and functionalities of IDP 2100 in some embodiments.

| | Use Case | Use Case Description |
|---|---|---|
| 1 | Data Archiving in Hadoop | Data Archival strategy from Netezza to Hadoop to be implemented |
| | | Cold data from Netezza (older than 18 months) to be archived in Hadoop |
| | | Integrated reporting from Hadoop (for longer than 18 months duration) |
| | | Exceptions to be handled on a case by case basis |
| 2 | Self Service Sandbox Capability | Ability to provision a Self Service Sandbox without technology involvement |
| | | Also provides the ability to the user to get self service access to the next generation analytics capabilities (R, Datameer, Python, etc.) |
| 3 | Developing Regulatory Lineage in Hadoop | Hadoop Lineage Standards been developed for regulatory compliance (with inputs from AML group and other regulatory stakeholders) |
| | | Lineage to be developed for next generation analytics capabilities as per use case need (e.g. Datameer, R, etc.) |
| 4 | Integration with Metadata Hub | Integrated metadata and lineage tracking between Hadoop and Netezza (using Atlas/IGC API bridge) gives the ability to report regulatory lineage from Hadoop via Metadata Hub |
| | | Metadata enrichment from Hadoop Atlas to IGC |
| 5 | Hadoop Data Protection Tool | A data protection solution to be implemented to protect the sensitive data in IDP (both Hadoop/Netezza) |
| | | L3 views and consuming applications to be rewired to consume from the data protection tool |
| 6 | Information Analyser running within Hadoop | Deployment and execution of Info Analyzer as a native Hadoop component. |
| | | Migration of data quality and data profiling workload to Hadoop. |

Data Access Control

In some embodiments, data access control governs the authentication and authorization of central data assets for individual users and users defined within an Active Directory (AD) group. Data assets (tables and interfaces) are modelled by an SQL engine (e.g. HIVE) in Hadoop. Hive supports table level and column level access control.

Apache Ranger may be leveraged to provide a centralized security framework, allowing fine-grained access control to be managed over all supported Hadoop stores (Hive, HBase, HDFS, etc.).

Data assets (tables and interfaces) are modelled by Hive (or equivalent SQL engine) in Hadoop. Hive supports table level and column level access control.

Apache Ranger will be leveraged to provide a centralized security framework, allowing fine-grained access control to be managed over all supported Hadoop stores (Hive, HBase, HDFS, etc.).

Referring back to FIG. 7 as well as to FIG. 22, the Ranger Admin 2770 portal may be implemented as the central interface for security administration. Users can create and update policies, which are then stored in a policy database. Plugins within each component poll these policies at regular intervals. The portal also consists of an audit server that sends audit data collected from the plugins for storage in HDFS or in a relational database.

Ranger Plugins are lightweight Java programs which embed within processes of each cluster component. For example, the Apache Ranger plugin for Apache Hive is embedded within Hive Server2. These plugins pull in policies from a central server and store them locally in a file. When a user request comes through the component, these plugins intercept the request and evaluate it against the security policy. Plugins also collect data from the user request and follow a separate thread to send this data back to the audit server.

Apache Ranger provides a user synchronization utility to pull users and groups from Unix or from LDAP or Active Directory. The user or group information is stored within Ranger portal and used for policy definition.

FIG. 23 shows automated workflow process for IDP data access request. In some cases, Business Application Owner's approval may be required to control access to data in the IDP.

FIG. 24 shows key Information collected for IDP access request. Information collected may include: Requestor Name, User ID, Domain, User Role, Manager's Name/Approval, Project/Initiative Name & ID initiating the request, LOB/Function initiating the request, Access Location (on premises or remote), Machine Name, IP Address, BORTS, Level of IDP, Environment: DEV, QA, UAT, Production, Data Classification, User granted PII access, if applicable, Access Type: read/edit, View Type:—open, secure, DEV/QA view, Reason for Request, Access start date and Access end date.

IDP Data Protection

A number of data protection measurement may be placed in place for IDP. For example: IDP shall not allow clear text of PCI data in Netezza DB or Hadoop H; certain columns/fields of data can be masked or encrypted within Netezza or Hadoop; the protected columns/fields can preserve original data type and length (format preservation); an interface can be provided to allow authorized users to view clear text of sensitive data at real-time while non-authorized users can only see protected data; another interface can restore the original clear text and encrypt entire output before sending the batch file to downstream applications; and IDP can discover sensitive data and take appropriate actions.

In some cases, IDP can maintain only one key pair for encryption.

FIG. 25 shows an example process of data masking and encryption by an example data repository system (e.g. Netezza) within IDP. From L0 stage to L1, IDP may use Optim API (UDF) to mask data, and use NZ encryption API (UDF) to encrypt sensitive data. An additional column may be added for the encrypted data. IDP may also create additional views with decrypt API for authorized users. The masking can preserve formats.

FIG. 26 shows another example process of data masking and encryption by an example data repository system (e.g. Hadoop) within IDP. All data to Hadoop can be ingested and processed in HDFS encryption zone. When presenting in HIVE or HBase, IDP may use Optim API to mask and customized function to encrypt sensitive data in fine-grain protection. IDP may also generate a HIVE view with decrypt API (UDF) for authorized users, and build a customized Interface for authorized users to access sensitive data from HBase.

FIG. 27 shows another example data protection of IDP. IDP can leverage Optim masking API and NZ encryption function. IDP can add an additional column for encrypted data. After data is protected, the original table may be deleted. This may be a one-time activity.

Data Lineage

Data lineage may capture the filtering, mapping and transformation of critical data elements across the enterprise organization. In some cases, SAP PowerDesigner (PD) provides the enterprise data lineage documentation tool. Data lineage from PD is fed through to Metadata Hub through an automated interface.

In some embodiments, tables and interfaces in L1 and L3 of data repository system 2600, 2700 may be re-modeled through Hive or an equivalent SQL engine. SQL engine can provide "mapping abstraction" between tables (interfaces) and HDFS files. PD supports creation of physical data model in Hive.

In addition, L2 data may be implemented outside of Hadoop in external RDBMS and copied to Hadoop. PD, being a cross platform tool, can track lineage from L1 to L2 wherever L2 reside.

Data Quality and Data Profiling

Information Analyzer (IA) can refer to an integrated tool for providing comprehensive enterprise-level data analysis. It features data profiling and supports ongoing data quality assessment. In some cases, IA accesses central data assets in Netezza through Netezza JDBC driver. In other cases, IA may access central data assets in Hadoop, using one of two options:

1. IA runs on its own, independent hardware platform and accessing Hadoop data sources through ODBC driver or webHDFS; or
2. IA runs natively within the Hadoop cluster, able to utilize the processing power of multiple data nodes. This has the benefits of being a single platform, providing continued access to non-Hadoop data asset through existing connectors, and horizontal, linear, scalability.

Changes to rules and data profiles may be required to align with naming conventions of Hadoop data sources.

Metadata Hub

FIG. 28 shows an example Data Governance Operating Model of IDP 2100. Different data stakeholders are shown. Data Governance Office supports data governance implementation and develops methodology, processes and tools. Data stewards integrates business and functional requirements for a data domain. Data Stakeholders own information risk and act as first line of defence for derived data, as well as define data requirements for a function. Data Governance Leads provide guidance and support, coordinate activities, rationalize and prioritize requirements and monitor compliance. Data Owners own information risk and act as first line of defence, and define data requirements: critical data, quality rules, thresholds, source systems, business glossary, data quality attestation. Data owners also execute remediation plans. Data Custodians manage either one or several book of record transaction systems (BORTS), document metadata and lineage, and support quality testing and execute remediation plans.

Data Governance and Analytics (DG&A) is an enabling function for the organization with specific operational accountabilities and decision rights for the establishment of data management practices across the enterprise. DG&A defines: data strategy, IDP-centric Technology Data Architecture, Data Governance Framework and Operating Model and Data Governance Processes and Supporting Tools.

Data Governance capabilities can be implemented by the Data Governance Communities through a prioritized roll-out plan.

Producers of data, e.g. Data Owners and Data Stakeholders, own the information risk associated with the implementation and embedding of data management practices.

Data Governance and Analytics (DG&A) relies on the Information Risk CSA within GITRM to monitor the framework implementation, operating model and provide independent effective challenge and validation.

FIG. 29 shows IDP Information Governance Catalog (IGC). The IGC is used to implement the "Metadata Hub", which is mainly used by DG&A. IGC can create and manage enterprise vocabulary and information governance practices, maintain metadata about information assets, and support data lineage.

FIG. 30 shows IDP IGC Logical Architecture. The Catalog shows integration between different components to generate the schema for ingestion into IGC (metadata hub). The BPM (business process management) defined access policies. The UI is the consumption/quality side. These results are different than the consumption results and the rules relate to data quality (e.g. gender is a critical data attribute and run it against a quality check to validate). The quality can check if it is a valid format or valid data value, for example. It can also do a benchmark check to see if the value the same for 100 elements-then may be a default value and not an accurate data value. These are examples.

FIG. 31 shows IDP IGC Data Flow Architecture.

FIG. 32 shows IDP IGC Production Physical Architecture, which includes IGC infrastructure BCC Brownfield PROD.

FIG. 33 shows an example DG&A intranet webpage for an example Financial Group. The interface includes interactive indicia to trigger three different data service processes at a portal. The portal can interact with the IDP. The inventory/roadmap can access the glossary/schema to search/query. The roadmap refers to inflight projects and if relevant to a user then they can wait to re-use components from the inflight project or something already started.

A number of patterns focused on system-to-system integration with Hadoop are identified below. Each pattern identifies the situation/s in which a particular pattern should be applied, and the Hadoop- and related components utilized by the pattern.

Ingestion:
A. File Ingestion
   1. Batch File "Upload" to HDFS
   2. Batch File Loading via SQL-based ELT
   3. Batch File Loading via Hadoop APIs (Spark, etc.)
B. Streaming
   1. Streaming Data Aggregation (via CG)
   2. Streaming Data Aggregation (direct to Hadoop)
   3. Complex Event Processing ("Stream Processing")
   4. Streaming Machine Learning
Consumption:
C. Connector Grid (CG) Services
   1. Machine Learning Model Execution
   2. Hadoop Data Access via SQL (JDBC)
   3. Hadoop Data Access via Hadoop APIs (Spark, etc.)
D. Analytic Applications
   1. Hadoop Analytics via SQL (JDBC)
   2. Hadoop Analytics via Hadoop APIs (Spark, etc.)
Event Generation:
E. Hadoop-Generated Events
   1. Hadoop Events via Connector Grid
   2. Hadoop Events direct from Kafka In some embodiments, files containing data valuable for analytics, machine learning, etc., whether structured, unstructured, or semi-structured, may be transmitted to Hadoop via regular file-transfer protocols, and stored in a suitable folder within HDFS. This may be known as batch file "upload" to HDFS.

Batch file may be used for gathering files containing data to be used as input to Hadoop-based processing, e.g. inputs to machine-learning model training, or for processing with MapReduce or Spark.

In some embodiments, files may be uploaded to the data lake through batch file loading via SQL-based ETL. Structured data files, data valuable for analytics, machine learning, etc., may be transmitted to Hadoop via regular file-transfer protocols, and placed in a "staging" folder within HDFS. Subsequently, the files' data is loaded into a SQL-based data-store (Hive, for example), followed by the execution of one or more SQL scripts which transform the input data into "consumable" format (typically one of the IDP Level-1) using the ELT approach. Such a method may be used for bulk loading of (structured) data from BORTS into Hadoop, or SQL-based data transformation of "raw" input data into "consumable" format/s.

In some embodiments, batch file may be loaded via ETL tool native to a data repository system (e.g. Hadoop). Semi-structured and/or unstructured data are transmitted to Hadoop via regular file-transfer protocols, and placed in a "staging" folder within HDFS. Subsequently, the files' data is processed by means of MapReduce, Spark, or other Hadoop-based code, extracting meaningful information from the semi-/unstructured files. This method can be used for transferring semi-/unstructured files containing data whose contents is to be processed by MapReduce, Spark, or other Hadoop framework-specific jobs.

Referring now to FIG. 53, both traditional sources and non-traditional sources of data may be transferred to a landing zone within the IDP through MFT (or SFTP). Spark/MapReduce code, such as Python, Java or Scala code that processes data, may augment and populate higher "levels" of one or more columnar data stores.

Falcon may be used for tagging data lineage and data governance. Hive and Hbase may be used to process different levels of data and to provide columnar storage and SQL interfaces.

Data manipulation code (which may be Spark, MapReduce, SQL, etc.) used to transform data may be either hand-coded or generated by a Hadoop-native tool such as Cambridge Semantics or Pentaho, depending on use case. For example, L2, L2.5 and L3 transformations can be implemented by generated code. A tool may be leveraged by IDP developer or data governance administrators to generate data manipulation code. Custom code may also be implemented by IDP developers.

repositoryzepplIn some embodiments, as seen in FIG. 54, IDP may process complex events ("stream processing"). Data streams may be streamed into Hadoop, either directly or via CG, and are processed in (near-) real-time, as they are received by Hadoop, enabling time-sensitive insights, actions, analytics, and "events". Flume, Kafka may be used to message transport into Hadoop. NiFi may be optionally used for flow definition/management. HDFS, Hive, HBase, Phoenix may be used for storage for structured and/or unstructured data. Data stream processing framework may be one of Spark Streaming, Storm and Ignite.

In some embodiments, as seen in FIG. 55, IDP may stream data via machine learning. Data streams, streamed into Hadoop, either directly or via CG, may be processed in (near-) real-time, as they are received by Hadoop, and used as inputs to existing machine-learning models to produce predictions or outputs, and/or to train machine-learning models as training data. Flume, Kafka may be used to message transport into Hadoop. NiFi may be optionally used for flow definition/management. HDFS, Hive, HBase, Phoenix may be used for storage for structured and/or unstructured data. Data stream processing framework may be one of Spark Streaming, Storm and Ignite.

In some embodiments, as seen in FIG. 56, IDP may consume data via connector grids (CG) and execute data models via machine learning. Connector Grid (CG) exposes a web-service, allowing callers to submit a set of input values. When invoked, the CG service uses Hadoop APIs to submit the caller-supplied input values to a Hadoop-based (typically predictive) machine-learning model. Hadoop executes the machine-learning model using the supplied input values, and returns a result to CG, which CG returns to the caller. This method may allow channel and other systems to run an already trained and deployed machine-learning model to, for instance, compute best offers, estimate risk of default, using standard CG-based web-service technologies. Connector grids may be implemented via SOAP/HTTPS. Mahout, MLLib, or H2O, may be used as a machine-learning/AI framework.

In some embodiments, as seen in FIG. 57, IDP may consume data via connector grids (CG) and via SQL (JDBC). Connector grids may exposes a web-service that provides the ability to execute one or more "canned" SQL queries against one or more Hadoop-based SQL data stores (Hive, Phoenix, etc.). This method may be used for encapsulating access to a SQL-based Hadoop data store such as Hive or Phoenix, where input data (search criteria, etc.) is small and well-defined. This may also ensure predictable SLAs and "hiding" Hadoop SQL stores from callers. This method may be used for queries that return small result sets. Access to HBase can be either via HBase Java APIs, or via SQL (JDBC) using Phoenix as "SQL layer".

In some embodiments, as seen in FIG. 58, IDP may consume data via connector grids (CG) and via API of a data repository system (e.g. Hadoop). Connector Grid (CG) exposes a web-service that, behind the scenes, uses Hadoop APIs, e.g. Spark, MapReduce, etc., to "query" data stored within Hadoop (files in HDFS, data in HBase, Hive, etc.), and return Hadoop-generated results to the caller. This method may be used for encapsulating access to complex Hadoop-based data stores via Spark or other "Hadoop API" jobs, allowing other systems to invoke these jobs using standard web services. This method may also be used for Hadoop "jobs" that return results quickly, or for queries that return small result sets. Access to HBase can be either via HBase Java APIs, or via SQL (JDBC) using Phoenix as "SQL layer". Where complex queries are required and/or queries need to change dynamically, SQL may be used.

In some embodiments, as seen in FIG. 59, analytic applications, such as SAS, Business Objects, Spotfire, etc., may execute SQL queries against Hadoop-based data stores using JDBC/ODBC. For example, analytic applications that require "live" access to Hadoop data may be connected to Hadoop-provided SQL data stores using JDBC/ODBC. This may also apply where cases where result sets produced by SQL queries are "manageable" and can be transported across the network in reasonable time.

In some embodiments, as seen in FIG. 60, analytic applications, such as SAS, Business Objects, Spotfire, etc., may execute "queries" against data stored in Hadoop using Hadoop APIs (such as Spark, MapReduce, etc.). For example, analytic applications that require "live" access may be connected to non-relational data stored in Hadoop or other complex data sources. This may also apply where cases where "schema on read" type functionality and/or complex processing on massive data sets is required.

In some embodiments, as seen in FIG. 61, event generation may be done through Hadoop Event via Connector Grid (CG). Events generated by Hadoop, whether batch, stream-processing, etc., may be routed to the Connector Grid's EMS, enabling CG's Sense & Respond capabilities to be used to respond to events. This may apply where Hadoop-generated events either need to be responded to by Connector Grid, or events need to be distributed to other channels or systems (via CG).

In some embodiments, as seen in FIG. 62, event generation may be done through Hadoop Event directly from Kafka. Events generated by Hadoop, whether batch, stream-Situations where Hadoop-generated events do not need to flow through CG's Sense & Respond capability, and where cases where event volume is too high to be handled by EMS.

In some embodiments, IDP Netezza structured data may be archived into IDP Hadoop on a regular basis (e.g. daily or weekly). Any legacy IDP Netezza data may then be removed according to established policies in order to free up space. All real time usage of IDP Hadoop data should be either through CG or an operational analytics tool. Additional tool-sets including Hadoop components e.g., Python, NiFi, Zeppelin required by consumers on the IDP Hadoop environment need to be certified by Enterprise Architecture and DG&A. Emerging & non-traditional data sources can be brought directly into IDP Hadoop. Predictive model development and performance measurement may be done in the sandbox area.

In some embodiments, all BORTS data may be loaded directly to IDP Netezza. IDP Netezza is a prerequisite for all BORTS structured data; emerging and non-traditional data sources only will be loaded directly to IDP Hadoop e.g. clickstream, complex XML, real-time messaging, server logs. BORTS data is not directly loaded to IDP Hadoop, with the exception that BORTS structured data can be loaded directly to IDP Hadoop/strictly on a one-time basis only if the data does not exist in IDP Netezza today, only for proof of concept purposes, and only in non-production IDP Hadoop environments or the Hadoop Sandbox.

If an emerging & non-traditional data source is brought into IDP Hadoop and converted into a structured format, it should be brought to IDP Netezza if it can be leveraged by additional consumers.

Only applications requiring Hadoop capabilities e.g., Risk Canvas requirement for real-time data ingestion using Storm & Hbase should be consuming directly from the IDP Hadoop platform. EA and DG&A would review use cases on a case-by-case basis to decide between applications consuming from Hadoop or Netezza.

As seen in FIG. 46, IDP has sandbox environments in both Netezza and Hadoop for users to do self-serve computational analysis. Users can use analytics platformto do, on their own, data preparation in the sandbox environment. Once ready, the logics can be released into production through the regular implementation process. Users can build their own visualization using Spotfire Professional. Production deployment is self-serve. Users can do R programming by using RStudio Client on local data or by using RStudio Server on Hadoop sandbox data. Once ready, the logics can be released into production through the regular implementation process.

FIG. 47 shows IDP Netezza Sandbox Environment: R&R and SLA.

FIG. 48 shows Logical Architecture-IDP Netezza Sandbox Environment.

Apache Hive can be used as the primary "SQL engine" (for structured, BORTS, data) within "Hadoop 2.0".

Below is a table of Hadoop components in accordance with some embodiments:

| Component | Description |
| --- | --- |
| Apache Ambari | Ambari offers an intuitive collection of tools and APIs that mask the complexity of Hadoop, simplifying the operation of clusters. |
| Apache Atlas | Apache Atlas provides governance capabilities for Hadoop that use both prescriptive and forensic models enriched by business taxonomical metadata. Atlas, at its core, is designed to exchange metadata with other tools and processes within and outside of the Hadoop stack, thereby enabling platform-agnostic governance controls that effectively address compliance requirements. |
| HDFS | Hadoop Distributed File System is a Java-based file system that provides scalable and reliable data storage, and it was designed to span large clusters of commodity servers. HDFS has demonstrated production scalability of up to 200 PB of storage and a single cluster of 4500 servers, supporting close to a billion files and blocks. When that quantity and quality of enterprise data is available in HDFS, and YARN enables multiple data access applications to process it, Hadoop users can confidently answer questions that eluded previous data platforms. |
| Apache Hive | Apache Hive ™ data repository software facilitates querying and managing large datasets residing in distributed storage. Hive provides a mechanism to project structure onto this data and query the data using a SQL-like language called HiveQL |
| Apache HBase | Apache HBase provides random, real time access to data in Hadoop. It was created for hosting very large tables to store multi-structured or sparse data. Users can query HBase for a particular point in time, making "flashback" queries possible. |
| Apache Falcon | It addresses enterprise challenges related to Hadoop data replication, business continuity, and lineage tracing by deploying a framework for data management and processing. Falcon centrally manages the data lifecycle, facilitates quick data replication for business continuity and disaster recovery and provides a foundation for audit and compliance by tracking entity lineage and collection of audit logs. |
| Apache Flume | Apache Flume is a distributed, reliable, and available service for efficiently collecting, aggregating, and moving large amounts of streaming data into the Hadoop Distributed File System (HDFS). It has a simple and flexible architecture based on streaming data flows; and is robust and fault tolerant with tunable reliability mechanisms for failover and recovery. YARN coordinates data ingest from Apache Flume and other services that deliver raw data into an Enterprise Hadoop cluster. |
| Apache Kafka | Apache ™ Kafka is a fast, scalable, durable, and fault-tolerant publish-subscribe messaging system. Kafka is often used in place of traditional message brokers like JMS and AMQP because of its higher throughput, reliability and replication. Kafka works in combination with Apache Storm, Apache HBase and Apache Spark for real-time analysis and rendering of streaming data. Kafka can message geospatial data from a fleet of long-haul trucks or sensor data from heating and cooling equipment in office buildings. Whatever the industry or use case, Kafka brokers massive message streams for low-latency analysis in Enterprise Apache Hadoop. |
| MapReduce | MapReduce is a programming model and an associated implementation for processing and generating large data sets with a parallel, distributed algorithm on a cluster. |
| Apache Oozie | Apache Oozie is a Java Web application used to schedule Apache Hadoop jobs. Oozie combines multiple jobs sequentially into one logical unit of work. It is integrated with the Hadoop stack, with YARN as its architectural center, and supports Hadoop jobs for Apache MapReduce, Apache Pig, Apache Hive, and Apache Sqoop. Oozie can also schedule jobs specific to a system, like Java programs or shell scripts. Apache Oozie is a tool for Hadoop operations that allows cluster administrators to build complex data transformations out of multiple component tasks. This provides greater control over jobs and also makes it easier to repeat those jobs at predetermined intervals. At its core, Oozie helps administrators derive more value from Hadoop. |

-continued

| Component | Description |
|---|---|
| Apache Phoenix | Apache Phoenix is a relational database layer over HBase delivered as a client-embedded JDBC driver targeting low latency queries over HBase data.<br>Apache Phoenix takes your SQL query, compiles it into a series of HBase scans, and orchestrates the running of those scans to produce regular JDBC result sets. The table metadata is stored in an HBase table and versioned, such that snapshot queries over prior versions will automatically use the correct schema. Direct use of the HBase API, along with coprocessors and custom filters, results in performance on the order of milliseconds for small queries, or seconds for tens of millions of rows. |
| Apache Pig | Pig was designed for performing a long series of data operations, making it ideal for three categories of Big Data jobs:<br>Extract-transform-load (ETL) data pipelines,<br>Research on raw data, and<br>Iterative data processing |
| Apache Ranger | Apache Ranger offers a centralized security framework to manage fine-grained access control over Hadoop data access components like Apache Hive and Apache HBase. Using the Apache Ranger console, security administrators can easily manage policies for access to files, folders, databases, tables, or column. These policies can be set for individual users or groups and then enforced within Hadoop<br>Security administrators can also use Apache Ranger to manage audit tracking and policy analytics for deeper control of the environment. The solution also provides an option to delegate administration of certain data to other group owners, with the aim of securely decentralizing data ownership.<br>Apache Ranger currently supports authorization, authentication, auditing, data encryption and security administration for the following HDP components:<br>Apache Hadoop HDFS<br>Apache Hive<br>Apache HBase<br>Apache Storm<br>Apache Knox<br>Apache Solr<br>Apache Kafka<br>YARN |
| Apache Sqoop | Apache Sqoop efficiently transfers bulk data between Apache Hadoop and structured data stores such as relational databases. Sqoop helps offload certain tasks (such as ETL processing) from the EDW to Hadoop for efficient execution at a much lower cost. Sqoop can also be used to extract data from Hadoop and export it into external structured data stores. Sqoop works with relational databases such as Teradata, Netezza, Oracle, MySQL, Postgres, and HSQLDB<br>Tool used for transferring bulk data between Hadoop and structured data stores such as relational databases |
| Apache Storm | Storm is a distributed, real-time computation system for processing large volumes of high-velocity data. Storm is extremely fast, with the ability to process over a million records per second per node on a cluster of modest size. Enterprises harness this speed and combine it with other data access applications in Hadoop to prevent undesirable events or to optimize positive outcomes. |
| Apache Tez | Apache Tez is an extensible framework for building high performance batch and interactive data processing applications, coordinated by YARN in Apache Hadoop |
| YARN + MapReduce2 | Apache Hadoop NextGen Map Reduce (YARN). Job scheduling and cluster resource management. MapReduce2 is used to process large data sets in a scalable, parallel manner |
| Zookeeper | Zookeeper provides operational services for a Hadoop cluster. Zookeeper provides a distributed configuration service, a synchronization service and a naming registry for distributed systems |

FIG. 49 shows an example Hadoop physical architecture in production. As can be seen, storage (EMC Isilon) is not locally attached to Compute Nodes, but requires a cross-rack network "hop".

FIG. 50 shows example Hadoop physical architecture with a focus on "Consumer Apps" (vSphere). Edge nodes can host "client applications"—that is, applications that, apart from providing their own, typically web-based, user-interface, make use of the data and compute power available in the "main" Hadoop cluster (i.e. compute nodes). As such, edge nodes do not, typically, require the same amount of processing power or direct access to HDFS as a compute node does. In addition, edge nodes are not "generic", meaning that they do not all run the same software image, but usually have one or more "client" applications (such as Clickfox, Datameer, etc.) installed on their local disks.

While current "Hadoop 1.0" cluster has 4 physical edge nodes, additional edge nodes are run on virtual machines, as shown in FIG. 50. "Virtual" edge nodes provide easier administration and management of the customized software stacks needed by particular edge nodes, and provide a cost effective growth path.

FIG. 51 shows example Hadoop physical architecture with a focus on DR (partial). The illustrated "Hadoop 1.0" cluster does not include a complete DR environment. The DR environment may consist of 4 EMC Isilon data nodes, providing ~ 400 TB raw storage. FIG. 72 is a view showing High Level Design of Enterprise Hadoop Cluster.

Book of Records

For any organization, especially a financial institution, a complete and accurate capture of customer data can be important. A single book of records repository (database) for customers may help implement a standardization for how customer data is captured and leveraged for operational processes, analytics and regulatory applications. See FIG. 64A for an example value chain of Book of Records and FIG. 64B for example value propositions for Book of Records repository.

FIG. 65 shows an example architecture diagram of central data hub 3000 with book of records 2900 and IDP 2100. FIG. 66 shows an example system/application view of central data hub 3000 with book of records 2900 and IDP 2100.

Across channels 2300, customer information is captured consistently at all points of collection for all LOBs and channels, aligned to standards defined for the Enterprise Customer Domain. A single view of customer information and aggregate view of customer holdings can be displayed on channels, in real-time or near real-time, and on demand if necessary.

A Book of Records 2900 can be established as the single, authoritative source for Enterprise Customer Domain attributes, in synchronization with existing LOB customer book of record systems and their downstream dependencies. An enterprise identifier mapped to all sources of customer information is used as the authoritative reference for the customer. All updates made in the book of records before information is shared to other systems such as channels 2300, product systems 2400a, or corporate systems 2400b. Book of record can also be the system of reference for contact information and system of record for customer to contract relationship.

Connector grids 2110 services orchestrate customer/account information search/retrieval/update from/to book of records and product systems. Business rule related to the book of records, data validation and derivation can also be provided as service to channels 2300.

In addition, product systems 2400b may be book of records for contract (account) information. Changes made to contract in product systems may be replicated via real time notification and potentially reconciled via IDP.

The data from book of records 2900 may be transmitted to IDP 2100 for further processing. For example, customer profile data can be standardized or transformed for data insourcing from product systems 2400b. For another example, IDP 2100 can transform and deliver customer profile and product information to corporate data systems to support marketing and analytics needs.

FIG. 67 shows central data hub capabilities with respect to a book of records. BPM Processes provides workflow process for supporting data remediation, reporting (e.g. business and data stewardship reports), and book of records data view and repair.

Source system batch process may be connected to an IDP database, which may implement system processes for insourcing customer information from various LOB customer information data stores, and delivers enterprise customer profile information from book of records to IDP as well as to corporate data marts to enhance marketing/regulatory analysis and reporting.

Master Data Services (MDS) manage party, party-to-party, and party-to-contract relationships. MDS also supports the book of records and orchestrates one-stop profile update.

Book of records may contain data model for customer profile golden records. It may also include rules for data matching, data merging and data survivorship. Book of records services can also manage party, party-party and party-contract relationship. Services for manual merge/split customer profile may also be provided.

Adapters are configured to integrate with product systems in real time or near real time and batch for customer or account data synchronization.

FIG. 68 shows an example state of book of records with channels, product systems and corporate systems.

FIG. 69 shows an example transformation from a first example state to a second example state with high level technical deliverables. Channels may integrate with book of records (also known as ECIF) for managing enterprise customer profile. Channels may each provide a view to the customer profile information.

Central data hub establishes system capabilities required for supporting the book of records. Central data hub can define enterprise customer profile golden record standard and implement corresponding data model and service in the book of records. Central data hub can define and implement customer profile match, merge and survivorship rules. Central data hub can include Master Data management services on connector grids and book of records.

Central data hub can also include services for orchestrating customer information synchronization between book of records and product systems. Central data hub may further include batch process of customer and account reconciliation between book of records and other systems.

Central data hub may also include workflow processes and reporting capability for supporting data remediation. Central data hub may include user interface for data stewards to view and repair book of records data.

Book of records and IDP can include system processes for insourcing customer information from LOB groups and product systems, and for orchestrating customer information synchronization between book of records and LOB groups.

Product systems may integrate with book of records by receiving customer profile information in real time or in batch from book of records, and send account information in real time or in batch to book of records.

Corporate systems may receive customer information from book of records or IDP. Corporate systems may also utilize book of records information for marketing/regulatory reporting.

The figures indicate the connection of IDP to the other SmartCore components (FIG. 1B) such as ECIF which allows for the creation, in real-time, of a complete view of the customer (e.g. consumption request). For example, a user can request to open a credit card account at the organization then this process would consider all customer data which is used to decision whether to open the account for the customer. IDP can also provide data for different types of interaction events (e.g. at 10 am you log in to process a transaction and this is stored as event data that can be consolidated with other event data).

Program code is applied to input data to perform the functions described herein and to generate output information. The output information is applied to one or more output devices. In some embodiments, the communication interface may be a network communication interface. In embodiments in which elements may be combined, the communication interface may be a software communication interface, such as those for inter-process communication. In still other embodiments, there may be a combination of communication interfaces implemented as hardware, software, and combination thereof.

FIG. 70 shows example patterns for product system integration.

FIG. 71 shows architectural consideration for managing Operational Customer Information File (OCIF) back doors. In some embodiments, product systems tightly integrate with OCIF through "back door" for account opening, customer and account information synchronization. OCIF "back doors" may prevent book of records from being effective. Alternative solution for managing OCIF back doors may include implementing real time update notification from OCIF to book of records via connector grids, turning off OCIF data match/merge functions, executing auto data match/merging only on book of records, and implementing real time update from book of records to OCIF. OCIF can become the proxy server for customer/account update from product system. Channels can integrate with book of records through hub connector grid services, and does not connect to OCIF for customer information.

FIG. 72 shows example process for onboarding a customer using channel application. When a customer is new to the organization, a look up can be performed to check if there is already a record of the customer. If not, a customer profile can be created and stored in the book of records with a book of records ID (e.g. ECIF ID). An account may be opened in product systems with an account ID. The ECIF ID may be linked to the account ID by updating customer to account relationship. Subsequent account updates can be synchronized in real time or near real time from product systems to book of records based on the ECIF ID and account ID relationship.

FIG. 73 shows example process for onboarding a customer using BPM. Product onboarding BPM process can be launched to onboard a customer. A look up can be performed to check if there is already a record of the customer. If not, a customer profile can be created and stored in the book of records with a book of records ID (e.g. ECIF ID). An account may be opened in product systems with an account ID. The ECIF ID may be linked to the account ID by updating customer to account relationship. Subsequent account updates can be synchronized in real time or near real time from product systems to book of records based on the ECIF ID and account ID relationship.

FIG. 74 shows example process for onboarding a customer and opening an account via batch process. A new account can be opened on product system via batch process. Product systems can send new account open event to book of records, which can create a new party or use data match/merge to add information to existing party. Alternatively, product systems can send new account information to book of records via batch, then book of records can create a new party or use data match/merge to add information to existing party.

FIG. 75 shows example process for updating a party information in a customer profile. Customer profile changes can be captured on channels. Channels then send customer profile changes to book records through channel/core processing and storage (SmartCore) services (e.g. connector grids). Book of records can update party with changes and send party changes event out. SmartCore services can send profile changes to product systems and product systems can then update customer account accordingly. In some cases, account level information updates may be based on request by customer and per account. Book of records and/or IDP may send batch file to reconcile profiles changes. Book of records and/or IDP may also send customer profile changes in batch to corporate data marts. Batch process to reconcile profile updates may keep profile information in-synch between book of records and product systems to support critical business processes.

FIG. 76 shows example process for updating contract information in a customer profile. Customer account may be updated through a self-service channel or an assisted channel. Product system may send real time or near real time account change even to SmartCore. SmartCore service then processes account change event and update customer profile. Alternatively, product system can send product changes via batch to IDP. IDP can send product changes to book of records which then updates customer profile. Book of records can publish party change event out. SmartCore services can send profile changes to application systems. Book of records or IDP can send customer profile change in batch to application systems for reconcilement. Book of records or IDP can also send customer profile change in batch to corporate data marts.

FIG. 77 shows example process of generating customer financial snapshot view on a channel. First, a specific channel can send a financial snapshot request to SmartCore service, then SmartCore service can retrieve customer profile from book of records, and retrieve real-time or near real-time customer account balance information from product systems based on the customer profile from book of records. SmartCore services can then return customer financial snapshot to the channel for display.

SmartCore Authorization Components: VII, Authorization Service, SOA Gateway

In some embodiments, Virtual Identity Image (VII) may be implemented as a service in front of SmartCore distributed caching platform. VII may mostly expose read-only operations. It may also allow invalidate caching entries for specific ECIF IDs forcing to re-load updated info from ECIF and potentially triggering termination of security session for the customer.

ISAM Web Gateway Appliance tier is the front line protection for the online channels. It configures, evaluates and enforces high-level access policy rules driven by the data in Customer Credential Store (e.g. business categories of certain customers-"EDB Customer", "IL Self-direct Customer") and URL patterns. It can delegate policy decision to CIAM Authorization Service (see below).

Authorization Service is implemented by the set of ISAM Advanced Access Control Appliances. It configures and evaluates static and dynamic access policy rules, both of which can trigger step-up authentication flow. Static access policy rules are configured, evaluated while taking into consideration contexts of customer identity and its entitlements retrieved from VII, and resource characteristics: categorization, sensitivity, etc., usually configured within policy.

Dynamic access policy rules add to decision making process 2 additional contexts: risk profile associated with customer's identity and device(s) been used by the customer, e.g. customer's velocity, abnormality of a requested transaction, previous history of fraud-related events. Such risk profile will be aggregated from multiple risk engines (both internally and externally hosted). Environment context may include geo location, IP reputation, date/time.

SmartCore Security Enforcement Gateway is implemented by the set of appliances. It configures, evaluates and enforces static access policy rules. Unlike Authorization Service above the policy decisions can be either "Permit" or "Deny" (no step-up authentication or obligation enforcement).

Identity Propagation and Authorization

Propagation of a trustworthy Digital Identity to all the system tiers participating in a transaction may be difficult. Digital Identity types can include customer, employee, employee acting on behalf/per request of a Customer so that customer delegates its access entitlements to employee, and batch/background process (System ID).

In some embodiments, stateless implementation allows verification of a Digital Identity token to be done without extra calls to data stores. There is no implied trust between system tiers. Digital Identity Token (Id Token) may be compliant to the existing industry standards for particular communication protocols (SAML for SOAP, Open ID Connect-compliant JWT for REST).

FIG. 78 shows example CIAM workflows with various agents and applications. In some embodiments, systems will request from the customers certain AuthN methods according to associated risks. Customer is able to register, use multiple strong authN factors, and combine them if necessary. Delivery and validation of the AuthN credential does not require wireless network (voice, SMS, cellular data). Validation of requested AuthN method is done without any kind of re-typing on the web site.

Throughout the foregoing discussion, numerous references will be made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions.

The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

The embodiments described herein are implemented by physical computer hardware, including computing devices, servers, receivers, transmitters, processors, memory, displays, and networks. The embodiments described herein provide useful physical machines and particularly configured computer hardware arrangements.

Although the embodiments have been described in detail, it should be understood that various changes, substitutions and alterations can be made herein.

Moreover, the scope of the present application is not intended to be limited to the particular embodiments of the process, machine, manufacture, composition of matter, means, methods and steps described in the specification.

As can be understood, the examples described above and illustrated are intended to be exemplary only.

What is claimed is:

1. A computer-implemented method comprising:
    receiving, by a processor, a request from a second processor for retrieval of data, the request comprising a requested data format;
    in response to the request,
        executing, by the processor using raw data stored within a database, a data model configured to identify a portion of the raw data corresponding to the request and further identify code to transform the portion of the raw data;
        transforming, by the processor, the portion of raw data by applying the code to the portion of the raw data identified via the data model to obtain transformed data comprising the portion of raw data in the requested data format; and
        transmitting, by the processor, the transformed data to the second processor.

2. The method of claim 1, wherein the requested data format corresponds to a group of users accessing an application associated with the request.

3. The method of claim 1, further comprising:
    extracting, by the processor, the raw data from a plurality of source systems; and
    loading and storing, by the processor, the raw data in the database.

4. The method of claim 1, wherein the raw data are stored at the database in a data format that is identical to a source data format of the raw data in a plurality of source systems.

5. The method of claim 1, wherein the processor generates, using the data model, a data map comprising a graph linking one or more data columns of the raw data to one or more data fields of the transformed data.

6. The method of claim 1, wherein the data model is a machine learning model.

7. The method of claim 1, wherein the database is distributed across a network of different nodes.

8. The method of claim 1, further comprising:
    aggregating, by the processor, the portion of the raw data in accordance with the data model.

9. A system comprising at least a processor and a non-transient data memory storage, the non-transient data memory storage containing machine-readable instructions for execution by the processor, the machine-readable instructions configured to cause the processor to:
    receive a request from a second processor for retrieval of data, the request comprising a requested data format;
    in response to the request,
        execute using raw data stored within a database, a data model configured to identify a portion of the raw data corresponding to the request and further identify code to transform the portion of the raw data;
        transform the portion of raw data by applying the code to the portion of the raw data identified via the data model to obtain transformed data comprising the portion of raw data in the requested data format; and
        transmit the transformed data to the second processor.

10. The system of claim 9, wherein the requested data format corresponds to a group of users accessing an application associated with the request.

11. The system of claim 9, wherein the instructions further cause the processor to:
    extract the raw data from a plurality of source systems; and
    load and store the raw data in the database.

12. The system of claim 9, wherein the raw data are stored at the database in a data format that is identical to a source data format of the raw data in a plurality of source systems.

13. The system of claim 9, wherein the processor generates, using the data model, a data map comprising a graph linking one or more data columns of the raw data to one or more data fields of the transformed data.

14. The system of claim 9, wherein the data model is a machine learning model.

15. The system of claim 9, wherein the database is distributed across a network of different nodes.

16. The system of claim 9, wherein the instructions further cause the processor to:
aggregate the portion of the raw data in accordance with the data model.

17. A computer system comprising:
a database storing raw data;
a processor in communication with the database, the processor configured to:
receive a request from a second processor for retrieval of data, the request comprising a requested data format;
in response to the request,
execute using the raw data stored within the database, a data model configured to identify a portion of the raw data corresponding to the request and further identify code to transform the portion of the raw data;
transform the portion of raw data by applying the code to the portion of the raw data identified via the data model to obtain transformed data comprising the portion of raw data in the requested data format; and
transmit the transformed data to the second processor.

18. The system of claim 17, wherein the requested data format corresponds to a group of users accessing an application associated with the request.

19. The system of claim 17, wherein the raw data are stored at the database in a data format that is identical to a source data format of the raw data in a plurality of source systems.

20. The system of claim 17, wherein the data model is a machine learning model.

* * * * *